United States Patent
Kim et al.

(10) Patent No.: US 11,855,732 B2
(45) Date of Patent: *Dec. 26, 2023

(54) METHOD FOR IMPROVING TRANSMISSION AND RECEPTION PERFORMANCE OF LTE MTC DOWNLINK CONTROL CHANNEL AND APPARATUS THEREFOR

(71) Applicant: LG ELECTRONICS INC., Seoul (KR)

(72) Inventors: Jaehyung Kim, Seoul (KR); Seonwook Kim, Seoul (KR); Changhwan Park, Seoul (KR); Seokmin Shin, Seoul (KR); Joonkui Ahn, Seoul (KR); Suckchel Yang, Seoul (KR); Seunggye Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/106,675

(22) Filed: Feb. 7, 2023

(65) Prior Publication Data

US 2023/0188191 A1 Jun. 15, 2023

Related U.S. Application Data

(63) Continuation of application No. 17/266,047, filed as application No. PCT/KR2019/010154 on Aug. 9, 2019, now Pat. No. 11,621,760.
(Continued)

(30) Foreign Application Priority Data

Sep. 28, 2018 (KR) .................. 10-2018-0116637
Nov. 2, 2018 (KR) .................. 10-2018-0133983
Feb. 15, 2019 (KR) .................. 10-2019-0018253

(51) Int. Cl.
*H04B 7/06* (2006.01)
*H04W 4/70* (2018.01)
(Continued)

(52) U.S. Cl.
CPC ......... *H04B 7/0639* (2013.01); *H04B 7/0626* (2013.01); *H04L 5/0048* (2013.01);
(Continued)

(58) Field of Classification Search
None
See application file for complete search history.

(56) References Cited

U.S. PATENT DOCUMENTS 11,621,760 B2 * 4/2023 Kim ............... H04L 5/0051
370/329
2015/0249973 A1 9/2015 Park et al.
(Continued)

FOREIGN PATENT DOCUMENTS

WO 2016144143 9/2016
WO 2016159680 10/2016
(Continued)

OTHER PUBLICATIONS

PCT International Application No. PCT/KR2019/010154, International Search Report dated Dec. 13, 2019, 4 pages.
(Continued)

*Primary Examiner* — Minh Trang T Nguyen
(74) *Attorney, Agent, or Firm* — LEE HONG DEGERMAN KANG WAIMEY

(57) ABSTRACT

The present specification discloses a method for receiving, by a terminal, a machine type communication (MTC) physical downlink control channel (MPDCCH) from a base station in a wireless communication system, the method comprising: receiving, from a base station, configuration information related to reception of a demodulation reference
(Continued)

signal (DMRS) to which one of a plurality of candidate precoders applied to a cell specific reference signal (CRS) is applied; receiving, from the base station, the DMRS and control information through the MPDCCH on the basis of the configuration information; performing channel estimation on the MPDCCH on the basis of at least one of the DMRS or the CRS; and demodulating the control information on the basis of the channel estimation, wherein when a subframe which is not available for the CRS exists in an MPDCCH repetition, the channel estimation is performed using only the DMRS.

7 Claims, 25 Drawing Sheets

Related U.S. Application Data

(60) Provisional application No. 62/716,970, filed on Aug. 9, 2018.

(51) Int. Cl.
*H04L 5/00* (2006.01)
*H04L 25/02* (2006.01)
*H04L 27/26* (2006.01)
*H04W 72/23* (2023.01)

(52) U.S. Cl.
CPC ........ *H04L 25/0224* (2013.01); *H04L 27/261* (2013.01); *H04W 4/70* (2018.02); *H04W 72/23* (2023.01)

(56) References Cited

U.S. PATENT DOCUMENTS

| | | |
|---|---|---|
| 2016/0127097 A1 | 5/2016 | Chen et al. |
| 2017/0019911 A1 | 1/2017 | Rico Alvarino et al. |
| 2021/0306049 A1 | 9/2021 | Kim et al. |

FOREIGN PATENT DOCUMENTS

| | | |
|---|---|---|
| WO | 2016182394 | 11/2016 |
| WO | 2016209833 | 12/2016 |

OTHER PUBLICATIONS

European Patent Office Application Serial No. 19848300.0, Search Report dated Jul. 22, 2021, 14 pages.
Qualcomm Incorporated., "Physical Downlink Control Channels," R1-155705, 3GPP TSG RAN WG1 #82 BIS, Oct. 2015, 9 pages.
Ericsson, "M-PDCCH link performance for MTC," R1-155031, 3GPP TSG RAN WG1 Meeting #82bis, Oct. 2015, 6 pages.
U.S. Appl. No. 17/266,047, Office Action dated Jul. 11, 2022, 12 pages.

* cited by examiner

SIB1-BR

METHOD FOR IMPROVING TRANSMISSION AND RECEPTION PERFORMANCE OF LTE MTC DOWNLINK CONTROL CHANNEL AND APPARATUS THEREFOR

CROSS-REFERENCE TO RELATED APPLICATIONS

This application is a continuation of U.S. patent application Ser. No. 17/266,047, filed on Feb. 4, 2021, which is the National Stage filing under 35 U.S.C. 371 of International Application No. PCT/KR2019/010154, filed on Aug. 9, 2019, which claims the benefit of U.S. Provisional Application No. 62/716,970, filed on Aug. 9, 2018, and also claims the benefit of earlier filing date and right of priority to Korean Application Nos. 10-2018-0116637, filed on Sep. 28, 2018, 10-2018-0133983, filed on Nov. 2, 2018, and 10-2019-0018253, filed on Feb. 15, 2019, the contents of which are all incorporated by reference herein in their entirety.

TECHNICAL FIELD

The present disclosure relates to a wireless communication system, and in more detail, a method for improving transmission/reception performance of LTE MTC MPDCCH (MTC (Machine Type Communication) Physical Downlink Control Channel), and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to provide a method to improve transmission/reception performance of MPDCCH (downlink control channel) of LTE-MTC.

The technical objects to attain in the present disclosure are not limited to the above-described technical objects and other technical objects which are not described herein will become apparent to those skilled in the art from the following description.

Technical Solution

The present disclosure provides a method to improve transmission/reception performance of MPDCCH (downlink control channel) of LTE-MTC.

Specifically, a method performed by a terminal for improving reception performance of LTE MTC downlink control channel comprises: receiving, from the base station, configuration information related to reception of a demodulation reference signal (DMRS) to which one of a plurality of candidate precoders applied to a cell specific reference signal (CRS) is applied; receiving, from the base station, the DMRS and control information through the MPDCCH based on the configuration information; performing channel estimation for the MPDCCH based on at least one of the DMRS or CRS; and demodulating the control information based on the channel estimation, wherein, based on there being a subframe that is not available for the CRS in the MPDCCH repetition, the channel estimation is performed using only the DMRS.

In addition, in the present disclosure, the subframe that is not available for the CRS is a multimedia broadcast single frequency network (MBSFN) subframe including an MBSFN region.

In addition, in the present disclosure, the channel estimation using only the DMRS is performed in the subframe that is not available for the CRS, in all subframes within the MPDCCH repetition, or in a subframe to which a same precoding is applied.

In addition, in the present disclosure, the plurality of candidate precoders are cycled in a specific unit and applied to the DMRS.

In addition, in the present disclosure, the CRS and the DMRS are mapped based on cycles of the plurality of candidate precoders.

In addition, in the present disclosure, a same precoder among the plurality of candidate precoders is repeatedly applied to the DMRS during a frequency hopping interval.

In addition, in the present disclosure, the control information is information indicating a power ratio between ports of the CRS and the DMRS.

Technical Effects

The present disclosure has an effect of deriving a performance improvement through a time interpolation method by using Long Term Evolution (LTE)-Cell Specific Reference Signal (CRS).

In addition, the present disclosure may improve the accuracy of channel estimation by providing a time interpolation method or an average value estimation method for H information using channel matrix information through MPDCCH DMRS and CRS.

In addition, the present disclosure has an effect of reducing noise by providing a method of applying a time interpolation and calculating an average value for the channel estimation result.

The technical effects of the present disclosure are not limited to the technical effects described above, and other technical effects not mentioned herein may be understood to those skilled in the art from the description below.

DESCRIPTION OF DRAWINGS

The accompanying drawings, which are included herein as a part of the description for help understanding the present disclosure, provide embodiments of the present disclosure, and describe the technical features of the present disclosure with the description below.

BEST MODE FOR INVENTION

Figure 1:
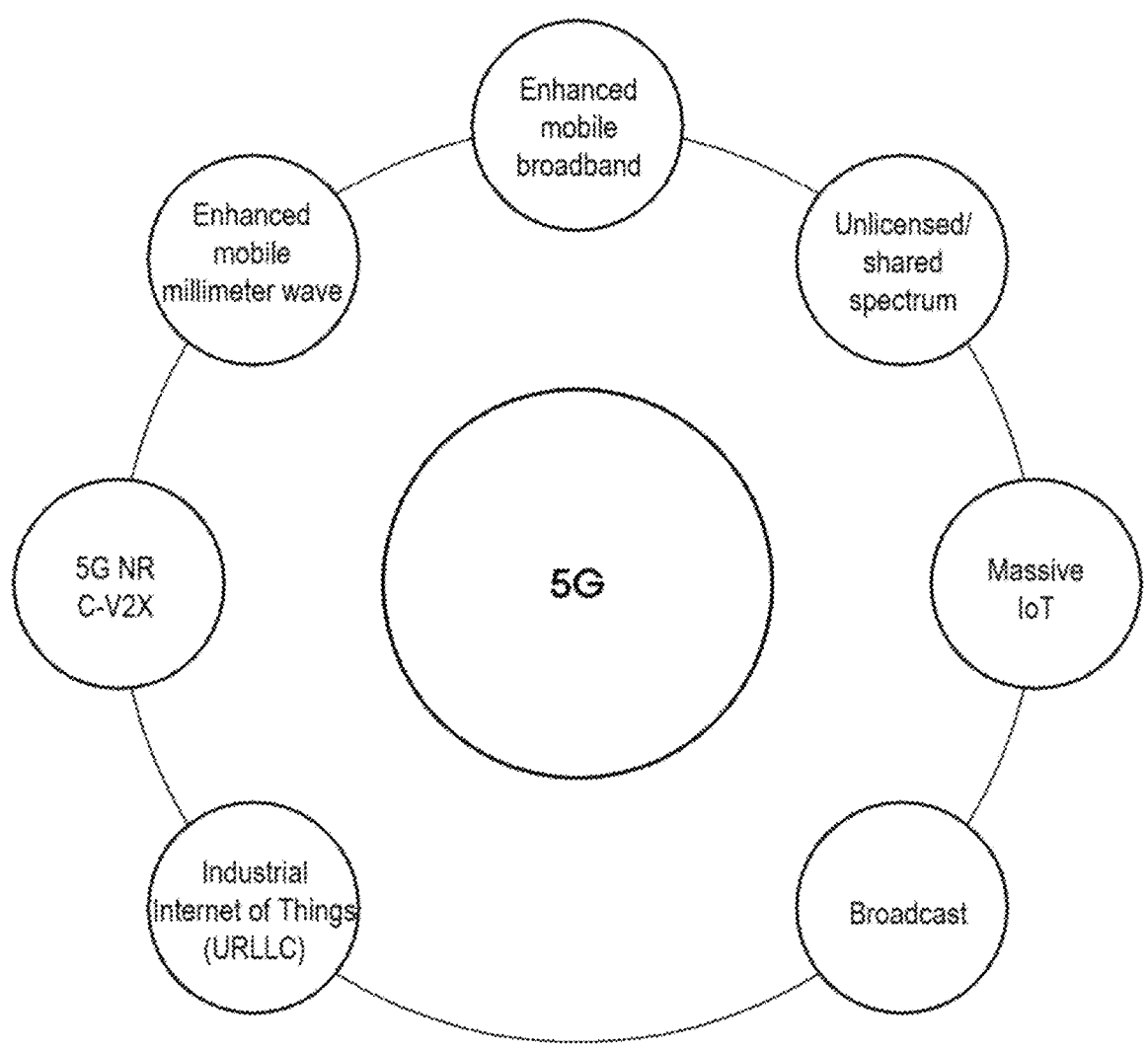
FIG. 1 is a diagram showing an example of a 5G scenario to which the present disclosure may be applied.

Some embodiments of the present disclosure are described in detail with reference to the accompanying drawings. A detailed description to be disclosed along with the accompanying drawings are intended to describe some exemplary embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical spirit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

<5G Scenario>

FIG. 1 is a diagram showing an example of a 5G scenario to which the present disclosure may be applied.

The three main requirements areas of 5G include (1) Enhanced Mobile Broadband (eMBB) area, (2) Massive Machine Type Communication (mMTC) area, and (3) Ultra-reliable and Low Latency Communications (URLLC) area.

In some use cases, multiple areas may be required for optimization, and other use cases may be focused on only one key performance indicator (KPI). 5G supports these various use cases in a flexible and reliable way.

eMBB goes far beyond basic mobile Internet access, covering rich interactive work, media and entertainment applications in the cloud or augmented reality. Data is one of the key drivers of 5G, and it may not be possible to see dedicated voice services for the first time in the 5G era. In 5G, voice is expected to be processed as an application program simply using the data connection provided by the communication system. The main reasons for the increased traffic volume are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to the user. Cloud storage and applications are rapidly increasing in mobile communication platforms, which can be applied to both work and entertainment. And, cloud storage is a special use case that drives the growth of the uplink data rate. 5G is also used for remote work in the cloud and requires much lower end-to-end latency to maintain a good user experience when tactile interfaces are used. Entertainment, for example, cloud gaming and video streaming is another key factor that is increasing the demand for mobile broadband capabilities. Entertainment is essential on smartphones and tablets anywhere, including high mobility environments such as trains, cars and airplanes. Another use case is augmented reality and information retrieval for entertainment. Here, augmented reality requires very low latency and an instantaneous amount of data.

In addition, one of the most anticipated 5G use cases concerns the ability to seamlessly connect embedded sensors in all fields, i.e. mMTC. By 2020, potential IoT devices are expected to reach 20.4 billion. Industrial IoT is one of the areas where 5G plays a major role in enabling smart cities, asset tracking, smart utilities, agriculture and security infrastructure.

URLLC includes new services that will transform the industry with ultra-reliable/low-latency links such as self-driving vehicles and remote control of critical infrastructure. The level of reliability and delay is essential for smart grid control, industrial automation, robotics, drone control and coordination.

Next, look at a number of examples in more detail.

5G can complement fiber-to-the-home (FTTH) and cable-based broadband (or DOCSIS) as a means of providing streams rated at hundreds of megabits per second to gigabits per second. These high speeds are required to deliver TVs in 4K or higher (6K, 8K and higher) resolutions as well as virtual and augmented reality. Virtual Reality (VR) and Augmented Reality (AR) applications involve almost immersive sports events. Certain application programs may require special network settings. For example, for VR games, game companies may need to integrate the core server with the network operator's edge network server to minimize latency.

Automotive is expected to be an important new driving force in 5G, with many use cases for mobile communication to vehicles. For example, entertainment for passengers demands simultaneous high capacity and high mobility mobile broadband. The reason is that future users will continue to expect high-quality connections, regardless of their location and speed. Another application example in the automotive field is an augmented reality dashboard. It identifies an object in the dark on top of what the driver sees through the front window and displays information that tells the driver about the distance and movement of the object. In the future, wireless modules enable communication between vehicles, exchange of information between the vehicle and supporting infrastructure, and exchange of information between the vehicle and other connected devices (e.g., devices carried by pedestrians). The safety system can lower the risk of an accident by guiding the driver through alternative courses of action to make driving safer. The next step will be a remote controlled or self-driven vehicle. It is very reliable and requires very fast communication between different self-driving vehicles and between the vehicle and the infrastructure. In the future, self-driving vehicles will perform all driving activities, and drivers will be forced to focus only on traffic anomalies that the vehicle itself cannot identify. The technical requirements of self-driving vehicles call for ultra-low latency and ultra-fast reliability to increase traffic safety to levels unachievable by humans.

Smart cities and smart homes, referred to as smart society, will be embedded with high-density wireless sensor networks. A distributed network of intelligent sensors will identify the conditions for cost and energy-efficient maintenance of a city or home. A similar setup can be done for each household. Temperature sensors, window and heating controllers, burglar alarms and appliances are all wirelessly connected. Many of these sensors are typically low data rates, low power and low cost. However, for example, real-time HD video may be required in certain types of devices for surveillance.

The consumption and distribution of energy including heat or gas is highly decentralized, requiring automated control of distributed sensor networks. The smart grid interconnects these sensors using digital information and communication technologies to gather information and act accordingly. This information can include the behavior of suppliers and consumers, allowing smart grids to improve efficiency, reliability, economics, sustainability of production and the distribution of fuels such as electricity in an automated manner. The smart grid can also be viewed as another low-latency sensor network.

The health sector has many applications that can benefit from mobile communications. The communication system can support telemedicine providing clinical care from remote locations. This can help reduce barriers to distance and improve access to medical services that are not consistently available in remote rural areas. It is also used to save lives in critical care and emergencies. A wireless sensor network based on mobile communication may provide sensors and remote monitoring of parameters such as heart rate and blood pressure.

Wireless and mobile communications are becoming increasingly important in industrial applications. Wiring is expensive to install and maintain. Thus, the possibility of replacing cables with reconfigurable wireless links is an attractive opportunity for many industries. However, achieving this requires that the wireless connection operates with a delay, reliability and capacity similar to that of the cable, and its management is simplified. Low latency and very low error probability are new requirements that need to be connected to 5G.

Logistics and freight tracking are important examples of use for mobile communications that enable tracking of inventory and packages from anywhere using location-based information systems. Logistics and freight tracking use cases typically require low data rates, but require a wide range and reliable location information.

<Artificial Intelligence (AI)>

Artificial intelligence refers to the field of researching artificial intelligence or the methodology to create it, and machine learning refers to the field of researching methodologies to define and solve various problems dealt with in the field of artificial intelligence. do. Machine learning is also defined as an algorithm that improves the performance of a task through continuous experience.

An Artificial neural network (ANN) is a model used in machine learning, and may refer to an overall model with problem-solving ability, which is composed of artificial neurons (nodes) that form a network by combining synapses. The artificial neural network may be defined by a connection pattern between neurons of different layers, a learning process for updating model parameters, and an activation function for generating an output value.

The artificial neural network may include input layer, output layer, and optionally one or more hidden layers. Each layer includes one or more neurons, and the artificial neural network may include neurons and synapses connecting neurons. In an artificial neural network, each neuron can output a function value of an activation function for input signals, weights, and biases input through synapses.

Model parameters refer to parameters that are determined through learning, and include weights of synaptic connections and biases of neurons. In addition, the hyperparameter refers to a parameter that must be set before learning in a machine learning algorithm, and includes a learning rate, iteration count, mini-batch size, and initialization function.

The purpose of learning artificial neural networks can be as determining model parameters that minimize the loss function. The loss function can be used as an index for determining an optimal model parameter in the learning process of the artificial neural network.

Machine learning can be classified into supervised learning, unsupervised learning, and reinforcement learning according to the learning method.

Supervised learning refers to a method of training an artificial neural network when a label for training data is given, and a label may mean the correct answer (or result value) that the artificial neural network must infer when training data is input to the artificial neural network. Unsupervised learning may mean a method of training an artificial neural network in a state where a label for training data is not given. Reinforcement learning may mean a learning method in which an agent defined in a certain environment learns to select an action or action sequence that maximizes the cumulative reward in each state.

Among artificial neural networks, machine learning implemented as a deep neural network (DNN) including a plurality of Hidden Layers is sometimes referred to as deep learning, and deep learning is a part of machine learning. Hereinafter, machine learning is used in the sense including deep learning.

<Robot>

A robot may refer to a machine that automatically processes or operates a task given by its own capabilities. In particular, a robot having a function of recognizing the environment and performing an operation by self-determining may be referred to as an intelligent robot.

Robots can be classified into industrial, medical, household, military, etc. depending on the purpose or field of use.

The robot may be provided with a driving unit including an actuator or a motor to perform various physical operations such as moving a robot joint. In addition, the movable robot includes a wheel, a brake, a propeller, and the like in a driving unit, and can travel on the ground or fly in the air through the driving unit.

<Self-Driving, Autonomous-Driving>

Autonomous driving refers to self-driving technology, and autonomous driving vehicle refers to a vehicle that is driven without a user's manipulation or with a user's minimal manipulation.

For example, in autonomous driving, a technology that maintains a driving lane, a technology that automatically adjusts the speed such as adaptive cruise control, a technology that automatically drives along a specified route, and a technology that automatically sets a route when a destination is set, etc. All of these can be included.

The vehicle includes all vehicles including only an internal combustion engine, a hybrid vehicle including an internal combustion engine and an electric motor, and an electric vehicle including only an electric motor, and may include not only automobiles, but also trains and motorcycles.

In this case, the autonomous vehicle can be viewed as a robot having an autonomous driving function.

<Extended Reality (XR)>

The extended reality collectively refers to virtual reality (VR), augmented reality (AR), and mixed reality (MR). VR technology provides only CG images of real world objects or backgrounds, AR technology provides virtually created CG images on top of real object images, and MR technology is a computer graphic technology that mixes and combines virtual objects in the real world.

MR technology is similar to AR technology in that it shows real and virtual objects together. However, in AR technology, virtual objects are used in a form that complements real objects, whereas in MR technology, virtual objects and real objects are used with equal characteristics.

XR technology can be applied to HMD (Head-Mount Display), HUD (Head-Up Display), mobile phones, tablet PCs, laptops, desktops, TVs, digital signage, etc., and devices applied with XR technology may be called as XR devices.

Figure 2:
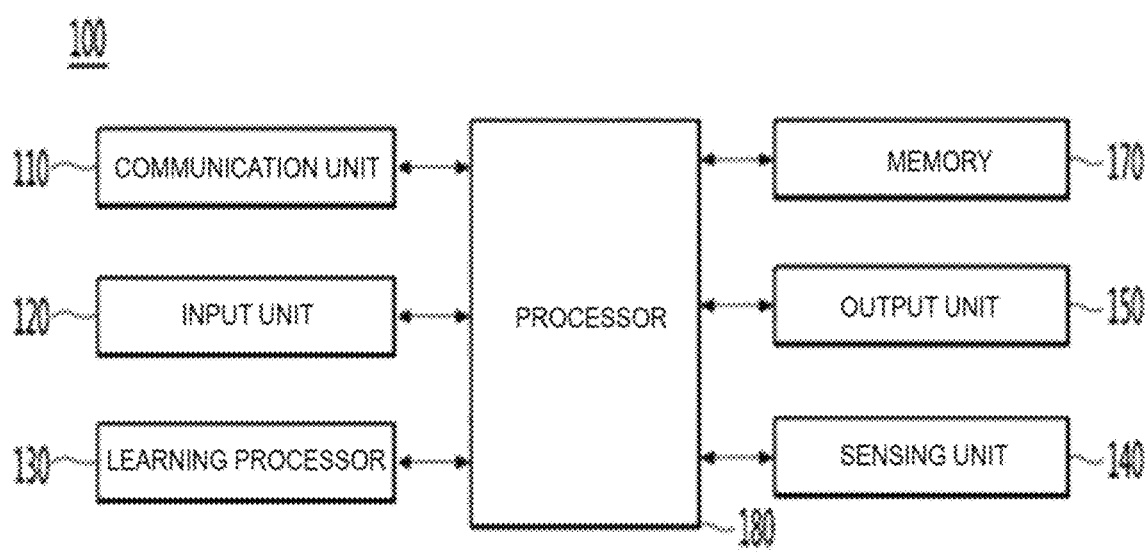
FIG. 2 shows an AI device 100 according to an embodiment of the present disclosure.

FIG. 2 illustrates an AI device 100 according to an embodiment of the present disclosure.

The AI device 100 may be implemented as a fixed device or a movable device such as a TV, a projector, a mobile phone, a smartphone, a desktop computer, a laptop computer, a digital broadcasting terminal, a personal digital assistants (PDA), a portable multimedia player (PMP), a navigation, a tablet PC, a wearable device, a set-top box (STB), a DMB receiver, a radio, a washing machine, a refrigerator, a desktop computer, a digital signage, a robot, a vehicle, and the like.

Referring to FIG. 2, the terminal 100 may include a communication unit 110, an input unit 120, a learning processor 130, a sensing unit 140, an output unit 150, a memory 170, and a processor 180.

The communication unit 110 may transmit and receive data with external devices such as other AI devices 100*a* to 100*e* or the AI server 200 using wired/wireless communication technology. For example, the communication unit 110 may transmit and receive sensor information, a user input, a learning model, and a control signal with external devices.

Here, the communication technologies used by the communication unit 110 include Global System for Mobile communication (GSM), Code Division Multi Access (CDMA), Long Term Evolution (LTE), 5G, Wireless LAN (WLAN), and Wireless-Fidelity (Wi-Fi), Bluetooth™, Radio Frequency Identification (RFID), Infrared Data Association (IrDA), ZigBee, and Near Field Communication (NFC) and the like.

The input unit 120 may acquire various types of data.

Here, the input unit 120 may include a camera for inputting an image signal, a microphone for receiving an audio signal, and a user input unit for receiving information from a user. Here, by treating a camera or microphone as a sensor, a signal acquired from the camera or microphone may be referred to as sensing data or sensor information.

The input unit 120 may acquire input data to be used when acquiring an output by using training data for model training and the training model. The input unit 120 may obtain unprocessed input data, and in this case, the processor 180 or the learning processor 130 may extract an input feature as a pre-process for the input data.

The learning processor 130 may train a model composed of an artificial neural network using the training data. Here, the learned artificial neural network may be referred to as a learning model. The learning model can be used to infer a result value for new input data other than the training data, and the inferred value can be used as a basis for a decision to perform a certain operation.

In this case, the learning processor 130 may perform AI processing together with the learning processor 240 of the AI server 200.

Here, the learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 may acquire at least one of internal information of the AI device 100, information on the surrounding environment of the AI device 100, and user information by using various sensors.

Here, the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and a lidar, a radar, etc.

The output unit 150 may generate output related to visual, auditory or tactile sense.

Here, the output unit 150 may include a display unit that outputs visual information, a speaker that outputs auditory information, and a haptic module that outputs tactile information.

The memory 170 may store data supporting various functions of the AI device 100. For example, the memory 170 may store input data, training data, a learning model, and a learning history acquired from the input unit 120.

The processor 180 may determine at least one executable operation of the AI device 100 based on information determined or generated using a data analysis algorithm or a machine learning algorithm. Further, the processor 180 may perform a determined operation by controlling the components of the AI device 100.

To this end, the processor 180 may request, search, receive, or utilize data from the learning processor 130 or the memory 170, and may control the components of the AI device 100 to perform a predicted or desirable operation among the at least one executable operation.

Here, if connection of an external device is required to perform the determined operation, the processor 180 may generate a control signal for controlling the corresponding external device and transmit the generated control signal to the corresponding external device.

The processor 180 may obtain intention information for a user input, and determine a user's requirement based on the obtained intention information.

Here, the processor 180 may obtain intention information corresponding to the user input by using at least one of a Speech To Text (STT) engine for converting a speech input into a character string or a Natural Language Processing (NLP) engine for obtaining intention information of a natural language.

Here, at least one or more of the STT engine and the NLP engine may be composed of an artificial neural network at least partially trained according to a machine learning algorithm. In addition, at least one of the STT engine or the NLP engine may be learned by the learning processor 130, learned by the learning processor 240 of the AI server 200, or learned by distributed processing thereof.

The processor 180 may collect history information including user feedback on the operation content or operation of the AI device 100, and store it in the memory 170 or the learning processor 130, or transfer to an external device such as the AI server 200. The collected historical information can be used to update the learning model.

The processor 180 may control at least some of the components of the AI device 100 to drive an application program stored in the memory 170. Further, the processor 180 may operate by combining two or more of the components included in the AI device 100 to drive the application program.

Figure 3:
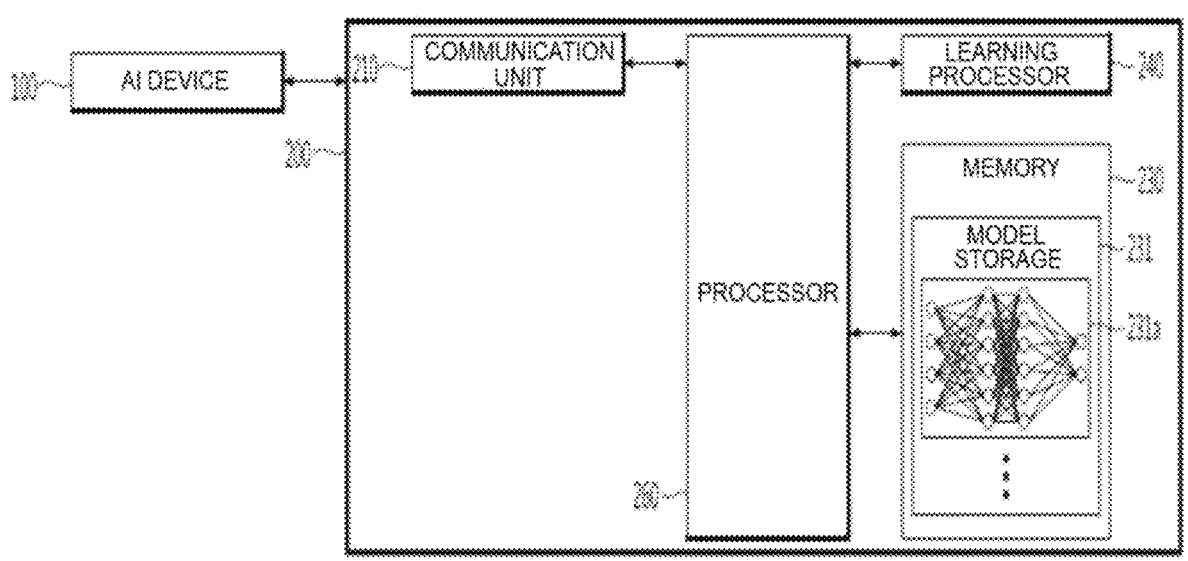
FIG. 3 shows an AI server 200 according to an embodiment of the present disclosure.

FIG. 3 illustrates an AI server 200 according to an embodiment of the present disclosure.

Referring to FIG. 3, the AI server 200 may refer to a device that trains an artificial neural network using a machine learning algorithm or uses the learned artificial neural network. Here, the AI server 200 may be composed of a plurality of servers to perform distributed processing, or may be defined as a 5G network. In this case, the AI server 200 may be included as a part of the AI device 100 to perform at least part of AI processing together.

The AI server 200 may include a communication unit 210, a memory 230, a learning processor 240, and a processor 260.

The communication unit 210 may transmit and receive data with an external device such as the AI device 100.

The memory 230 may include a model storage 231. The model storage 231 may store a model (or artificial neural network, 231*a*) being trained or trained through the learning processor 240.

The learning processor 240 may train the artificial neural network 231*a* using the training data. The learning model may be used while being mounted on the AI server 200 of an artificial neural network, or may be mounted on an external device such as the AI device 100 and used.

The learning model can be implemented in hardware, software, or a combination of hardware and software. When part or all of the learning model is implemented in software, one or more instructions constituting the learning model may be stored in the memory 230.

The processor 260 may infer a result value for new input data using the learning model, and generate a response or a control command based on the inferred result value.

Figure 4:
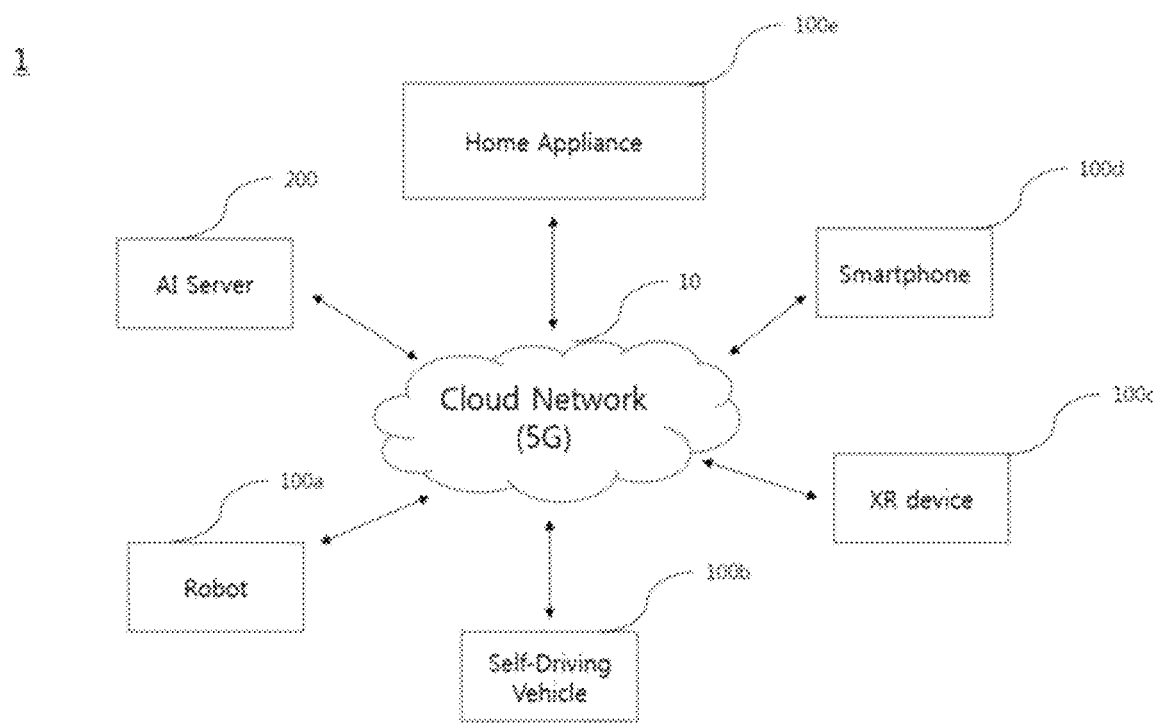
FIG. 4 shows an AI system 1 according to an embodiment of the present disclosure.

FIG. 4 illustrates an AI system 1 according to an embodiment of the present disclosure.

Referring to FIG. 4, the AI system 1 includes at least one of an AI server 200, a robot 100a, a self-driving (autonomous) vehicle 100b, an XR device 100c, a smartphone 100d, or a home appliance 100e. connected with the cloud network 10. Here, the robot 100a to which the AI technology is applied, the self-driving vehicle 100b, the XR device 100c, the smart phone 100d, or the home appliance 100e may be referred to as the AI devices 100a to 100e.

The cloud network 10 may constitute a part of the cloud computing infrastructure or may mean a network that exists in the cloud computing infrastructure. Here, the cloud network 10 may be configured using a 3G network, a 4G or long term evolution (LTE) network, or a 5G network.

That is, the devices 100a to 100e and 200 constituting the AI system 1 may be connected to each other through the cloud network 10. In particular, the devices 100a to 100e and 200 may communicate with each other through a base station, but may communicate with each other directly without through a base station.

The AI server 200 may include a server that performs AI processing and a server that performs an operation on big data.

The AI server 200 is connected through the cloud network 10 with at least one of the robot 100a, the self-driving vehicle 100b, the XR device 100c, the smartphone 100d, or a the home appliance 100e, which are AI devices constituting the AI system 1 and may help at least part of the AI processing of the connected AI devices 100a to 100e.

In this case, the AI server 200 may train an artificial neural network according to a machine learning algorithm in place of the AI devices 100a to 100e, and may directly store the learning model or transmit it to the AI devices 100a to 100e.

At this time, the AI server 200 may receive input data from the AI devices 100a to 100e, infer a result value for the received input data using a learning model, and generate a response or a control command based on the inferred result value, and transmit it to the AI devices 100a to 100e.

Alternatively, the AI devices 100a to 100e may infer a result value for input data using a direct learning model and generate a response or a control command based on the inferred result value.

Hereinafter, various embodiments of the AI devices 100a to 100e to which the above-described technology is applied will be described. Here, the AI devices 100a to 100e shown in FIG. 3 may be as a specific example of the AI device 100 shown in FIG. 1.

<AI+Robot>

The robot 100a is applied with AI technology and may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implementing the same as hardware.

The robot 100a may acquire status information of the robot 100a using sensor information obtained from various types of sensors, detect (recognizes) surrounding environments and objects, generate map data, decide a moving route and a driving plan, decide a response to user interaction, or decide an action.

Here, the robot 100a may use sensor information obtained from at least one sensor among a lidar, a radar, and a camera in order to determine the moving route and the driving plan.

The robot 100a may perform the above operations using a learning model composed of at least one artificial neural network. For example, the robot 100a may recognize a surrounding environment and an object using a learning model, and may determine an operation using the recognized surrounding environment information or object information. Here, the learning model may be directly learned by the robot 100a or learned by an external device such as the AI server 200.

Here, the robot 100a may perform an operation by generating a result using a direct learning model, but it may transmit sensor information to an external device such as the AI server 200 and perform the operation by receiving the result generated accordingly.

The robot 100a may determine the moving route and the driving plan using at least one of map data, object information detected from sensor information, or object information obtained from an external device, and may control the driving unit to drive the robot 100a according to the determined moving route and driving plan.

The map data may include object identification information on various objects arranged in a space in which the robot 100a moves. For example, the map data may include object identification information on fixed objects such as walls and doors and movable objects such as flower pots and desks. In addition, the object identification information may include a name, type, distance, and location.

In addition, the robot 100a may perform an operation or run by controlling a driving unit based on a user's control/interaction. In this case, the robot 100a may acquire interaction intention information according to a user's motion or voice speech, and determine a response based on the obtained intention information to perform the operation.

<AI+Autonomous Driving>

The self-driving (autonomous) vehicle 100b may be implemented as a mobile robot, vehicle, or unmanned aerial vehicle by applying AI technology.

The self-driving vehicle 100b may include an autonomous driving control module for controlling an autonomous driving function, and the autonomous driving control module may refer to a software module or a chip implementing the same as hardware. The autonomous driving control module may be included inside as a configuration of the self-driving vehicle 100b, but may be configured as separate hardware and connected to the exterior of the self-driving vehicle 100b.

The self-driving vehicle 100b may acquire status information of the self-driving vehicle 100b using sensor information obtained from various types of sensors, detect (recognizes) surrounding environments and objects, generate map data, decide a moving route and a driving plan, decide a response to user interaction, or decide an action.

Here, the self-driving vehicle 100b may use sensor information obtained from at least one sensor among a lidar, a radar, and a camera, similar to the robot 100a, in order to determine the moving route and the driving plan.

In particular, the self-driving vehicle 100b may recognize an environment or object in an area where the field of view is obscured or an area greater than a certain distance by receiving sensor information from external devices or directly recognized information from external devices.

The self-driving vehicle 100*b* may perform the above operations using a learning model composed of at least one artificial neural network. For example, the self-driving vehicle 100*b* may recognize a surrounding environment and an object using a learning model, and may determine a driving path using the recognized surrounding environment information or object information. Here, the learning model may be directly learned by the self-driving vehicle 100*b* or learned by an external device such as the AI server 200.

Here, the self-driving vehicle 100*b* may perform an operation by generating a result using a direct learning model, but it may transmit sensor information to an external device such as the AI server 200 and perform the operation by receiving the result generated accordingly.

The self-driving vehicle 100*b* may determine the moving route and the driving plan using at least one of map data, object information detected from sensor information, or object information obtained from an external device, and may control the driving unit to drive the self-driving vehicle 100*b* according to the determined moving route and driving plan.

The map data may include object identification information on various objects arranged in a space (e.g., road) in which the self-driving (autonomous) vehicle 100*b* moves. For example, the map data may include object identification information on fixed objects such as street lights, rocks, and buildings and movable objects such as vehicles and pedestrians. In addition, the object identification information may include a name, type, distance, and location.

In addition, the self-driving vehicle 100*b* may perform an operation or drive by controlling a driving unit based on a user's control/interaction. In this case, the self-driving vehicle 100*b* may acquire interaction intention information according to a user's motion or voice speech, and determine a response based on the obtained intention information to perform the operation.

<AI+XR>

The XR device 100*c* is applied with AI technology, and may be implemented as HMD (Head-Mount Display), HUD (Head-Up Display) provided in the vehicle, a TV, a mobile phone, a smart phone, a computer, a wearable device, a home appliance, a digital signage, a vehicle, a fixed robot or a mobile robot.

The XR device 100*c* may acquire information on a surrounding space or a real object by analyzing 3D point cloud data or image data acquired through various sensors or from an external device to generate location data and attribute data for 3D points, and may render the XR object to be displayed to output. For example, the XR apparatus 100*c* may output an XR object including additional information on the recognized object corresponding to the recognized object.

The XR apparatus 100*c* may perform the above operations using a learning model composed of at least one artificial neural network. For example, the XR device 100*c* may recognize a real object from 3D point cloud data or image data using a learning model, and may provide information corresponding to the recognized real object. Here, the learning model may be directly learned by the XR device 100*c* or learned by an external device such as the AI server 200.

At this time, the XR device 100*c* may directly generate a result using a learning model to perform an operation, but may also transmit sensor information to an external device such as the AI server 200 and receive the generated result to perform the operation.

<AI+Robot+Autonomous Driving>

The robot 100*a* may be implemented as a guide robot, a transport robot, a cleaning robot, a wearable robot, an entertainment robot, a pet robot, an unmanned flying robot, etc. by applying AI technology and autonomous driving technology.

The robot 100*a* to which AI technology and autonomous driving technology are applied may refer to a robot having an autonomous driving function or a robot 100*a* interacting with the self-driving vehicle 100*b*.

The robot 100*a* having an autonomous driving function may collectively refer to devices that move by themselves according to a given movement line without the user's control or by determining the movement line by themselves.

The robot 100*a* having an autonomous driving function and the self-driving vehicle 100*b* may use a common sensing method to determine one or more of a moving route or a driving plan. For example, the robot 100*a* having an autonomous driving function and the self-driving vehicle 100*b* may determine one or more of a movement route or a driving plan using information sensed through a lidar, a radar, and a camera.

The robot 100*a* interacting with the self-driving vehicle 100*b* exists separately from the self-driving vehicle 100*b* and may be linked to an autonomous driving function inside or outside the autonomous driving vehicle 100*b*, or may perform an operation associated with the user on board in the self-driving vehicle 100*b*.

Here, the robot 100*a* interacting with the self-driving vehicle 100*b* may control or assist the autonomous driving function of the self-driving vehicle 100*b* by acquiring sensor information on behalf of the self-driving (autonomous) vehicle 100*b* to provide it to the self-driving vehicle 100*b*, or acquiring sensor information and generating object information on the surrounding environment to provide it to the self-driving vehicle 100*b*.

Alternatively, the robot 100*a* interacting with the self-driving vehicle 100*b* may monitor a user in the self-driving vehicle 100*b* or control functions of the self-driving vehicle 100*b* through interaction with the user. For example, when it is determined that the driver is in a drowsy state, the robot 100*a* may activate an autonomous driving function of the self-driving vehicle 100*b* or assist in controlling the driving unit of the self-driving vehicle 100*b*. Here, the functions of the self-driving vehicle 100*b* controlled by the robot 100*a* may include not only an autonomous driving function, but also functions provided by a navigation system or an audio system provided inside the self-driving vehicle 100*b*.

Alternatively, the robot 100*a* interacting with the self-driving vehicle 100*b* may provide information or assist a function to the self-driving vehicle 100*b* from outside of the self-driving vehicle 100*b*. For example, the robot 100*a* may provide traffic information including signal information to the self-driving vehicle 100*b*, such as a smart traffic light, or automatically connect an electric charger to the charging port by interacting with the self-driving vehicle 100*b*, such as an automatic electric charger for an electric vehicle.

<AI+Robot+XR>

The robot 100*a* may be implemented as a guide robot, a transport robot, a cleaning robot, a wearable robot, an entertainment robot, a pet robot, an unmanned flying robot, a drone, etc. by applying AI technology and XR technology.

The robot 100*a* to which the XR technology is applied may refer to a robot to be controlled/interacted within an XR image. In this case, the robot 100*a* is distinguished from the XR device 100*c* and may be interacted with each other.

When the robot 100*a*, which is the object of control/interaction in the XR image, acquires sensor information from sensors including a camera, the robot 100*a* or the XR device 100*c* may generate an XR image based on the sensor information, and XR device 100*c* may output the generated XR image. In addition, the robot 100*a* may operate based on a control signal input through the XR device 100*c* or a user's interaction.

For example, the user may check the XR image corresponding to the viewpoint of the robot 100*a* linked remotely through an external device such as the XR device 100*c*, and may adjust the autonomous driving path of the robot 100*a* through the interaction, or control motion or driving, or check information on surrounding objects.

<AI+Autonomous Driving+XR>

The self-driving (autonomous) vehicle 100*b* may be implemented as a mobile robot, a vehicle, or an unmanned aerial vehicle by applying AI technology and XR technology.

The self-driving vehicle 100*b* to which the XR technology is applied may mean an autonomous driving vehicle including a means for providing an XR image, or an autonomous driving vehicle that is an object of control/interaction within the XR image. In particular, the self-driving vehicle 100*b*, which is an object of control/interaction in the XR image, is distinguished from the XR device 100*c* and may be interacted with each other.

The self-driving vehicle 100*b* having a means for providing an XR image may acquire sensor information from sensors including a camera, and may output an XR image generated based on the acquired sensor information. For example, the self-driving vehicle 100*b* may provide an XR object corresponding to a real object or an object in a screen to the occupant by outputting an XR image with a HUD.

In this case, when the XR object is output to the HUD, at least a part of the XR object may be output to overlap the actual object facing the occupant's gaze. On the other hand, when the XR object is output on a display provided inside the self-driving vehicle 100*b*, at least a part of the XR object may be output to overlap an object in the screen. For example, the self-driving vehicle 100*b* may output XR objects corresponding to objects such as lanes, other vehicles, traffic lights, traffic signs, motorcycles, pedestrians, and buildings.

When the self-driving vehicle 100*b*, which is an object of control/interaction in the XR image, acquires sensor information from sensors including a camera, the self-driving vehicle 100*b* or the XR device 100*c* may generate an XR image based on the sensor information, and output the generated XR image. In addition, the self-driving vehicle 100*b* may operate based on a control signal input through an external device such as the XR device 100*c* or a user's interaction.

<Example of Communication System to which the Present Disclosure is Applied>

Figure 5:
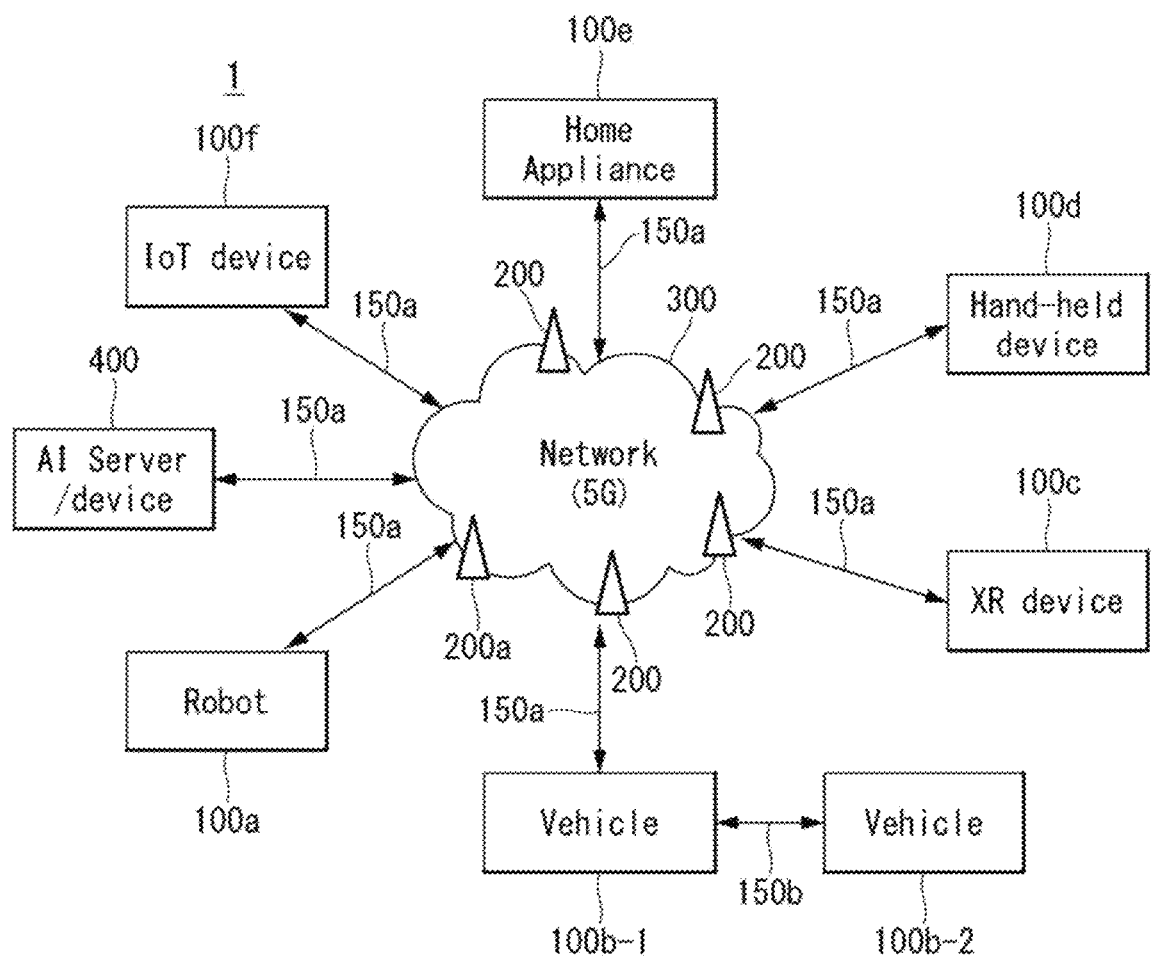
FIG. 5 illustrates a communication system 1 applied to the present disclosure.

FIG. 5 illustrates a communication system 1 to which the present disclosure is applied.

Referring to FIG. 5, a communication system 1 applied to the present disclosure includes a wireless device, a base station, and a network. Here, the wireless device means a device that performs communication using a wireless access technology (e.g., 5G NR (New RAT), LTE (Long Term Evolution)), and may be referred to as a communication/wireless/5G device. Although not limited thereto, the wireless device may include robots 100*a*, vehicles 100*b*-1 and 100*b*-2, an extended reality (XR) device 100*c*, a hand-held device 100*d*, and a home appliance 100*e*. an Internet of Thing (IoT) device (1000, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). The XR device includes AR (Augmented Reality)/VR (Virtual Reality)/MR (Mixed Reality) devices, and it may be implemented in the form of a HMD (Head-Mounted Device), a HUD (Head-Up Display) in a vehicle, a TV, a smartphone, a computer, a wearable device, a home appliance, a digital signage, a vehicle, a robot, and the like. The hand-held device may include a smart phone, a smart pad, a wearable device (e.g., a smart watch, a smart glass), a computer (e.g., a notebook computer, etc.). The home appliance may include a TV, a refrigerator, a washing machine, and the like. The IoT device may include a sensor, a smart meter, and the like. For example, the base station and the network may be implemented as a wireless device, and the specific wireless device 200*a* may operate as a base station/network node to other wireless devices.

The wireless devices 100*a* to 100*f* may be connected to the network 300 through the base station 200. AI (Artificial Intelligence) technology may be applied to the wireless devices 100*a* to 100*f*, and the wireless devices 100*a* to 100*f* may be connected to the AI server 400 through the network 300. The network 300 may be configured using a 3G network, a 4G (e.g., LTE) network, or a 5G (eg, NR) network, and the like. The wireless devices 100*a* to 100*f* may communicate with each other through the base station 200/network 300, but may communicate directly (e.g. sidelink communication) without passing through the base station/network. For example, the vehicles 100*b*-1 and 100*b*-2 may perform direct communication (e.g. V2V (Vehicle to Vehicle)/V2X (Vehicle to everything) communication). In addition, the IoT device (e.g., sensor) may directly communicate with other IoT devices (e.g., sensors) or other wireless devices 100*a* to 100*f*.

Wireless communication/connections 150*a*, 150*b*, and 150*c* may be established between the wireless devices 100*a* to 100*f*/base station 200 and the base station 200/base station 200. Here, wireless communication/connection may be achieved through various wireless access technologies (e.g. 5G NR) such as uplink/downlink communication 150*a*, sidelink communication 150*b* (or D2D communication), base station communication 150*c* (e.g., relay, Integrated Access Backhaul (IAB)). Through wireless communication/connections 150*a*, 150*b*, 150*c*, the wireless device and the base station/wireless device, and the base station and the base station can transmit/receive radio signals to each other. For example, the wireless communication/connection 150*a*, 150*b*, 150*c* may transmit/receive signals through various physical channels. To this end, based on various proposals of the present disclosure, for transmitting/receiving radio signals, at least some of a process of configuring various configuration information, various signal processing processes (e.g., channel encoding/decoding, modulation/demodulation, resource mapping/demapping, etc.), and resource allocation process may be performed.

<Example of Device to which the Present Disclosure is Applied>

Figure 6:
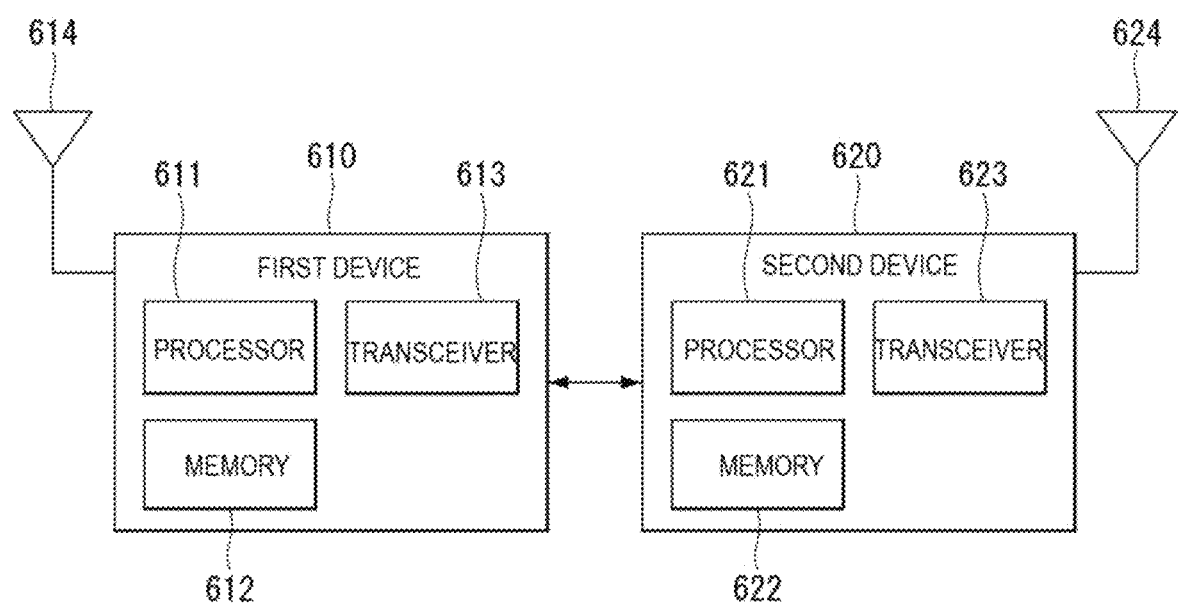
FIG. 6 illustrates a wireless communication device according to some embodiments of the present disclosure.

FIG. 6 illustrates a wireless communication device according to some embodiments of the present disclosure.

Referring to FIG. 6, the wireless communication system may include a first device 610 and a second device 620.

The first device 610 includes a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), an AI (Artificial Intelligence) module, a robot, an Augmented Reality (AR) device, a Virtual Reality (VR) device, a Mixed Reality (MR) device, a hologram device, a public safety device, a MTC device, an IoT device, a medical device, a FinTech device (or financial device), a security device, a climate/environment device, a device related to 5G service, or a device related to the 4th industrial revolution field.

The second device 620 includes a base station, a network node, a transmitting terminal, a receiving terminal, a wireless device, a wireless communication device, a vehicle, a vehicle equipped with an autonomous driving function, a connected car, a drone (Unmanned Aerial Vehicle, UAV), an AI (Artificial Intelligence) module, a robot, an Augmented Reality (AR) device, a Virtual Reality (VR) device, a Mixed Reality (MR) device, a hologram device, a public safety device, a MTC device, an IoT device, a medical device, a FinTech device (or financial device), a security device, a climate/environment device, a device related to 5G service, or a device related to the 4th industrial revolution field.

For example, the terminal may include a mobile phone, a smart phone, a laptop computer, a digital broadcasting terminal, a personal digital assistants (PDA), a portable multimedia player (PMP), a navigation system, a slate PC, and a tablet PC, a ultrabook, a wearable device (for example, a watch-type terminal (smartwatch), glass-type terminal (smart glass), HMD (head mounted display)), and the like. For example, the HMD may be a display device worn on the head. For example, HMD can be used to implement VR, AR or MR.

For example, a drone may be a vehicle that is not a human being and is flying by a radio control signal. For example, the VR device may include a device that implements an object or a background of a virtual world. For example, the AR device may include a device that connects an object or background of a virtual world to an object or background of the real world and implements it. For example, the MR device may include a device that combines and implements an object or background of a virtual world to an object or background of the real world. For example, the hologram device may include a device that implements a 360-degree stereoscopic image by recording and reproducing stereoscopic information by utilizing an interference phenomenon of light generated when two laser lights meet, called holography. For example, the public safety device may include an image relay device or an image device wearable on a user's human body. For example, the MTC device and the IoT device may be devices that do not require direct human intervention or manipulation. For example, the MTC device and the IoT device may include a smart meter, a bending machine, a thermometer, a smart light bulb, a door lock, or various sensors. For example, the medical device may be a device used for the purpose of diagnosing, treating, alleviating, treating or preventing a disease. For example, the medical device may be a device used for the purpose of diagnosing, treating, alleviating or correcting an injury or disorder. For example, a medical device may be a device used for the purpose of examining, replacing or modifying a structure or function. For example, the medical device may be a device used for the purpose of controlling pregnancy. For example, the medical device may include a device for treatment, a device for surgery, a device for (extracorporeal) diagnosis, a hearing aid or a device for procedure. For example, the security device may be a device installed to prevent a risk that may occur and maintain safety. For example, the security device may be a camera, CCTV, recorder, or black box. For example, the fintech device may be a device capable of providing financial services such as mobile payment. For example, the fintech device may include a payment device or a point of sales (POS). For example, the climate/environment device may include a device that monitors or predicts the climate/environment.

The first device 610 may include at least one or more processors such as the processor 611, at least one or more memories such as the memory 612, and at least one or more transceivers such as the transceiver 613. The processor 611 may perform the functions, procedures, and/or methods described above. The processor 611 may perform one or more protocols. For example, the processor 611 may perform one or more layers of a radio interface protocol. The memory 612 is connected to the processor 611 and may store various types of information and/or commands. The transceiver 613 may be connected to the processor 611 and controlled to transmit and receive radio signals.

The second device 620 may include at least one or more processors such as the processor 621, at least one or more memories such as the memory 622, and at least one or more transceivers such as the transceiver 623. The processor 621 may perform the functions, procedures, and/or methods described above. The processor 621 may perform one or more protocols. For example, the processor 621 may perform one or more layers of a radio interface protocol. The memory 622 is connected to the processor 621 and may store various types of information and/or commands. The transceiver 623 may be connected to the processor 621 and controlled to transmit and receive radio signals.

The memory 612 and/or the memory 622 may be connected inside or outside the processor 611 and/or the processor 621, respectively, and also be connected to other processors through various technologies such as wired or wireless connection.

The first device 610 and/or the second device 620 may have one or more antennas. For example, the antenna 614 and/or the antenna 624 may be configured to transmit and receive wireless signals.

Figure 7:
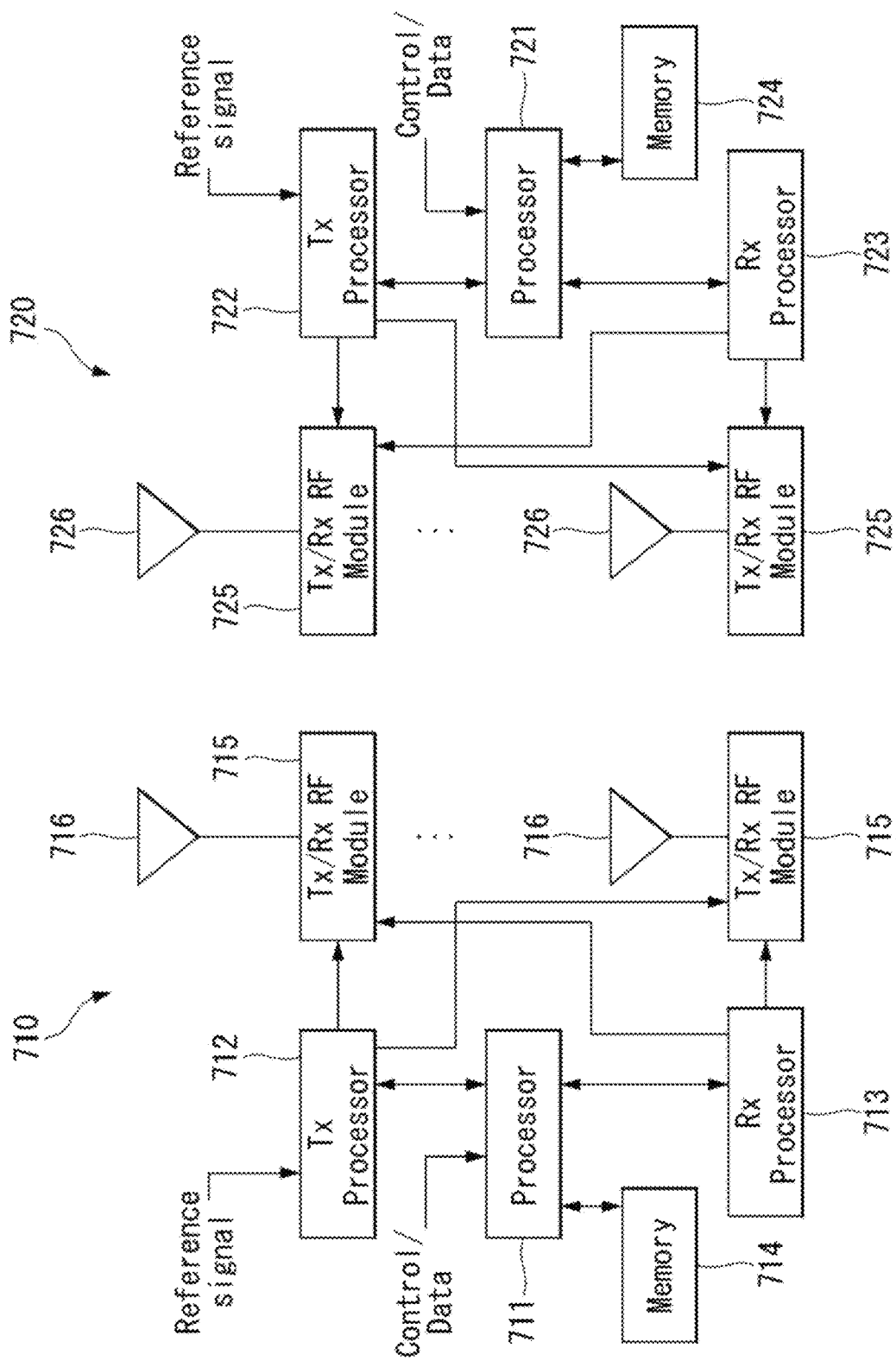
FIG. 7 is another example of a block diagram of a wireless communication device according to some embodiments of the present disclosure.

FIG. 7 is another example of a block diagram of a radio communication device according to some embodiments of the present disclosure.

In reference to FIG. 7, a radio communication system includes a base station 710 and a plurality of terminals 720 positioned in a region of a base station. A base station may be represented as a transmission device and a terminal may be represented as a reception device, and vice versa. A base station and a terminal include processors 711 and 721, memories 714 and 724, one or more Tx/Rx radio frequency (RF) modules 715 and 725, Tx processors 712 and 722, Rx processors 713 and 723 and antennas 716 and 726. A processor implements the above-described function, process and/or method. In more detail, an upper layer packet from a core network is provided for a processor 711 in a DL (a communication from a base station to a terminal). A processor implements a function of a L2 layer. In a DL, a processor provides radio resource allocation and multiplexing between a logical channel and a transmission channel for a terminal 720 and takes charge of signaling to a terminal. A transmission (TX) processor 712 implements a variety of signal processing functions for a L1 layer (e.g., a physical layer). A signal processing function facilitates forward error correction (FEC) in a terminal and includes coding and interleaving. An encoded and modulated symbol is partitioned into parallel streams, and each stream is mapped to an OFDM subcarrier, is multiplexed with a reference signal (RS) in a time and/or frequency domain and is combined together by using Inverse Fast Fourier Transform (IFFT) to generate a physical channel which transmits a time domain OFDMA symbol stream. An OFDM stream is spatially precoded to generate a multiple spatial stream. Each spatial stream may be provided for a different antenna 716 in each Tx/Rx module (or a transmitter-receiver 715). Each Tx/Rx module may modulate a RF carrier in each spatial stream for transmission. In a terminal, each Tx/Rx module (or a transmitter-receiver 725) receives a signal through each antenna 726 of each Tx/Rx module. Each Tx/Rx module reconstructs information modulated by a RF carrier to provide it for a reception (RX) processor 722. A RX processor implements a variety of signal processing functions of a layer 1. A RX processor may perform a spatial processing for information to reconstruct an arbitrary spatial stream heading for a terminal. When a plurality of spatial streams head for a terminal, they may be combined into a single OFDMA symbol stream by a plurality of RX processors. A RX processor transforms an OFDMA symbol stream from a time domain to a frequency domain by using Fast Fourier Transform (FFT). A frequency domain signal includes an individual OFDMA symbol stream for each subcarrier of an OFDM signal. Symbols and a reference signal in each subcarrier are reconstructed and demodulated by determining the most probable signal arrangement points transmitted by a base station. Such soft decisions may be based on channel estimated values. Soft decisions are decoded and deinterleaved to reconstruct data and a control signal transmitted by a base station in a physical channel. The corresponding data and control signal are provided for a processor 721.

An UL (a communication from a terminal to a base station) is processed in a base station 710 by a method similar to that described in a terminal 720 in relation to a function of a receiver. Each Tx/Rx module 725 receives a signal through each antenna 726. Each Tx/Rx module provides a RF carrier and information for a RX processor 723. A processor 721 may be related to a memory 724 which stores a program code and data. A memory may be referred to as a computer readable medium.

<General LTE System>

Figure 8:
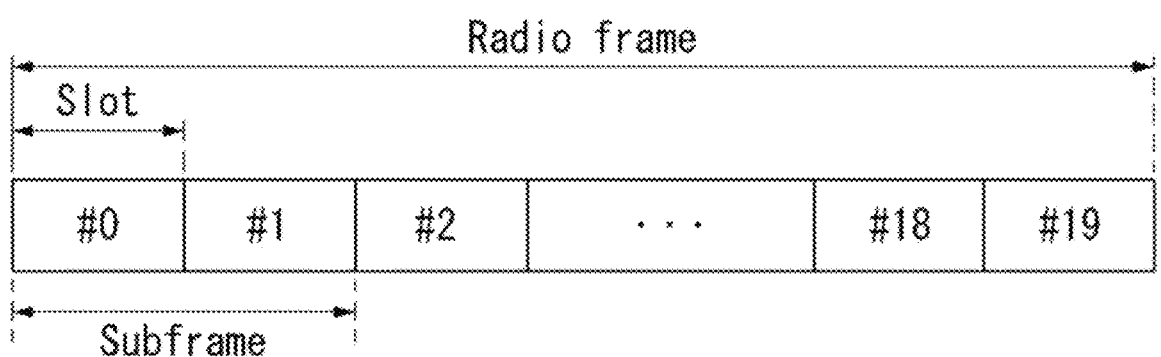
FIG. 8 is a diagram illustrating an example of an LTE radio frame structure.

FIG. 8 is a diagram illustrating an example of the structure of a radio frame of LTE.

In FIG. 8, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 9:
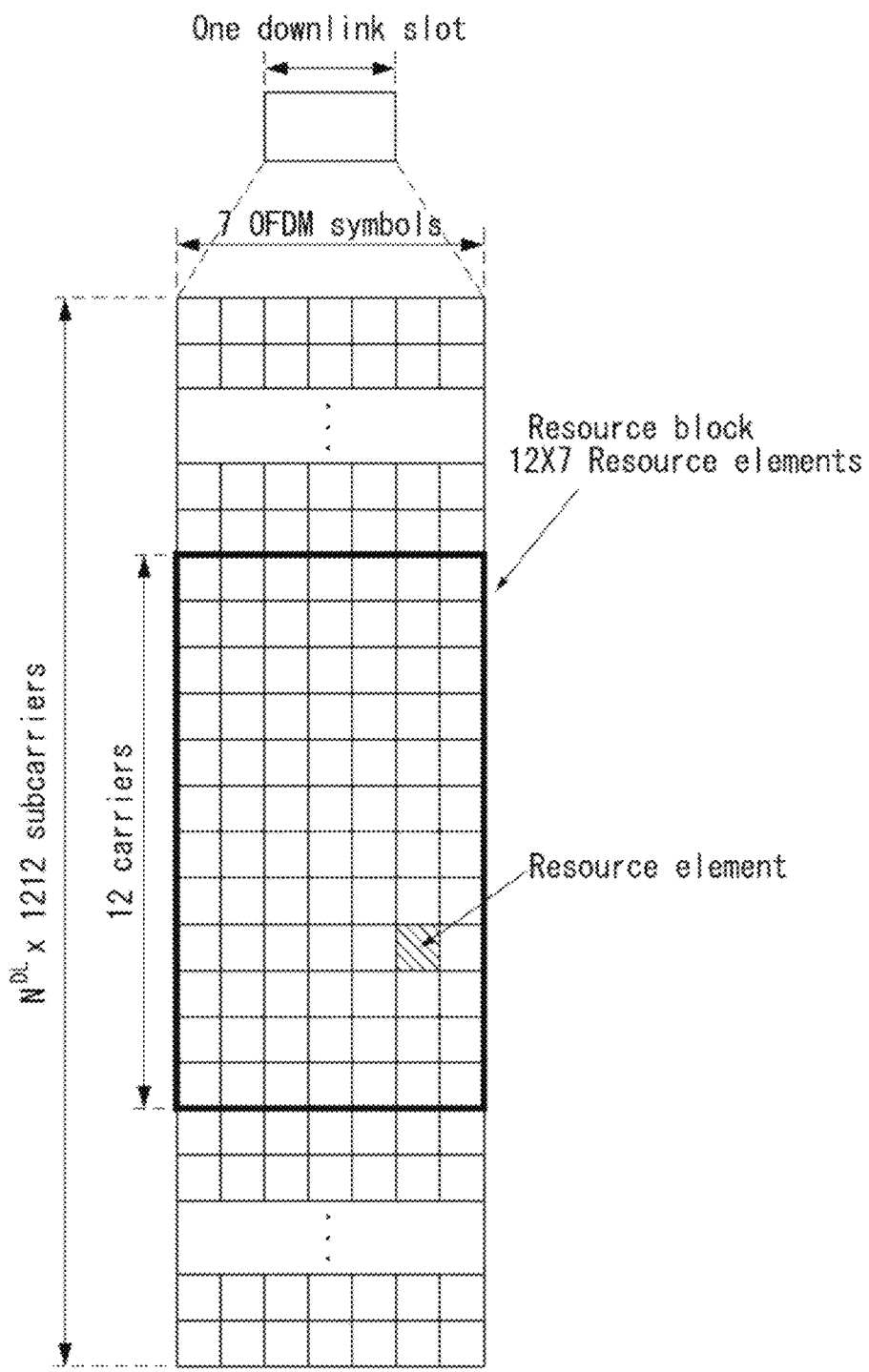
FIG. 9 is a diagram illustrating an example of a resource grid for a downlink slot.

FIG. 9 is a diagram illustrating an example of a resource grid for downlink slot.

In FIG. 9, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 10:
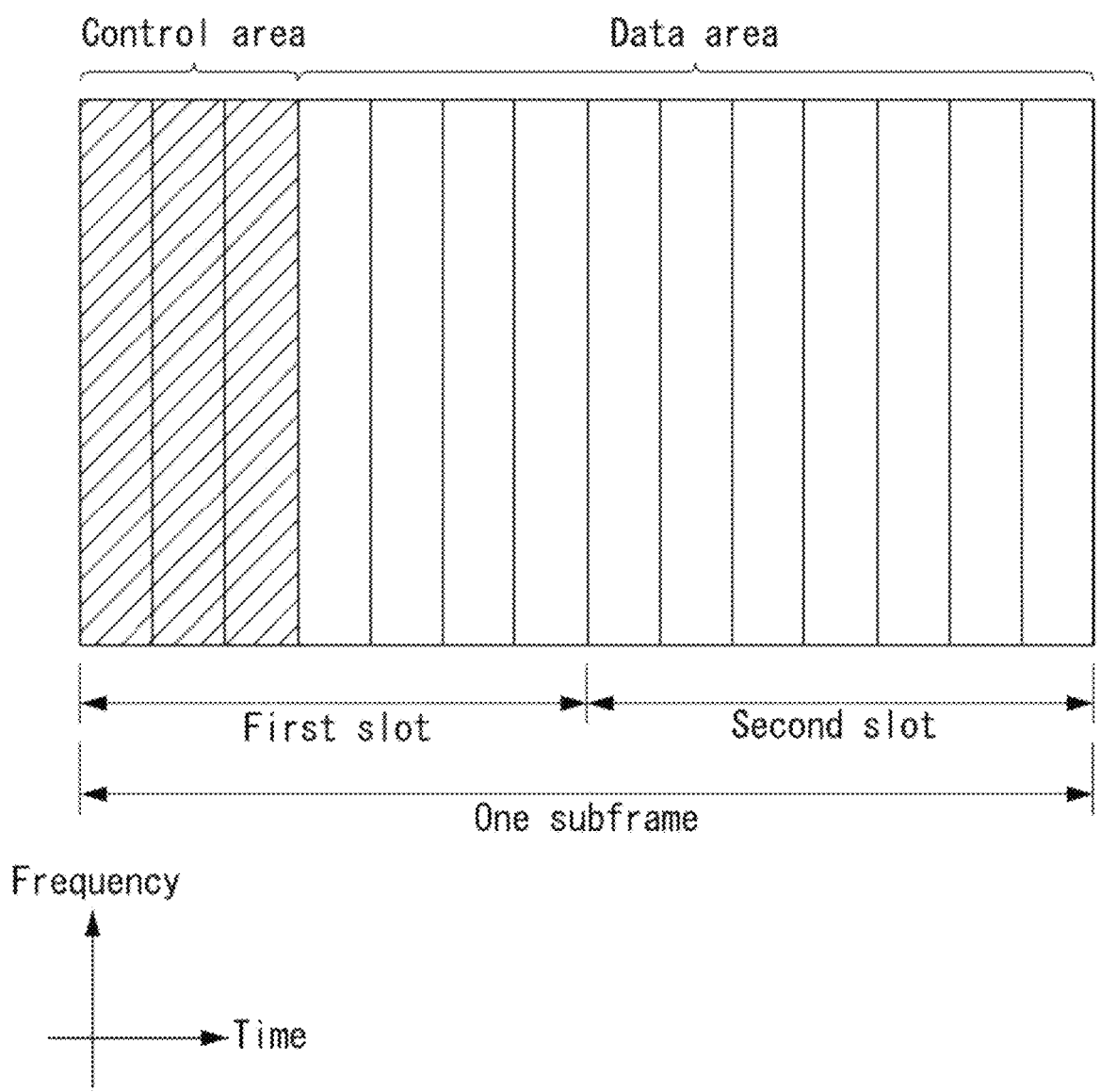
FIG. 10 shows an example of a downlink subframe structure.

FIG. 10 is a diagram illustrating an example of the structure of downlink subframe.

In FIG. 10, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 11:
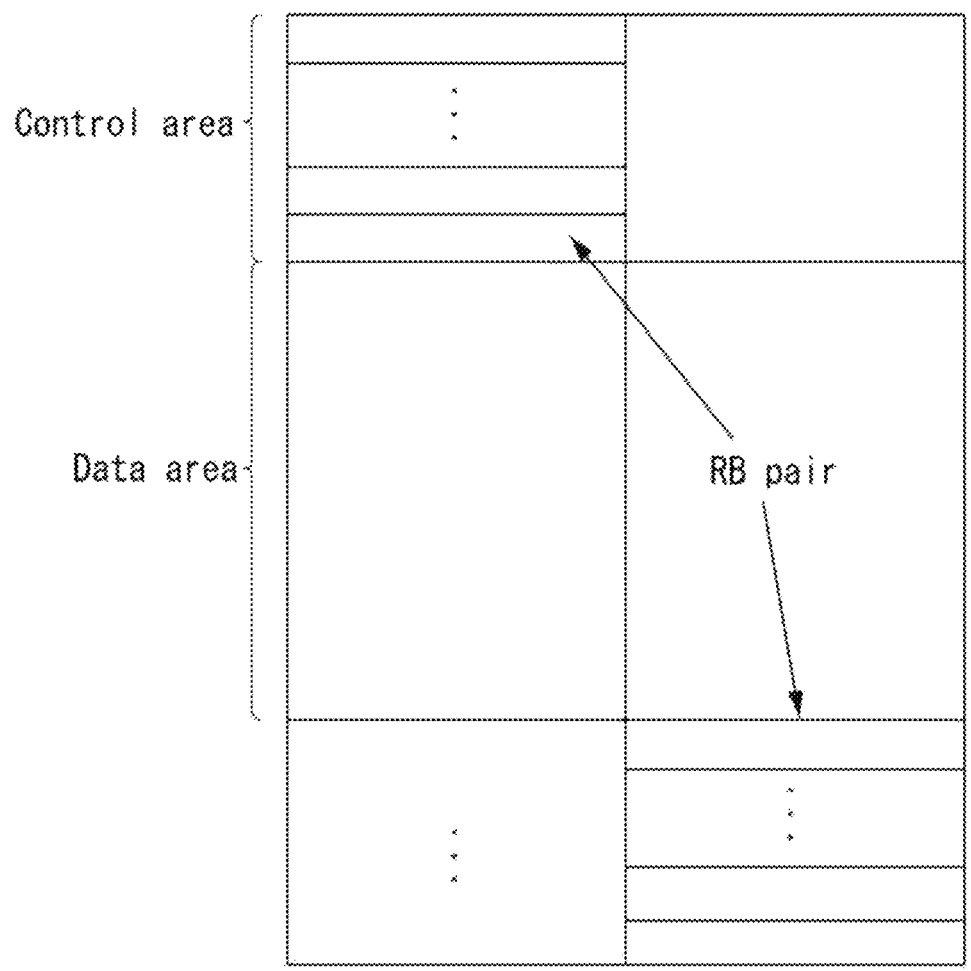
FIG. 11 shows an example of an uplink subframe structure.

FIG. 11 is a diagram illustrating an example of the structure of uplink subframe.

In FIG. 11, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, the LTE frame structure will be described in more detail.

Throughout LTE specification, unless otherwise noted, the size of various fields in the time domain is expressed as a number of time units $T_s=1/(15000\times 2048)$ seconds.

Downlink and uplink transmissions are organized into radio frames with $T_f=307200\times T_s=10$ ms duration. Two radio frame structures are supported:

Type 1, applicable to FDD
Type 2, applicable to TDD
Frame Structure Type 1

Figure 12:
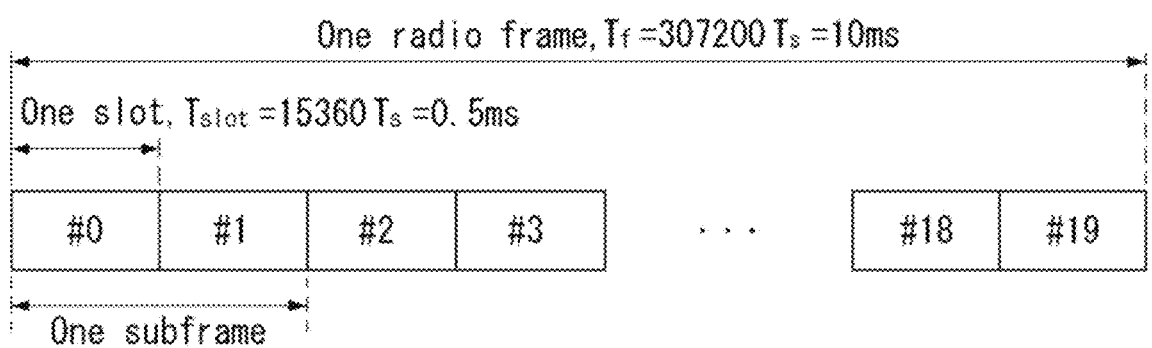
FIG. 12 shows an example of frame structure type 1.

FIG. 12 illustrates an example of the frame structure type 1.

Frame structure type 1 is applicable to both full duplex and half duplex FDD. Each radio frame is $T_f=307200\cdot T_s=10$ ms long and consists of 20 slots of length $T_{slot}=15360\cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Frame Structure Type 2

Frame structure type 2 is applicable to FDD. Each radio frame of length $T_f=307200\times T_s=10$ ms consists of two half-frames of length $15360\cdot T_s=0.5$ ms each. Each half-frame consists of five subframes of length $30720\cdot T_s=1$ ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to $30720\cdot T_s=1$ ms. Each subframe i is defined as two slots, 2i and 2i+1 of length $T_{slot}=15360\cdot T_s=0.5$ ms in each subframe.

Figure 13:
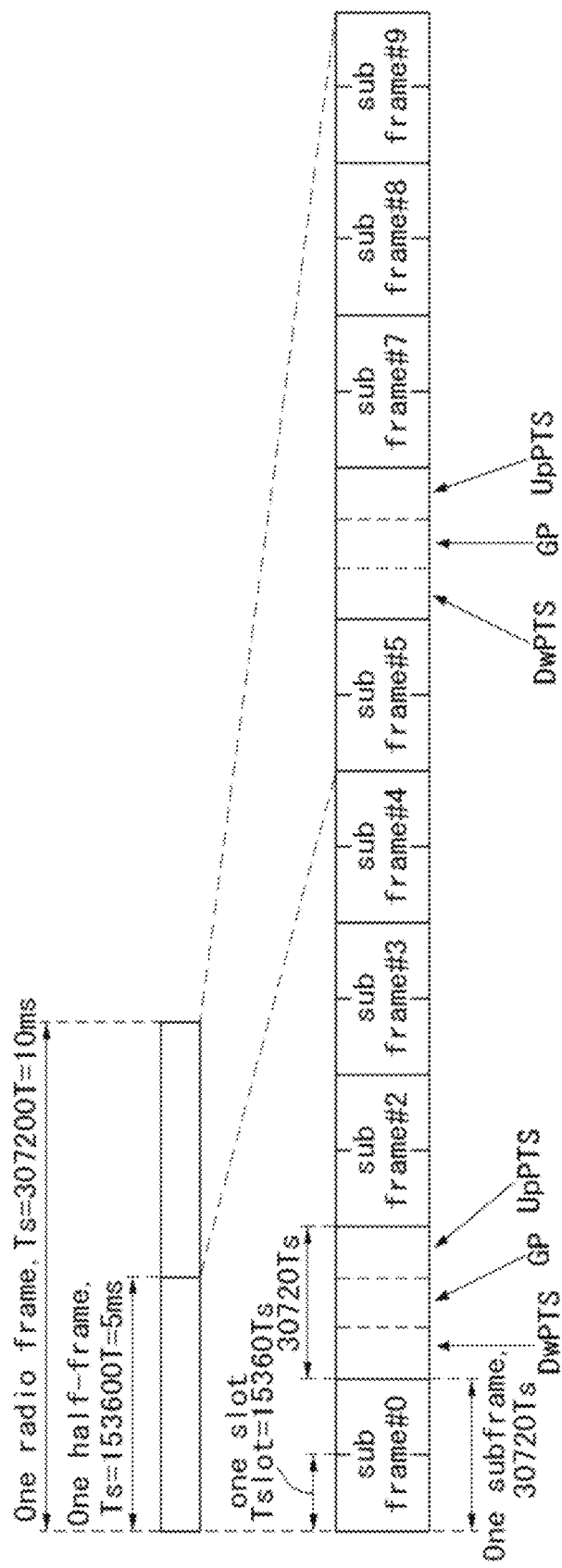
FIG. 13 is a view showing another example of the frame structure type 2.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission. FIG. 13 is a diagram illustrating another example of the frame structure type 2.

Table 1 shows an example of a configuration of a special subframe.

TABLE 1

| | | normal cyclic prefix in downlink | | | extended cyclic prefix in downlink | |
| --- | --- | --- | --- | --- | --- | --- |
| | | | UpPTS | | | UpPTS |
| Special subframe configuration | DwPTS | normal cyclic prefix in uplink | extended cyclic prefix in uplink | DwPTS | normal cyclic prefix in uplink | extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows an example of an uplink-downlink configuration.

TABLE 2

| Uplink-Downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

<NB-IoT>

NB-IoT (narrowband-internet of things) is a standard for supporting low complexity and low cost devices and is defined to perform only relatively simple operations compared to existing LTE devices. NB-IoT follows the basic structure of LTE, but operates based on the contents defined below. If the NB-IoT reuses an LTE channel or signal, it may follow the standard defined in the existing LTE.

Uplink

The following narrowband physical channels are defined:

NPUSCH (Narrowband Physical Uplink Shared Channel)

NPRACH (Narrowband Physical Random Access Channel)

The following uplink narrowband physical signals are defined:

Narrowband demodulation reference signal

The uplink bandwidth in terms of subcarriers $N_{sc}^{UL}$, and the slot duration $T_{slot}$ are given in Table 3.

Table 3 shows an example of NB-IoT parameters.

TABLE 3

| Subcarrier spacing | $N_{sc}^{UL}$ | $T_{slot}$ |
|---|---|---|
| Δf = 3.75 kHz | 48 | 61440 · $T_s$ |
| Δf = 15 kHz | 12 | 15360 · $T_s$ |

A single antenna port p=0 is used for all uplink transmissions.

Resource Unit

Resource units are used to describe the mapping of the NPUSCH to resource elements. A resource unit is defined as $N_{symb}^{UL} N_{slots}^{UL}$ consecutive SC-FDMA symbols in the time domain and $N_{sc}^{RU}$ consecutive subcarriers in the frequency domain, where $N_{sc}^{RU}$ and $N_{symb}^{UL}$ are given by Table 4.

Table 4 shows an example of supported combinations of $NR_{sc}^{RU}$, $N_{slots}^{U}$ and $N_{symb}^{UL}$.

TABLE 4

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

Narrowband Uplink Shared Channel (NPUSCH)

The narrowband physical uplink shared channel supports two formats:

NPUSCH format 1, used to carry the UL-SCH

NPUSCH format 2, used to carry uplink control information

Scrambling shall be done according to clause 5.3.1 of TS36.211. The scrambling sequence generator shall be initialized with $c_{ini}=n_{RNTI}\cdot 2^{14}+n_f \bmod 2\cdot 2^{13}+\lfloor n_s/2 \rfloor +N_{ID}^{Ncell}$ where $n_s$ is the first slot of the transmission of the codeword. In case of NPUSCH repetitions, the scrambling sequence shall be reinitialized according to the above formula after every $M_{idendical}^{NPUSCH}$ transmission of the codeword with $n_s$ and $n_f$ set to the first slot and the frame, respectively, used for the transmission of the repetition. The quantity $M_{idendical}^{NPUSCH}$ is given by clause 10.1.3.6 in TS36.211.

Table 5 specifies the modulation mappings applicable for the narrowband physical uplink shared channel.

TABLE 5

| NPUSCH format | $N_{sc}^{RU}$ | Modulation scheme |
|---|---|---|
| 1 | 1 | BPSK, QPSK |
|   | >1 | QPSK |
| 2 | 1 | BPSK |

NPUSCH can be mapped to one or more than one resource units, $N_{RU}$, as given by clause 16.5.1.2 of 3GPP TS 36.213, each of which shall be transmitted $M_{rep}^{NPUSCH}$ times.

The block of complex-valued symbols z(0), . . . , $z(M_{rep}^{NPUSCH}-1)$ shall be multiplied with the amplitude scaling factor $\beta_{PUSCH}$ in order to conform to the transmit power $P_{NPUSCH}$ specified in 3GPP TS 36.213, and mapped in sequence starting with z(0) to subcarriers assigned for transmission of NPUSCH. The mapping to resource elements (k, l) corresponding to the subcarriers assigned for transmission and not used for transmission of reference signals, shall be in increasing order of first the index k, then the index l, starting with the first slot in the assigned resource unit.

After mapping to $N_{slots}$ slots, the $N_{slots}$ slots shall be repeated $M_{idendical}^{NPUSCH}-1$ additional times, before continuing the mapping of z(·) to the following slot, where Equation 1, $$M_{idendical}^{NPUSCH} = \begin{cases} \text{in}(\lceil M_{rep}^{NPUSCH}/2 \rceil, 4) & N_{sc}^{RU} > 1 \\ 1 & N_{sc}^{RU} = 1 \end{cases}$$ [Equation 1]

$$N_{slots} = \begin{cases} 1 & \Delta f = 3.75 \text{ kHz} \\ 2 & \Delta f = 15 \text{ kHz} \end{cases}$$

If a mapping to $N_{slots}$ slots or a repetition of the mapping contains a resource element which overlaps with any configured NPRACH resource according to NPRACH-ConfigSIB-NB, the NPUSCH transmission in overlapped $N_{slots}$ slots is postponed until the next $N_{slots}$ slots not overlapping with any configured NPRACH resource.

The mapping of z(0), . . . , $z(M_{rep}^{NPUSCH}-1)$ is then repeated until $M_{rep}^{NPUSCH} N_{RU} N_{slots}^{UL}$ slots have been transmitted. After transmissions and/or postponements due to NPRACH of 256·30720$T_s$ time units, a gap of 40·30720$T_s$ time units shall be inserted where the NPUSCH transmission is postponed. The portion of a postponement due to NPRACH which coincides with a gap is counted as part of the gap.

When higher layer parameter npusch-AllSymbols is set to false, resource elements in SC-FDMA symbols overlapping with a symbol configured with SRS according to srs-SubframeConfig shall be counted in the NPUSCH mapping but not used for transmission of the NPUSCH. When higher layer parameter npusch-AllSymbols is set to true, all symbols are transmitted.

Uplink Control Information on NPUSCH without UL-SCH Data

The one bit information of HARQ-ACK $o_0^{ACK}$ is coded according to Table 6, where for a positive acknowledgment $o_0^{ACK}=1$ and for a negative acknowledgment $o_0^{ACK}=0$.

Table 6 shows an example of HARQ-ACK code words.

TABLE 6

| HARQ-ACK $<o_0^{ACK}>$ | HARQ-ACK $<b_0, b_1, b_2, ..., b_{15}>$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

Power Control

The UE transmit power for NPUSCH transmission in NB-IoT UL slot i for the serving cell is given by Equation 2 and 3 below.

If the number of repetitions of the allocated NPUSCH RUs is greater than 2, $$P_{NPUSCH,c}(i)=P_{CMAX,c}(i)[dB_m] \quad \text{[Equation 2]}$$

Otherwise, $$P_{NPUSCH,c}(i) = \min\left\{ \begin{array}{l} P_{CMAX,c}(i), \\ 10\log_{10}(M_{NPUSCH,c}(i)) + P_{O\_NPUSCH,c}(j) + \alpha_c(j) \cdot PL_c \end{array} \right\} \quad \text{[Equation 3]}$$

[dBm]

where, $P_{CMAX,c}(i)$ is the configured UE transmit power defined in 3GPP TS36.101 in NB-IoT UL slot i for serving cell c.

$M_{NPUSCH,c}$ is {¼} for 3.75 kHz subcarrier spacing and {1, 3, 6, 12} for 15 kHz subcarrier spacing $P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1 and for serving cell c where j∈{1, 2}. For NPUSCH (re)transmissions corresponding to a dynamic scheduled grant then j=1 and for NPUSCH (re)transmissions corresponding to the random access response grant then j=2.

$P_{O\_UE\_NPUSCH,c}(2)=0$ and $P_{O\_NORMINAL\_NPUSCH,c}(2)=P_{O\_PRE}+\Delta_{PREAMBLE\_Msg3}$, where the parameter preamble-InitialReceivedTargetPower $P_{O\_PRE}$ and $\Delta_{PREAMBLE\_Msg3}$ are signaled from higher layers for serving cell c.

For j=1, for NPUSCH format 2, $\alpha_c(j)=1$; for NPUSCH format 1, $\alpha_c(j)$ is provided by higher layers for serving cell c. For j=2, $\alpha_c(j)=1$.

$PL_c$ is the downlink path loss estimate calculated in the UE for serving cell c in dB and $PL_c$=nrs-Power+nrs-PowerOffsetNonAnchor–higher layer filtered NRSRP, where nrs-Power is provided by higher layers and Subclause 16.2.2 in 3GPP 36.213, and nrs-powerOffsetNonAnchor is set to zero if it is not provided by higher layers and NRSRP is defined in 3GPP TS 36.214 for serving cell c and the higher layer filter configuration is defined in 3GPP TS 36.331 for serving cell c.

If the UE transmits NPUSCH in NB-IoT UL slot i for serving cell c, power headroom is computed using Equation 4 below.

$$PH_c(i)=P_{CMAX,c}(i)-\{P_{O\_NPUSCH,c}(1)+\alpha_c(1)\cdot PL_c\}[dB] \quad \text{[Equation 4]}$$

UE Procedure for Transmitting Format 1 NPUSCH

A UE shall upon detection on a given serving cell of a NPDCCH with DCI format N0 ending in NB-IoT DL subframe n intended for the UE, perform, at the end of n+$k_0$ DL subframe, a corresponding NPUSCH transmission using NPUSCH format 1 in N consecutive NB-IoT UL slots $n_i$ with i=0, 1, . . . , N−1 according to the NPDCCH information where subframe n is the last subframe in which the NPDCCH is transmitted and is determined from the starting subframe of NPDCCH transmission and the DCI subframe repetition number field in the corresponding DCI; and $N=N_{Rep}N_{RU}N_{slots}^{UL}$, where the value of $N_{Rep}$ is determined by the repetition number field in the corresponding DCI, the value of $N_{RU}$ is determined by the resource assignment field in the corresponding DCI, and the value of $N_{slots}^{UL}$ is the number of NB-IoT UL slots of the resource unit corresponding to the allocated number of subcarriers in the corresponding DCI, $n_0$ is the first NB-IoT UL slot starting after the end of subframe n+$k_0$ value of $k_0$ is determined by the scheduling delay field ($I_{Delay}$) in the corresponding DCI according to Table 7.

Table 7 shows an example of k0 for DCI format N0.

TABLE 7

| $I_{Delay}$ | $k_0$ |
|---|---|
| 0 | 8 |
| 1 | 16 |
| 2 | 32 |
| 3 | 64 |

The resource allocation information in uplink DCI format N0 for NPUSCH transmission indicates to a scheduled UE a set of contiguously allocated subcarriers ($n_{sc}$) of a resource unit determined by the Subcarrier indication field in the corresponding DCI, a number of resource units ($N_{RU}$) determined by the resource assignment field in the corresponding DCI according to Table 9, a repetition number ($N_{Rep}$) determined by the repetition number field in the corresponding DCI according to Table 10.

The subcarrier spacing Δf of NPUSCH transmission is determined by the uplink subcarrier spacing field in the Narrowband Random Access Response Grant according to Subclause 16.3.3 in 3GPP TS36.213.

For NPUSCH transmission with subcarrier spacing Δf=3.75 kHz, $n_{sc}=I_{sc}$ where $I_{sc}$ is the subcarrier indication field in the DCI.

For NPUSCH transmission with subcarrier spacing Δf=15 kHz, the subcarrier indication field ($I_{sc}$) in the DCI determines the set of contiguously allocated subcarriers ($n_{sc}$) according to Table 8.

Table 8 shows an example of subcarriers allocated to the NPUSCH having Δf=15 kHz.

TABLE 8

| Subcarrier indication field ($I_{sc}$) | Set of Allocated subcarriers ($n_{sc}$) |
|---|---|
| 0-11 | $I_{sc}$ |
| 12-15 | 3($I_{sc}$−12)+{0,1,2} |
| 16-17 | 6($I_{sc}$−16)+{0,1,2,3,4,5} |
| 18 | {0,1,2,3,4,5,6,7,8,9,10,11} |
| 19-63 | Reserved |

Table 9 shows an example of the number of resource units for NPUSCH.

TABLE 9

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 10 shows an example of the number of repetitions for NPUSCH.

TABLE 10

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

The reference signal sequence $\bar{r}_u(n)$ for $N_{sc}^{RU}=1$ is defined by Equation 5 below.

$$\bar{r}_u(n) = \frac{1}{\sqrt{2}}(1+j)(1-2c(n))w(n \bmod 16),$$

$$0 \le n < M_{rep}^{NPUSCH} N_{RU} N_{slots}^{UL}$$ [Equation 5]

Where the binary sequence c(n) is defined by clause 7.2 of TS36.211 and shall be initialized with $c_{init}=35$ at the start of the NPUSCH transmission. The quantity w(n) is given by Table 11 where $u=N_{ID}^{cell}$ mod 16 for NPUSCH format 2, and for NPUSCH format 1 if group hopping is not enabled, and by clause 1014.1.3 of 3GPP TS36.211 if group hopping is enabled for NPUSCH format 1.

Table 11 shows an example of w(n).

The reference signal sequence for NPUSCH format 1 is given by Equation 6 below.

$$r_u(n) = \bar{r}_u(n)$$ [Equation 6]

The reference signal sequence for NPUSCH format 2 is given by Equation 7 below.

$$r_u(3n+m) = \bar{w}(m)\bar{r}r_u(n), \, m=0,1,2$$ [Equation 7]

where $\bar{w}(m)$ is defined in Table 5.5.2.2.1-2 of 3GPP TS36.211 with the sequence index chosen according to $$\left(\sum_{i=0}^{7} c(8n_s + i)2^i\right) \bmod 3$$

with $c_{init}=N_{ID}^{Ncell}$.

The reference signal sequences $r_u(n)$ for $N_{sc}^{RU}>1$ is defined by a cyclic shift $\alpha$ of a base sequence according to Equation 8 below.

$$r_u(n) = e^{j\alpha n} e^{j\phi(n)\pi/4}, \, 0 \le n < N_{sc}^{RU}$$ [Equation 8]

where $\phi(n)$ is given by Table 10.1.4.1.2-1 for $N_{sc}^{RU}=3$, Table 12 for $N_{sc}^{RU}=6$ and Table 13 for $N_{sc}^{RU}=12$.

If group hopping is not enabled, the base sequence index u is given by higher layer parameters threeTone-BaseSequence, sixTone-BaseSequence, and twelveTone-BaseSequence for $N_{sc}^{RU}=3$, $N_{sc}^{RU}=6$, and $N_{sc}^{RU}=12$, for =12, respectively. If not signaled by higher layers, the base sequence is given by Equation 9 below.

$$u = \begin{cases} N_{ID}^{Ncell} \bmod 12 & \text{for } N_{sc}^{RU} = 3 \\ N_{ID}^{Ncell} \bmod 14 & \text{for } N_{sc}^{RU} = 6 \\ N_{ID}^{Ncell} \bmod 30 & \text{for } N_{sc}^{RU} = 12 \end{cases}$$ [Equation 9]

If group hopping is enabled, the base sequence index u is given by clause 10.1.4.1.3 of 3GPP TS36.211.

The cyclic shift $\alpha$ for $N_{sc}^{RU}=3$ and $N_{sc}^{RU}=6$ is derived from higher layer parameters threeTone-CyclicShift and sixTone-CyclicShift, respectively, as defined in Table 14. For $N_{sc}^{RU}=12$, $\alpha=0$.

Table 12 shows an example of $\phi(n)$ for $N_c^{RU}=3$

TABLE 11

| u | w(0), ..., w(15) | | | | | | | | | | | | | | | |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | −1 | 1 | −1 | 1 | −1 | 1 | −1 | 1 | −1 | 1 | −1 | 1 | −1 | 1 | −1 |
| 2 | 1 | 1 | −1 | −1 | 1 | 1 | −1 | −1 | 1 | 1 | −1 | −1 | 1 | 1 | −1 | −1 |
| 3 | 1 | −1 | −1 | 1 | 1 | −1 | −1 | 1 | 1 | −1 | −1 | 1 | 1 | −1 | −1 | 1 |
| 4 | 1 | 1 | 1 | 1 | −1 | −1 | −1 | −1 | 1 | 1 | 1 | 1 | −1 | −1 | −1 | −1 |
| 5 | 1 | −1 | 1 | −1 | −1 | 1 | −1 | 1 | 1 | −1 | 1 | −1 | −1 | 1 | −1 | 1 |
| 6 | 1 | 1 | −1 | −1 | −1 | −1 | 1 | 1 | 1 | 1 | −1 | −1 | −1 | −1 | 1 | 1 |
| 7 | 1 | −1 | −1 | 1 | −1 | 1 | 1 | −1 | 1 | −1 | −1 | 1 | −1 | 1 | 1 | −1 |
| 8 | 1 | 1 | 1 | 1 | 1 | 1 | 1 | 1 | −1 | −1 | −1 | −1 | −1 | −1 | −1 | −1 |
| 9 | 1 | −1 | 1 | −1 | 1 | −1 | 1 | −1 | −1 | 1 | −1 | 1 | −1 | 1 | −1 | 1 |
| 10 | 1 | 1 | −1 | −1 | 1 | 1 | −1 | −1 | −1 | −1 | 1 | 1 | −1 | −1 | 1 | 1 |
| 11 | 1 | −1 | −1 | 1 | 1 | −1 | −1 | 1 | −1 | 1 | 1 | −1 | −1 | 1 | 1 | −1 |
| 12 | 1 | 1 | 1 | 1 | −1 | −1 | −1 | −1 | −1 | −1 | −1 | −1 | 1 | 1 | 1 | 1 |
| 13 | 1 | −1 | 1 | −1 | −1 | 1 | −1 | 1 | −1 | 1 | −1 | 1 | 1 | −1 | 1 | −1 |
| 14 | 1 | 1 | −1 | −1 | −1 | −1 | 1 | 1 | −1 | −1 | 1 | 1 | 1 | 1 | −1 | −1 |
| 15 | 1 | −1 | −1 | 1 | −1 | 1 | 1 | −1 | −1 | 1 | 1 | −1 | 1 | −1 | −1 | 1 |

TABLE 12

| u | φ(0), φ(1), φ(2) | | |
|---|---|---|---|
| 0 | 1 | −3 | −3 |
| 1 | 1 | −3 | −1 |
| 2 | 1 | −3 | 3 |
| 3 | 1 | −1 | −1 |
| 4 | 1 | −1 | 1 |
| 5 | 1 | −1 | 3 |
| 6 | 1 | 1 | −3 |
| 7 | 1 | 1 | −1 |
| 8 | 1 | 1 | 3 |
| 9 | 1 | 3 | −1 |
| 10 | 1 | 3 | 1 |
| 11 | 1 | 3 | 3 |

Table 13 shows another example of φ(n) for $N_{sc}^{RU}=6$

TABLE 13

| u | φ(0), ..., φ(5) | | | | | |
|---|---|---|---|---|---|---|
| 0 | 1 | 1 | 1 | 1 | 3 | −3 |
| 1 | 1 | 1 | 3 | 1 | −3 | 3 |
| 2 | 1 | −1 | −1 | −1 | 1 | −3 |
| 3 | 1 | −1 | 3 | −3 | −1 | −1 |
| 4 | 1 | 3 | 1 | −1 | −1 | 3 |
| 5 | 1 | −3 | −3 | 1 | 3 | 1 |
| 6 | −1 | −1 | 1 | −3 | −3 | −1 |
| 7 | −1 | −1 | −1 | 3 | −3 | −1 |
| 8 | 3 | −1 | 1 | −3 | −3 | 3 |
| 9 | 3 | −1 | 3 | −3 | −1 | 1 |
| 10 | 3 | −3 | 3 | −1 | 3 | 3 |
| 11 | −3 | 1 | 3 | 1 | −3 | −1 |
| 12 | −3 | 1 | −3 | 3 | −3 | −1 |
| 13 | −3 | 3 | −3 | 1 | 1 | −3 |

Table 14 shows an example of α

TABLE 14

| $N_{sc}^{RU}=3$ | | $N_{sc}^{RU}=6$ | |
|---|---|---|---|
| threeTone-CyclicShift | α | sixTone-CyclicShift | α |
| 0 | 0 | 0 | 0 |
| 1 | 2π/3 | 1 | 2π/6 |
| 2 | 4π/3 | 2 | 4π/6 |
| | | 3 | 8π/6 |

For the reference signal for NPUSCH format 1, sequence-group hopping can be enabled where the sequence-group number u in slot $n_s$ is defined by a group hopping pattern $f_{gh}(n_s)$ and a sequence-shift pattern $f_{ss}$ according to Equation 10 below.

$$u=(f_{gh}(n_s)+f_{ss}) \bmod N_{seq}^{RU}$$ [Equation 10]

where the number of reference signal sequences available for each resource unit size, $N_{seq}^{RU}$ is given by Table 15.

Table 15 shows an example of $N_{seq}^{RU}$

TABLE 15

| $N_{sc}^{RU}$ | $N_{seq}^{RU}$ |
|---|---|
| 1 | 16 |
| 3 | 12 |
| 6 | 14 |
| 12 | 30 |

Sequence-group hopping can be enabled or disabled by means of the cell-specific parameter groupHoppingEnabled provided by higher layers. Sequence-group hopping for NPUSCH can be disabled for a certain UE through the higher-layer parameter groupHoppingDisabled despite being enabled on a cell basis unless the NPUSCH transmission corresponds to a Random Access Response Grant or a retransmission of the same transport block as part of the contention based random access procedure.

The group hopping pattern $f_{gh}(n_s)$ is given by Equation 11 below.

$$f_{gh}(n_s)=(\Sigma_{i=0}^{7} c(8n'_s+i)\cdot 2^i) \bmod N_{seq}^{RU}$$ [Equation 11]

where $n'_s=n_s$ for $N_{sc}^{RU}>1$ and $n'_s$ is the slot number of the first slot of the resource unit for $N_{sc}^{RU}=1$. The pseudo-random sequence c(i) is defined by clause 7.2. The pseudo-random sequence generator shall be initialized with $$c_{init}=\left\lfloor \frac{N_{ID}^{Ncell}}{N_{seq}^{RU}} \right\rfloor$$

at the beginning of the resource unit for $N_{sc}^{RU}=1$ and in every even slot for $N_{sc}^{RU}>1$.

The sequence-shift pattern $f_{ss}$ is given by Equation 12 below.

$$f_{ss}=(N_{ID}^{Ncell}+\Delta_{ss}) \bmod N_{seq}^{RU}$$ [Equation 12]

where $\Delta_{ss} \in \{0, 1, \ldots, 29\}$ is given by higher-layer parameter groupAssignmentNPUSCH. If no value is signaled, $\Delta_{ss}=0$.

The sequence r(·) shall be multiplied with the amplitude scaling factor $\beta_{NPUSCH}$ and mapped in sequence starting with r(0) to the sub-carriers.

The set of sub-carriers used in the mapping process shall be identical to the corresponding NPUSCH transmission as defined in clause 10.1.3.6 in 3GPP 36.211.

The mapping to resource elements (k, l) shall be in increasing order of first k, then l, and finally the slot number. The values of the symbol index l in a slot are given in Table 16.

Table 16 shows an example of demodulation reference signal location for NPUSCH

TABLE 16

| NPUSCH format | Values for $l$ | |
|---|---|---|
| | Δf = 3.75 kHz | Δf = 15 kHz |
| 1 | 4 | 3 |
| 2 | 0, 1, 2 | 2, 3, 4 |

SF-FDMA Baseband Signal Generation

For $N_{sc}^{RU}>1$, the time-continuous signal $s_l(t)$ in SC-FDMA symbol l in a slot is defined by clause 5.6 with the quantity $N_{RB}^{UL}N_{sc}^{RB}$ replaced by $N_{sc}^{UL}$.

For $N_{sc}^{RU}=1$, the time-continuous signal $s_{k,l}(t)$ for sub-carrier index k in SC-FDMA symbol l in an uplink slot is defined by Equation 13 below $$s_{k,l}(t)=a_{k^{(-)},l} e^{j2\pi(k+1/2)\Delta f(t-N_{CP,l}T_s)}$$

$$k^{(-)}=k+\left\lfloor N_{sc}^{UL}/2 \right\rfloor$$ [Equation 12]

For $0 \le t < (N_{CP,l}+N)T_s$ where parameters for Δf=15 kHz and Δf=3.75 kHz are given in Table 17, $a_{k^{(-)},l}$ is the modulation value of symbol l and the phase rotation $\varphi_{k,l}$ is defined by Equation 14 below.

$$\varphi_{k,l} = \rho(\bar{l} \bmod 2) + \hat{\varphi}_k(\bar{l}) \quad \text{[Equation 14]}$$

$$\rho = \begin{cases} \frac{\pi}{2} & \text{for BPSK} \\ \frac{\pi}{4} & \text{for QPSK} \end{cases}$$

$$\hat{\varphi}_k(\bar{l}) = \begin{cases} 0 & \bar{l} = 0 \\ \hat{\varphi}_k(\bar{l}-1) + 2\pi\Delta f(k+1/2)(N+N_{CP,l})T_s & \bar{l} > 0 \end{cases}$$

$$\bar{l} = 0, 1, \ldots, M_{rep}^{NPUSCH} N_{RU} N_{slots}^{UL} N_{symb}^{UL} - 1$$

$$l = \bar{l} \bmod N_{symb}^{UL}$$

where $\bar{l}$ is a symbol counter that is reset at the start of a transmission and incremented for each symbol during the transmission.

Table 17 shows an example of SC-FDMA parameters for $N_{sc}^{RU}=1$.

TABLE 17

| Parameter | Δf = 3.75 kHz | Δf = 15 kHz |
|---|---|---|
| N | 8192 | 2048 |
| Cyclic prefix length $N_{CP,l}$ | 256 | 160 for l = 0 |
| | | 144 for l = 1, 2, ..., 6 |
| Set of values for $k$ | −24, −23, ..., 23 | −6, −5, ..., 5 |

The SC-FDMA symbols in a slot shall be transmitted in increasing order of l, starting with l=0, where SC-FDMA symbol l>0 starts at time $\sum_{l'=0}^{l-1}(N_{CP,l'}+N)T_s$ within the slot. For Δf=3.75 kHz, the remaining $2304T_s$ in $T_{slot}$ are not transmitted and used for guard period.

Narrowband Physical Random Access Channel (NPRACH)

Figure 14:
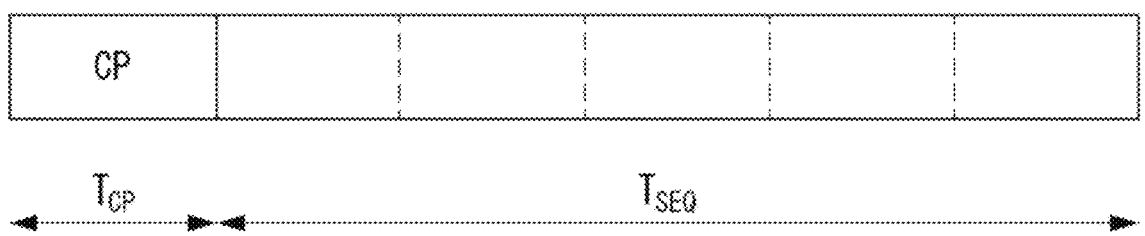
FIG. 14 shows an example of a random access symbol group.

The physical layer random access preamble is based on single-subcarrier frequency-hopping symbol groups. A symbol group is illustrated in FIG. 14 Random access symbol group, consisting of a cyclic prefix of length $T_{CP}$ and a sequence of 5 identical symbols with total length $T_{SEQ}$. The parameter values are listed in Table 18.

FIG. 14 illustrates an example of the random access symbol group.

Table 18 shows an example of Random access preamble parameters.

TABLE 18

| Preamble format | $T_{CP}$ | $T_{SEQ}$ |
|---|---|---|
| 0 | $20487T_s$ | $5 \cdot 8192T_s$ |
| 1 | $81927T_s$ | $5 \cdot 8192T_s$ |

The preamble consisting of 4 symbol groups transmitted without gaps shall be transmitted $N_{rep}^{NPRACH}$ times.

The transmission of a random access preamble, if triggered by the MAC layer, is restricted to certain time and frequency resources.

A NPRACH configuration provided by higher layers contains the following:

NPRACH resource periodicity $N_{period}^{NPRACH}$ (nprach-Periodicity), frequency location of the first subcarrier allocated to NPRACH $N_{scoffset}^{NPRACH}$ (nprach-SubcarrierOffset), number of subcarriers allocated to NPRACH $N_{sc}^{NPRACH}$ (nprach-NumSubcarriers), number of starting sub-carriers allocated to contention based NPRACH random access $N_{sc\_cont}^{NPRACH}$ (nprach-NumCBRA-StartSubcarriers), number of NPRACH repetitions per attempt $N_{rep}^{NPRACH}$ (numRepetitionsPerPreambleAttempt), NPRACH starting time $N_{start}^{NPRACH}$ (nprach-StartTime), Fraction for calculating starting subcarrier index for the range of NPRACH subcarriers reserved for indication of UE support for multi-tone msg3 transmission $N_{MSG3}^{NPRACH}$ (nprach-SubcarrierMSG3-Range Start).

NPRACH transmission can start only $N_{start}^{NPRACH} \cdot 30720T_s$ time units after the start of a radio frame fulfilling $n_f \bmod(N_{period}^{NPRACH}/10)=0$. After transmissions of $4 \cdot 64(T_{CP}+T_{SEQ})$ time units, a gap of $40 \cdot 30720T_s$ time units shall be inserted.

NPRACH configurations where $N_{scoffset}^{NPRACH}+N_{sc}^{NPRACH}>N_{sc}^{UL}$ are invalid.

The NPRACH starting subcarriers allocated to contention based random access are split in two sets of subcarriers, $\{0, 1, \ldots, N_{sc_{cont}}^{NPRACH} N_{MSG3}^{NPRACH}-1\}$ and $\{N_{sc\_cont}^{NPRACH} N_{MSG3}^{NPRACH}, \ldots, N_{sc_{cont}}^{NPRACH}-1\}$, where the second set, if present, indicate UE support for multi-tone msg3 transmission.

The frequency location of the NPRACH transmission is constrained within $N_{sc}^{RA}=12$ sub-carriers. Frequency hopping shall be used within the 12 subcarriers, where the frequency location of the $i^{th}$ symbol group is given by $n_{sc}^{RA}(i)=n_{start}+\tilde{n}_{sc}^{RA}(i)$ where $n_{start}=N_{scoffset}^{NPRACH}+\lfloor n_{init}/N_{sc}^{RA} \rfloor \cdot N_{sc}^{RA}$ and Equation 15,

[Equation 15]

$$\tilde{n}_{sc}^{RA}(i) =$$

$$\begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(t) = \left( f(t-1) + \left( \sum_{n=10t+1}^{10t+9} c(n)2^{n-(10t+1)} \right) \bmod(N_{sc}^{RA}-1) + 1 \right) \bmod N_{sc}^{RA}$$

$$f(-1) = 0$$

where $\tilde{n}_{SC}^{RA}(0)=n_{init} \bmod N_{sc}^{RA}$ with $n_{init}$ being the subcarrier selected by the MAC layer from $\{0, 1, \ldots, N_{sc}^{NPRACH}-1\}$, and the pseudo random sequence $c(n)$ is given by clause 7.2 of 3GPP TS36.211. The pseudo random sequence generator shall be initialised with $c_{init}=N_{ID}^{Ncell}$.

The time-continuous random access signal $s_i(t)$ for symbol group i is defined by Equation 16 below.

$$s_i(t) = \beta_{NPRACH} e^{j2\pi(n_{SC}^{RA}(i)+Kk_0+1/2)\Delta f_{RA}(t-T_{CP})}$$

Where $0 \leq t < T_{SEQ}+T_{CP}$, $\beta_{NPRACH}$ is an amplitude scaling factor in order to conform to the transmit power $P_{NPRACH}$ specified in clause 16.3.1 in 3GPP TS 36.213, $k_0=-N_{sc}^{UL}/2$, $K=\Delta f/\Delta f_{RA}$ accounts for the difference in subcarrier spacing between the random access preamble and uplink data transmission, and the location in the frequency domain controlled by the parameter $n_{sc}^{RA}(i)$ is derived from clause 10.1.6.1 of 3GPP TS36.211. The variable $\Delta f_{RA}$ is given by Table 19 below.

Table 19 shows an example of random access baseband parameters.

TABLE 19

| Preamble format | $\Delta f_{RA}$ |
|---|---|
| 0, 1 | 3.75 kHz |

Downlink

A downlink narrowband physical channel corresponds to a set of resource elements carrying information originating from higher layers and is the interface defined between 3GPP TS 36.212 and 3GPP TS 36.211.

The following downlink physical channels are defined:
NPDSCH (Narrowband Physical Downlink Shared Channel)
NPBCH (Narrowband Physical Broadcast Channel)
NPDCCH (Narrowband Physical Downlink Control Channel)

A downlink narrowband physical signal corresponds to a set of resource elements used by the physical layer but does not carry information originating from higher layers. The following downlink physical signals are defined:
NRS (Narrowband reference signal)
Narrowband synchronization signal
Narrowband physical downlink shared channel (NPDSCH)

The scrambling sequence generator shall be initialized with $c_{init}=n_{RNTI} \cdot 2^{14} + n_f \bmod 2 \cdot 2^{13} + \lfloor n_s/2 \rfloor + N_{ID}^{cell}$ where $n_s$ is the first slot of the transmission of the codeword. In case of NPDSCH repetitions and the NPDSCH carrying the BCCH, the scrambling sequence generator shall be reinitialized according to the expression above for each repetition. In case of NPDSCH repetitions and the NPDSCH is not carrying the BCCH, the scrambling sequence generator shall be reinitialized according to the expression above after every min $(M_{rep}^{NPDSCH}, 4)$ transmission of the codeword with $n_s$ and $n_f$ set to the first slot and the frame, respectively, used for the transmission of the repetition.

Modulation should be done using QPSK modulation scheme.

NPDSCH can be mapped to one or more than one subframes, $N_{SF}$, as given by clause 16.4.1.5 of 3GPP TS 36.213, each of which shall be transmitted NPDSCH $M_{rep}^{NPDSCH}$ times.

For each of the antenna ports used for transmission of the physical channel, the block of complex-valued symbols $y^{(p)}(0), \ldots, y^{(p)}(M_{symb}^{ap}-1)$ shall be mapped to resource elements (k, l) which meet all of the following criteria in the current subframe:
the subframe is not used for transmission of NPBCH, NPSS, or NSSS, and
they are assumed by the UE not to be used for NRS, and
they are not overlapping with resource elements used for CRS (if any), and
the index l in the first slot in a subframe fulfills $l \geq l_{DataStart}$ where $l_{DataStart}$ is given by clause 16.4.1.4 of 3GPP TS 36.213.

The mapping of $y^{(p)}(0), \ldots, y^{(p)}(M_{symb}^{ap}-1)$ in sequence starting with $y^{(p)}(0)$ to resource elements (k, l) on antenna port p meeting the criteria above shall be increasing order of the first the index k and the index l, starting with the first slot and ending with the second slot in a subframe. For NPDSCH not carrying BCCH, after mapping to a subframe, the subframe shall be repeated for $M_{rep}^{NPDSCH}-1$ additional subframes, before continuing the mapping of $y^{(p)}(\cdot)$ to the following subframe. The mapping of $y^{(p)}(0), \ldots, y^{(p)}(M_{sym}^{ap}-1)$ is then repeated until $M_{rep}^{NPDSCH} N_{SF}$ subframes have been transmitted. For NPDSCH carrying BCCH, the $y^{(p)}(0), \ldots, y^{(p)}(M_{symb}^{ap}-1)$ is mapped to $N_{SF}$ subframes in sequence and then repeated until $M_{rep}^{NPDSCH} N_{SF}$ subframes have been transmitted.

The NPDSCH transmission can be configured by higher layers with transmission gaps where the NPSDCH transmission is postponed. There are no gaps in the NPDSCH transmission if $R_{max}<N_{gap,threshold}$ where $N_{gap,threshold}$ is given by the higher layer parameter dl-GapThreshold and $R_{max}$ is given by 3GPP TS 36.213. The gap starting frame and subframe is given by $(10n_f + \lfloor n_s/2 \rfloor) \bmod N_{gap,period}=0$ where the gap periodicity, $N_{gap,period}$, is given by the higher layer parameter dl-GapPeriodicity. The gap duration in number of subframes is given by $N_{gap,duration}=N_{gap,coeff} N_{gap,period}$, where $N_{gap,coeff}$ is given by the higher layer parameter dl-GapDurationCoeff. For NPDSCH carrying the BCCH there are no gaps in the transmission.

The UE shall not expect NPDSCH in subframe i if it is not a NB-IoT downlink subframe, except for transmissions of NPDSCH carrying SystemInformationBlockType1-NB in subframe 4. In case of NPDSCH transmissions, in subframes that are not NB-IoT downlink subframes, the NPDSCH transmission is postponed until the next NB-IoT downlink subframe.

UE Procedure for Receiving the NPDSCH

A NB-IoT UE shall assume a subframe as a NB-IoT DL subframe if
the UE determines that the subframe does not contain NPSS/NSSS/NPBCH/NB-SIB1 transmission, and
for a NB-IoT carrier that a UE receives higher layer parameter operationModeInfo, the subframe is configured as NB-IoT DL subframe after the UE has obtained SystemInformationBlockType1-NB.
for a NB-IoT carrier that DL-CarrierConfigCommon-NB is present, the subframe is configured as NB-IoT DL subframe by the higher layer parameter downlinkBitmapNonAnchor.

For a NB-IoT UE that supports two HARQ-Processes-r14, there shall be a maximum of 2 downlink HARQ processes.

A UE shall upon detection on a given serving cell of a NPDCCH with DCI format N1, N2 ending in subframe n intended for the UE, decode, starting in n+5 DL subframe, the corresponding NPDSCH transmission in N consecutive NB-IoT DL subframe(s) $n_i$ with i=0, 1, . . . , N−1 according to the NPDCCH information, where
subframe n is the last subframe in which the NPDCCH is transmitted and is determined from the starting subframe of NPDCCH transmission and the DCI subframe repetition number field in the corresponding DCI;
subframe(s) ni with i=0, 1, . . . , N−1 are N consecutive NB-IoT DL subframe(s) excluding subframes used for SI messages where, n0<n1> . . . , nN−1,
$N=N_{Rep}N_{SF}$, where the value of $N_{Rep}$ is determined by the repetition number field in the corresponding DCI, and the value of $N_{SF}$ is determined by the resource assignment field in the corresponding DCI, and
$k_0$ is the number of NB-IoT DL subframe(s) starting in DL subframe n+5 until DL subframe $n_0$, where $k_0$ is determined by the scheduling delay field ($I_{Delay}$) for DCI format N1, and $k_0=0$ for DCI format N2. For DCI CRC scrambled by G-RNTI, $k_0$ is determined by the scheduling delay field ($I_{Delay}$) according to Table 21, otherwise $k_0$ is determined by the scheduling delay field ($I_{Delay}$) according to Table 20. The value of $R_{m,ax}$ is according to Subclause 16.6 in 3GPP 36.213 for the corresponding DCI format N1.

Table 20 shows an example of k0 for DCI format N1.

TABLE 20

| | $k_0$ | |
|---|---|---|
| $I_{Delay}$ | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Table 21 shows an example of k_0 for DCI format N1 with DCI CRC scrambled by G-RNTI.

TABLE 21

| $I_{Delay}$ | $k_0$ |
|---|---|
| 0 | 0 |
| 1 | 4 |
| 2 | 8 |
| 3 | 12 |
| 4 | 16 |
| 5 | 32 |
| 6 | 64 |
| 7 | 128 |

A UE is not expected to receive transmissions in 3 DL subframes following the end of a NPUSCH transmission by the UE.

The resource allocation information in DCI format N1, N2 (paging) for NPDSCH indicates to a scheduled UE Table 22 shows an example of the number of subframes for NPDSCH. A number of subframes ($N_{SF}$) determined by the resource assignment field ($I_{SF}$) in the corresponding DCI according to Table 22.

A repetition number ($N_{Rep}$) determined by the repetition number field ($I_{Rep}$) in the corresponding DCI according to Table 23.

TABLE 22

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 23 shows an example of the number of repetitions for NPDSCH.

TABLE 23

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

The number of repetitions for the NPDSCH carrying SystemInformationBlockType1-NB is determined based on the parameter schedulingInfoSIB1 configured by higher-layers and according to Table 24.

Table 24 shows an example of the number of repetitions for SIB1-NB.

TABLE 24

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

The starting radio frame for the first transmission of the NPDSCH carrying SystemInformationBlockType1-NB is determined according to Table 25.

Table 25 shows an example of a start radio frame for the first transmission of the NPDSCH carrying SIB1-NB.

TABLE 25

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 0 |
| | $N_{ID}^{Ncell}$ mod 4 = 1 | 16 |
| | $N_{ID}^{Ncell}$ mod 4 = 2 | 32 |
| | $N_{ID}^{Ncell}$ mod 4 = 3 | 48 |
| 8 | $N_{ID}^{Ncell}$ mod 2 = 0 | 0 |
| | $N_{ID}^{Ncell}$ mod 2 = 1 | 16 |
| 16 | $N_{ID}^{Ncell}$ mod 2 = 0 | 0 |
| | $N_{ID}^{Ncell}$ mod 2 = 1 | 1 |

The starting OFDM symbol for NPDSCH is given by index $l_{DataStrart}$ in the first slot in a subframe k and is determined as follows if subframe k is a subframe used for receiving SIB1-NB,
$l_{DataStrart}=3$ if the value of the higher layer parameter operationModeInfo is set to '00' or '01'
$l_{DataStrart}=0$ otherwise
else
$l_{DataStrart}$ is given by the higher layer parameter eutra-ControlRegionSize if the value of the higher layer parameter eutraControlRegionSize is present
$l_{DataStrart}=0$ otherwise UE Procedure for Reporting ACK/NACK The UE shall upon detection of a NPDSCH transmission ending in NB-IoT subframe n intended for the UE and for which an ACK/NACK shall be provided, start, at the end of n+k$_0$−1 DL subframe transmission of the NPUSCH carrying ACK/NACK response using NPUSCH format 2 in N consecutive NB-IoT UL slots, where $N=N_{Rep}^{AN} N_{slots}^{UL}$, where the value of $N_{Rep}^{AN}$ is given by the higher layer parameter ack-NACK-NumRepetitions-Msg4 configured for the associated NPRACH resource for Msg4 NPDSCH transmission, and higher layer parameter ack-NACK-NumRepetitions otherwise, and the value of $N_{slots}^{UL}$ is the number of slots of the resource unit, allocated subcarrier for ACK/NACK and value of k0 is determined by the ACK/NACK resource field in the DCI format of the corresponding NPDCCH according to Table 16.4.2-1, and Table 16.4.2-2 in 3GPP TS36.213.

Narrowband Physical Broadcast Channel (NPBCH)

The processing structure for the BCH transport channel is according to Section 5.3.1 of 3GPP TS 36.212, with the following differences:

The transmission time interval (TTI) is 640 ms.
The size of the BCH transport block is set to 34 bits
The CRC mask for NPBCH is selected according to 1 or 2 transmit antenna ports at eNodeB according to Table 5.3.1.1-1 of 3GPP TS 36.212, where the transmit antenna ports are defined in section 10.2.6 of 3GPP TS 36.211
The number of rate matched bits is defined in section 10.2.4.1 of 3GPP TS 36.211

Scrambling shall be done according to clause 6.6.1 of 3GPP TS 36.211 with $M_{bit}$ denoting the number of bits to be transmitted on the NPBCH. $M_{bit}$ equals 1600 for normal cyclic prefix. The scrambling sequence shall be initialized with $c_{init}=N_{ID}^{Ncell}$ in radio frames fulfilling $n_f$ mod 64=0.

Modulation should be done using QPSK modulation scheme for each antenna port is transmitted in subframe 0 during 64 consecutive radio frames starting in each radio frame fulfilling $n_f$ mod 64=0 and shall Layer mapping and precoding shall be done according to clause 6.6.3 of 3GPP TS 36.211 with $P \in \{1, 2\}$. The UE shall assume antenna ports $R_{2000}$ and $R_{2001}$ are used for the transmission of the narrowband physical broadcast channel.

The block of complex-valued symbols $y^{(p)}(0), \ldots , y^{(p)}(M_{symb}-1)$ for each antenna port is transmitted in subframe 0 during 64 consecutive radio frames starting in each radio frame fulfilling $n_f$ mod 64=0 and shall be mapped in sequence starting consecutive radio frames starting with y(0) to resource elements (k, l) not reserved for transmission of reference signals shall be in increasing order of the first the index k, then the index l. After mapping to a subframe, the subframe shall be repeated in subframe 0 in the 7 following radio frames, before continuing the mapping of $y^{(p)}(\cdot)$ to subframe 0 in the following radio frame. The first three OFDM symbols in a subframe shall not be used in the mapping process. For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing cell $N_{ID}^{cell}$ with $N_{ID}^{cell}$ in the calculation of $v_{shift}$ in clause 6.10.1.2 of 3GPP TS 36.211.

Narrowband Physical Downlink Control Channel (NPDCCH)

The narrowband physical downlink control channel carries control information. A narrowband physical control channel is transmitted on an aggregation of one or two consecutive narrowband control channel elements (NCCEs), where a narrowband control channel element corresponds to 6 consecutive subcarriers in a subframe where NCCE 0 occupies subcarriers 0 through 5 and NCCE 1 occupies subcarriers 6 through 11. The NPDCCH supports multiple formats as listed in Table 26. For NPDCCH format 1, both NCCEs belong to the same subframe. One or two NPDCCHs can be transmitted in a subframe.

Table 26 shows an example of supported NPDCCH formats.

TABLE 26

| NPDCCH format | Number of NCCEs |
|---|---|
| 0 | 1 |
| 1 | 2 |

Scrambling shall be done according to clause 6.8.2 of TS36.211. The scrambling sequence shall be initialized at the start of subframe $k_0$ according to section 16.6 of TS36.213 after every 4th NPDCCH subframe with $c_{init}= \lfloor n_s/2 \rfloor 2^9 + N_{ID}^{Ncell}$ where $n_s$ is the first slot of the NPDCCH subframe in which scrambling is (re-)initialized.

Modulation shall be done according to clause 6.8.3 of TS36.211 using the QPSK modulation scheme.

Layer mapping and precoding shall be done according to clause 6.6.3 of TS36.211 using the same antenna ports as the NPBCH.

The block of complex-valued symbols y(0), . . . y($M_{symb}$−1) shall be mapped in sequence starting with y(0) to resource elements (k, l) on the associated antenna port which meet all of the following criteria:

they are part of the NCCE(s) assigned for the NPDCCH transmission, and
they are not used for transmission of NPBCH, NPSS, or NSSS, and
they are assumed by the UE not to be used for NRS, and
they are not overlapping with resource elements used for PBCH, PSS, SSS, or CRS as defined in clause 6 of TS36.211 (if any), and
the index l in the first slot in a subframe fulfills $l \geq l_{NPDCCHStart}$ where $l_{NPDCCHStart}$ is given by clause 16.6.1 of 3GPP TS 36.213.

The mapping to resource elements (k, l) on antenna port p meeting the criteria above shall be in increasing order of first the index k and then the index l, starting with the first slot and ending with the second slot in a subframe.

The NPDCCH transmission can be configured by higher layers with transmissions gaps where the NPDCCH transmission is postponed. The configuration is the same as described for NPDSCH in clause 10.2.3.4 of TS36.211.

The UE shall not expect NPDCCH in subframe i if it is not a NB-IoT downlink subframe. In case of NPDCCH transmissions, in subframes that are not NB-IoT downlink subframes, the NPDCCH transmission is postponed until the next NB-IoT downlink subframe.

DCI Format

DCI Format N0

DCI format N0 is used for the scheduling of NPUSCH in one UL cell. The following information is transmitted by means of the DCI format N0:

Flag for format N0/format N1 differentiation (1 bit), Subcarrier indication (6 bits), Resource assignment (3 bits), Scheduling delay (2 bits), Modulation and coding scheme (4 bits), Redundancy version (1 bit), Repetition number (3 bits), New data indicator (1 bit), DCI subframe repetition number (2 bits)

DCI Format N1

DCI format N1 is used for the scheduling of one NPDSCH codeword in one cell and random access procedure initiated by a NPDCCH order. The DCI corresponding to a NPDCCH order is carried by NPDCCH. The following information is transmitted by means of the DCI format N1:

Flag for format N0/format N1 differentiation (1 bit), NPDCCH order indicator (1 bit)

Format N1 is used for random access procedure initiated by a NPDCCH order only if NPDCCH order indicator is set to "1", format N1 CRC is scrambled with C-RNTI, and all the remaining fields are set as follows:

Starting number of NPRACH repetitions (2 bits), Subcarrier indication of NPRACH (6 bits), All the remaining bits in format N1 are set to one.

Otherwise,

Scheduling delay (3 bits), Resource assignment (3 bits), Modulation and coding scheme (4 bits), Repetition number (4 bits), New data indicator (1 bit), HARQ-ACK resource (4 bits), DCI subframe repetition number (2 bits)

When the format N1 CRC is scrambled with a RA-RNTI, then the following fields among the fields above are reserved:

New data indicator, HARQ-ACK resource

If the number of information bits in format N1 is less than that of format N0, zeros shall be appended to format N1 until the payload size equals that of format N0.

DCI Format N2

DCI format N2 is used for paging and direct indication. The following information is transmitted by means of the DCI format N2.

Flag for paging/direct indication differentiation (1 bit)

If Flag=0:

Direct Indication information (8 bits), Reserved information bits are added until the size is equal to that of format N2 with Flag=1

If Flag=1:

Resource assignment (3 bits), Modulation and coding scheme (4 bits), Repetition number (4 bits), DCI subframe repetition number (3 bits)

NPDCCH Related Procedure

A UE shall monitor a set of NPDCCH candidates as configured by higher layer signaling for control information, where monitoring implies attempting to decode each of the NPDCCHs in the set according to all the monitored DCI formats.

An NPDCCH search space $NS_k^{(L',R)}$ at aggregation level $L' \in \{1, 2\}$ and repetition level $R \in \{1, 2, 4, 8, 16, 32, 64, 128, 256, 512, 1024, 2048\}$ is defined by a set of NPDCCH candidates where each candidate is repeated in a set of R consecutive NB-IoT downlink subframes excluding subframes used for transmission of SI messages starting with subframe k.

The locations of starting subframe k are given by $k=k_b$, where $k_b$ is the $b^{th}$ consecutive NB-IoT DL subframe from subframe k0, excluding subframes used for transmission of SI messages, and $$b = u \cdot R,$$

and $$r = 0, 1, \ldots, \frac{R_{max}}{R} - 1,$$

and where subframe k0 is a subframe satisfying the condition $(10n_f + \lfloor n_s/2 \rfloor) \mod T) = \lfloor \alpha_{offset} \cdot T \rfloor$, where $T = R_{max} \cdot G$, $T \geq 4$. G and $\alpha_{offset}$ are given by the higher layer parameters.

For Type1-NPDCCH common search space, k=k0 and is determined from locations of NB-IoT paging opportunity subframes.

If the UE is configured by high layers with a NB-IoT carrier for monitoring of NPDCCH UE-specific search space,
 the UE shall monitor the NPDCCH UE-specific search space on the higher layer configured NB-IoT carrier,
 the UE is not expected to receive NPSS, NSSS, NPBCH on the higher layer configured NB-IoT carrier.
otherwise,
 the UE shall monitor the NPDCCH UE-specific search space on the same NB-IoT carrier on which NPSS/NSSS/NPBCH are detected.

The starting OFDM symbol for NPDCCH given by index $l_{NPDCCHStart}$ in the first slot in a subframe k and is determined as follows
 if higher layer parameter eutraControlRegionSize is present
  $l_{NPDCCHStart}$ is given by the higher layer parameter eutraControlRegionSize
 Otherwise, $l_{NPDCCHStart}=0$ Narrowband Reference Signal (NRS)

Before a UE obtains operationModeInfo, the UE may assume narrowband reference signals are transmitted in subframes #0 and #4 and in subframes #9 not containing NSSS.

When UE receives higher-layer parameter operationModeInfo indicating guardband or standalone, Before the UE obtains SystemInformationBlockType1-NB, the UE may assume narrowband reference signals are transmitted in subframes #0, #1, #3, #4 and in subframes #9 not containing NSSS.

After the UE obtains SystemInformationBlockType1-NB, the UE may assume narrowband reference signals are transmitted in subframes #0, #1, #3, #4, subframes #9 not containing NSSS, and in NB-IoT downlink subframes and shall not expect narrowband reference signals in other downlink subframes.

When UE receives higher-layer parameter operationModeInfo indicating inband-SamePCI or inband-DifferentPCI, Before the UE obtains SystemInformationBlockType1-NB, the UE may assume narrowband reference signals are transmitted in subframes #0, #4 and in subframes #9 not containing NSSS.

After the UE obtains SystemInformationBlockType1-NB, the UE may assume narrowband reference signals are transmitted in subframes #0, #4, subframes #9 not containing NSSS, and in NB-IoT downlink subframes and shall not expect narrowband reference signals in other downlink subframes.

Narrowband Primary Synchronization Signal (NPSS)

The sequence $d_l(n)$ used for the narrowband primary synchronization signal is generated from a frequency-domain Zadoff-Chu sequence according to Equation 17 below.

$$d_l(n) = S(l) \cdot e^{-j\frac{\pi u n n+1}{11}}, \quad \text{[Equation 17]}$$

$$n = 0, 1, \cdots, 10$$

where the Zadoff-Chu root sequence index u=5 and S(l) for different symbol indices l is given by Table 27.

Table 27 shows an example of S(l).

TABLE 27

| Cyclic prefix length | S(3), . . . , S(13) |
|---|---|
| Normal | 1  1  1  1  −1  −1  1  1  1  −1  1 |

The same antenna port shall be used for all symbols of the narrowband primary synchronization signal within a subframe.

UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

Narrowband Secondary Synchronization Signals (NSSS)

The sequence d(n) used for the narrowband secondary synchronization signal is generated from a frequency-domain Zadoff-Chu sequence according to Equation 18 below.

$$d(n) = b_q(n) \cdot e^{-j2\pi\theta_f n} \cdot e^{-j\frac{\pi u n'(n'+1)}{131}} \quad \text{[Equation 18]}$$

where $n = 0, 1, \cdots, 131$ $n' = n \bmod 131$ $m = n \bmod 128$ $u = N_{ID}^{Ncell} \bmod 126 + 3$ $q = \left\lfloor \frac{N_{ID}^{Ncell}}{126} \right\rfloor$ The binary sequence $b_q(n)$ is given by Table 28. The cyclic shift $\theta_f$ in frame number $n_f$ is given by $$\theta_f = \frac{33}{132}(n_f/2)$$

mod 4.

Table 28 shows an example of $b_q(n)$

TABLE 28

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 1 −1 −1 1 −1 1 1 1 −1 1 −1 −1 1 1 1 −1 −1 1 −1 1 1 −1 1 −1 −1 1 1 1 −1 1 −1 −1 1 −1 1 1 1 −1 −1 1 1 1 −1 1 −1 −1 1 1 1 −1 1 −1 −1 1 1 1 −1 1 −1 −1 1 1 1 −1 1 −1 −1 1 1 1 −1 1 −1 −1 1 1 1 −1 1 −1 −1 1 1 1 −1 1 −1 −1 1 1 1 −1 1 −1 −1 1 1 1 −1 1 −1 −1 1 1 1 −1 −1 1 −1 −1 1 1 −1] |
| 2 | [1 −1 −1 1 −1 1 1 1 −1 −1 1 1 1 −1 −1 1 1 −1 −1 1 1 1 −1 −1 1 1 −1 −1 1 1 1 −1 −1 1 1 1 −1 −1 1 1 1 −1 −1 −1 1 1 −1 1 1 −1 −1 1 −1 −1 1 1 −1 −1 1 −1 1 1 1 −1 −1 1 1 −1 1 −1 1 1 1 −1 −1 1 1 −1 −1 1 −1 1 1 −1 −1 1 −1 −1 1 1 1 −1 −1 1 1 −1 −1 1 1 −1 1 −1 −1 1 −1 −1 1 1 1 −1 −1 1 1 −1 −1 1 −1 1 1 1 −1 1 1 −1 1 −1 −1 1 1] |
| 3 | [1 −1 −1 1 −1 1 1 1 −1 −1 1 1 1 −1 −1 1 −1 −1 −1 1 −1 1 1 −1 −1 1 −1 1 1 −1 1 −1 −1 −1 1 1 −1 −1 −1 1 1 1 −1 −1 1 1 1 −1 −1 1 1 1 −1 1 1 −1 1 −1 −1 1 1 −1 1 −1 1 1 −1 1 −1 −1 1 1 1 −1 −1 1 1 1 −1 −1 1 1 1 −1 −1 −1 1 −1 1 1 −1 1 1 1 −1 −1 −1 1 1 1 −1 1 −1 −1 1 1 1 −1 −1 1 1 −1 −1 1 1 −1 −1 1 1 1 −1 1 1 −1 1 1 −1 1 −1] |

The sequences $d_l(n)$ shall be mapped to resource elements (k, l) in increasing order of first the index k=0, 1, . . . , $N_{sc}^{RB}$−2 and then the index l=3, 4, . . . , $2N_{symb}^{DL}$−1 in subframe 5 in every radio frame. For resource elements (k, l) overlapping with resource elements where cell-specific reference signals are transmitted, the corresponding sequence element d(n) is not used for the NPSS but counted in the mapping process.

The same antenna port shall be used for all symbols of the narrowband secondary synchronization signal within a subframe.

UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k, l) in sequence starting with d(0) in increasing order of the first the index k over the 12 assigned subcarriers and then the index l over the assigned last $N_{symb}^{NSSS}$ symbols of subframe 9 in radio frames fulfilling $n_f$ mod 2=0, where $N_{symb}^{NSSS}$ is given by Table 29.

Table 29 shows an example of the number of NSSS symbols.

TABLE 29

| Cyclic prefic length | $N_{symb}^{NSSS}$ |
|---|---|
| Normal | 11 |

OFDM Baseband Signal Generation

If the higher layer parameter operationModeInfo does not indicate 'inband-SamePCI' and samePCI-Indicator does not indicate 'samePCI', then the time-continuous signal $s_l^{(p)}(t)$ on antenna port p in OFDM symbol l in a downlink slot is defined by Equation 19 below.

$$s_l^{(p)}(t) = \sum_{k=-\lfloor N_{SC}^{RB}/2 \rfloor}^{\lfloor N_{RB}^{DL} N_{SC}^{RB}/2 \rfloor} a_{k^{(-)},l}^{(p)} \cdot e^{j2\pi\left(k+\frac{1}{2}\right)\Delta f(t-N_{CP,l}T_s)}$$ [Equation 19]

for $0 \leq t < (N_{CP,i}+N) \times T_s$ where $k^{(-)}=k+\lfloor N_{sc}^{RB}/2 \rfloor$, N=2048, $\Delta f$=15 kHz and $a_{k,l}^{(p)}$ is the content of resource element (k, l) on antenna port p.

If the higher layer parameter operationModeInfo indicates 'inband-SamePCI' or samePCI-Indicator indicate 'samePCI', then the time-continuous signal $s_l^{(p)}(t)$ on antenna port p in OFDM symbol l', where $l'=l+N_{symb}^{DL}(n_s \mod 4) \in \{0, \ldots, 27\}$ is the OFDM symbol index from the start of the last even-numbered subframe, is defined by Equation 20 below.

[Equation 20]

$$s_l^{(p)}(t) =$$

$$\sum_{k=-\lfloor N_{RB}^{DL} N_{SC}^{RB}/2 \rfloor}^{-1} e^{\theta_{k^{(-)}}} a_{k^{(-)},l}^{(p)} \cdot e^{j2\pi k \Delta f\left(t-N_{CP,l'} \mod N_{symb}^{DL} T_s\right)} +$$

$$\sum_{k=1}^{\lfloor N_{RB}^{DL} N_{SC}^{RB}/2 \rfloor} e^{\theta_{k^{(+)}}} a_{k^{(-)},l}^{(p)} \cdot e^{j2\pi k \Delta f\left(t-N_{CP,l'} \mod N_{symb}^{DL} T_s\right)}$$

for $0 \leq t < (N_{CP,i}+N) \times T_s$ where $k^{(-)}=k+\lfloor N_{RB}^{DL} N_{sc}^{RB}/2 \rfloor$ and $k^{(+)}=k+\lfloor N_{RB}^{DL} N_{sc}^{RB}/2 \rfloor -1$, $\theta_{k,l}= j2\pi f_{NB-IoT}T_s(N+\Sigma_{i=0}^{l'} N_{CP,i \mod 7})$ if resource element (k, l') is used for Narrowband IoT, and 0 otherwise, and $f_{NB-IoT}$ is the frequency location of the carrier of the Narrowband IoT PRB minus the frequency location of the center of the LTE signal.

Only normal CP is supported for Narrowband IoT downlink in this release of the specification.

Hereinafter, the physical layer process of the narrowband physical broadcast channel (NPBCH) will be described in more detail.

Scrambling

Scrambling shall be done according to clause 6.6.1 with $M_{bit}$ denoting the number of bits to be transmitted on the NPBCH. $M_{bit}$ equals 1600 for normal cyclic prefix. The scrambling sequence shall be initialised with $c_{init}=N_{ID}^{Ncell}$ in radio frames fulfilling $n_f$ mod 64=0

Modulation

Modulation shall be done according to clause 6.6.2 using the modulation scheme in Table 10.2.4.2-1.

Table 30 shows an example of a modulation scheme for NPBCH.

TABLE 30

| Physical channel | Modulation schemes |
|---|---|
| NPBCH | QPSK |

Layer Mapping and Precoding

Layer mapping and precoding shall be done according to clause 6.6.3 with P E The UE shall assume antenna ports $R_{2000}$ and $R_{2001}$ are used for the transmission of the narrowband physical broadcast channel.

Mapping to Resource Elements

The block of complex-valued symbols $y^{(p)}(0), \ldots, y^{(p)}(M_{symb}-1)$ for each antenna port is transmitted in subframe 0 during 64 consecutive radio frames starting in each radio frame fulfilling $n_f$ mod 64=0 and shall be mapped in sequence starting with y(0) to resource elements (k, l). The mapping to resource elements (k, l) not reserved for transmission of reference signals shall be in increasing order of first the index k, then the index l. After mapping to a subframe, the subframe shall be repeated in subframe 0 in the 7 following radio frames, before continuing the mapping of $y^{(p)}(\cdot)$ to subframe 0 in the following radio frame. The first three OFDM symbols in a subframe shall not be used in the mapping process.

For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing $N_{ID}^{cell}$ with $N_{ID}^{Ncell}$ in the calculation of $v_{shift}$ in clause 6.10.1.2.

Next, information related to MIB-NB and SIBN1-NB will be described in more detail.

MasterInformationBlock-NB

The MasterInformationBlock-NB includes the system information transmitted on BCH.

Signaling radio bearer: N/A
RLC-SAP: TM
Logical channel: BCCH
Direction: E-UTRAN to UE Table 31 shows an example of the MasterInformationBlock-NB format.

TABLE 31

```
-- ASN1START
MasterInformationBlock-NB ::=    SEQUENCE {
    systemFrameNumber-MSB-r13        BIT STRING (SIZE (4)),
    hyperSFN-LSB-r13                 BIT STRING (SIZE (2)),
```

TABLE 31-continued

```
schedulingInfoSIB1-r13              INTEGER (0..15),
systemInfoValueTag-r13              INTEGER (0..31),
ab-Enabled-r13                      BOOLEAN,
operationModeInfo-r13               CHOICE {
    inband-SamePCI-r13                  Inband-SamePCI-NB-r13,
    inband-DifferentPCI-r13             Inband-DifferentPCI-NB-r13,
    guardband-r13                       Guardband-NB-r13,
    standalone-r13                      Standalone-NB-r13
},
    spare                           BIT STRING (SIZE (11))
}
ChannelRasterOffset-NB-r13::= ENUMERATED {khz-7dot5, khz-2dot5, khz2dot5,
khz7dot5}
Guardband-NB-r13 ::=                SEQUENCE{
    rasterOffset-r13                    ChannelRasterOffset-NB-r13,
    spare                               BIT STRING (SIZE (3))
}
Inband-SamePCI-NB-r13 ::=           SEQUENCE {
    eutra-CRS-SequenceInfo-r13          INTEGER (0..31)
}
Inband-DifferentPCI-NB-r13 ::=      SEQUENCE {
    eutra-NumCRS-Ports-r13              ENUMERATED {same, four},
    rasterOffset-r13                    ChannelRasterOffset-NB-r13,
    spare                               BIT STRING (SIZE (2))
}
Standalone-NB-r13 ::=               SEQUENCE{
    spare                               BIT STRING (SIZE (5))
}
-- ASN1STOP
```

Table 32 shows the description of the MasterInformationBlock-NB field.

TABLE 32

| MasterInformationBlock-NB field descriptions |
|---|
| ab-Enabled |
| Value TRUE indicates that access barring is enabled and that the UE shall acquire SystemInformationBlockType14-NB before initiating RRC connection establishment or resume. |
| eutra-CRS-SequenceInfo |
| Information of the carrier containing NPSS/NSSS/NPBCH. Each value is associated with an E-UTRA PRB index as an offset from the middle of the LTE system sorted out by channel raster offset. |
| eutra-NumCRS-Ports |
| Number of E-UTRA CRS antenna ports, either the same number of ports as NRS or 4 antenna ports. |
| hyperSFN-LSB |
| Indicates the 2 least significant bits of hyper SFN. The remaining bits are present in SystemInformationBlockType1-NB. |
| operationModeInfo |
| Deployment scenario (in-band/guard-band/standalone) and related information. See TS 36.211 [21] and TS 36.213 [23]. Inband-SamePCI indicates an in-band deployment and that the NB-IoT and LTE cell share the same physical cell id and have the same number of NRS and CRS ports. Inband-DifferentPCI indicates an in-band deployment and that the NB-IoT and LTE cell have different physical cell id. guardband indicates a guard-band deployment, standalone indicates a standalone deployment. |
| rasterOffset |
| NB-IoT offset from LTE channel raster. Unit in kHz in set {−7.5, −2.5, 2.5, 7.5} |
| schedulingInfoSIB1 |
| This field contains an index to a table specified in TS 36.213 [23, Table 16.4.1.3-3] that defines SystemInformationBlockType1-NB scheduling information. |
| systemFrameNumber-MSB |
| Defines the 4 most significant bits of the SFN. As indicated in TS 36.211 [21], the 6 least significant bits of the SFN are acquired implicitly by decoding the NPBCH. |
| systemInfoValueTag |
| Common for all SIBs other than MIB-NB, SIB14-NB and SIB16-NB. |

SystemInformationBlockType1-NB

The SystemInformationBlockType1-NB message contains information relevant when evaluating if a UE is allowed to access a cell and defines the scheduling of other system information.

Signaling radio bearer: N/A
RLC-SAP: TM
Logical channel: BCCH
Direction: E-UTRAN to UE Table 33 shows an example of a SystemInformationBlockType1 (SIB1)-NB message.

TABLE 33

```
-- ASN1START
SystemInformationBlockType1-NB ::= SEQUENCE {
    hyperSFN-MSB-r13            BIT STRING (SIZE (8)),
    cellAccessRelatedInfo-r13   SEQUENCE{
        plmn-IdentityList-r13       PLMN-IdentityList-NB-r13,
        trackingAreaCode-r13        TrackingAreaCode,
        cellIdentity-r13            CellIdentity,
        cellBarred-r13              ENUMERATED {barred, notBarred},
        intraFreqReselection-r13    ENUMERATED {allowed, notAllowed}
    },
    cellSelectionInfo-r13       SEQUENCE{
        q-RxLevMin-r13              Q-RxLevMin,
        q-QualMin-r13               Q-QualMin-r9
    },
    p-Max-r13                   P-Max                           OPTIONAL, -- Need OP
    freqBandIndicator-r13       FreqBandIndicator-NB-r13,
    freqBandInfo-r13            NS-PmaxList-NB-r13              OPTIONAL, -- Need OR
    multiBandInfoList-r13       MultiBandInfoList-NB-r13        OPTIONAL, -- Need OR
    downlinkBitmap-r13          DL-Bitmap-NB-r13                OPTIONAL, --Need OP,
    eutraControlRegionSize-r13  ENUMERATED {n1, n2, n3}         OPTIONAL, --Cond inband
    nrs-CRS-PowerOffset-r13     ENUMERATED {dB-6,      dB-4dot77, dB-3,
                                    dB-1dot77, dB0,            dB1,
                                    dB1dot23, dB2,             dB3,
                                    dB4,       dB4dot23,       dB5,
                                    dB6,       dB7,            dB8,
                                    dB9}                        OPTIONAL, -- Cond inband-SamePCI
    schedulingInfoList-r13      SchedulingInfoList-NB-r13,
    si-WindowLength-r13         ENUMERATED {ms160,     ms320,   ms480, ms640,
                                    ms960, ms1280, ms1600,
                                    spare1},
    si-RadioFrameOffset-r13     INTEGER (1..15)                 OPTIONAL, -- Need OP
    systemInfoValueTagList-r13  SystemInfoValueTagList-NB-r13   OPTIONAL, --Need OR
    lateNonCriticalExtension    OCTET STRING                    OPTIONAL,
    nonCriticalExtension        SEQUENCE { }                    OPTIONAL
}
PLMN-IdentityList-NB-r13 ::=    SEQUENCE (SIZE (1..maxPLMN-r11)) OF PLMN-IdentityInfo-NB-r13
PLMN-IdentityInfo-NB-r13 ::=    SEQUENCE {
    plmn-Identity-r13               PLMN-Identity,
    cellReservedForOperatorUse-r13  ENUMERATED {reserved, notReserved},
    attachWithoutPDN-Connectivity-r13  ENUMERATED {true}        OPTIONAL --Need OP
}
SchedulingInfoList-NB-r13 ::= SEQUENCE (SIZE (1..maxSI-Message-NB-r13)) OF SchedulingInfo-NB-r13
SchedulingInfo-NB-r13::=        SEQUENCE {
    si-Periodicity-r13              ENUMERATED {rf64, rf128, rf256, rf512,
                                        rf1024, rf2048, rf4096, spare},
    si-RepetitionPattern-r13        ENUMERATED {every2ndRF, every4thRF,
                                        every 8thRF,    every 16thRF},
    sib-MappingInfo-r13             SIB-MappingInfo-NB-r13,
    si-TB-r13       ENUMERATED {b56, b120, b208, b256, b328, 6440, b552, b680}
}
SystemInfoValueTagList-NB-r13 ::=   SEQUENCE (SIZE (1.. maxSI-Message-NB-r13)) OF
                                    SystemInfoValueTagSI-r13
SIB-MappingInfo-NB-r13 ::=      SEQUENCE (SIZE (0.. maxSIB-1)) OF SIB-Type-NB-r13
SIB-Type-NB-r13 ::=             ENUMERATED {
                                sibType3-NB-r13, sibType4-NB-r13, sibType5-NB-r13,
                                sibType14-NB-r13, sibType16-NB-r13,
                                spare3, spare2, spare1}
-- ASN1STOP
```

Table 34 shows the description of the SystemInformationBlockType1-NB field.

TABLE 34

SystemInformationBlockType1-NB field descriptions attachWithoutPDN-Connectivity
If present, the field indicates that attach without PDN connectivity as specified in TS
24.301 [35] is supported for this PLMN.
cellBarred
Barred means the cell is barred, as defined in TS 36.304 [4].
cellIdentity
Indicates the cell identity.
cellReservedForOperatorUse
As defined in TS 36.304 [4].
cellSelectionInfo
Cell selection information as specified in TS 36.304 [4].
downlinkBitmapNB-IoT downlink subframe configuration for downlink
transmission.
If the bitmap is not present, the UE shall assume that all subframes are valid (except
for subframes carrying NPSS/NSSS/NPBCH/SIB1-NB) as specified in TS
36.21323]
eutraControlRegionSize
Indicates the control region size of the E-UTRA cell for the in-band operation mode,
Unit is in number of OFDM symbols.
freqBandIndicator
A list of as defined in TS 36.101 [42, table 6.2.4-1] for the frequency band in
freqBandIndicator
freqBandInfo
A list of additionalPmax and additionalSpectrumEmission values as defined in TS
36.101 [42, table 6.2.4-1] for the frequency band in freqBandIndicator
hyperSFN-MSB
Indicates the 8 most significat bits of hyper-SFN. Together with hyperSFN-LSB in
MIB-NB, the complete hyper-SFN is built up. hyper-SFN is incremented by one
when the SFN wraps around.
intraFreqReselection
Used to control cell reselection to intra-frequency cells when the highest ranked cell
is barred, or treated as barred by the UE, as specified in TS 36.304 [4].
multiBandInfoList
A list of additional frequency band indicators, additionalPmax and
additionalSpectrumEmission values, as defined in TS 36.101 [42, table 5.5-1]. If the
UE supports the frequency band in the freqBandIndicator IE it shall apply that
frequency band. Otherwise, the UE shall apply the first listed band which it supports
in the multiBandInfoList IE.
nrs-CRS-PowerOffset
NRS power offset between NRS and E-UTRA CRS. Unit in dB. Default value of 0.
plmn-IdentityList
List of PLMN identities. The first listed PLMN-Identity is the primary PLMN.
p-Max
Value applicable for the cell. If absent the UE applies the maximum power according
to the UE capability.
q-QualMin
Parameter "Qqualmin" in TS 36.304 [4].
q-RxLevMin
Parameter Qrxlevmin in TS 36.304 [4]. Actual value Qrxlevmin = IE value * 2 [dB].
schedulingInfoList
Indicates additional scheduling information of SI messages.
si-Periodicity
Periodicity of the SI-message in radio frames, such that rf256 denotes 256 radio
frames, rf512 denotes 512 radio frames, and so on.
si-RadioFrameOffset
Offset in number of radio frames to calculate the start of the SI window.
If the field is absent, no offset is applied.
si-RepetitionPattern
Indicates the starting radio frames within the SI window used for SI message
transmission. Value every2ndRF corresponds to every second radio frame, value
every4thRF corresponds to every fourth radio frame and so on starting from the first
radio frame of the SI window used for SI transmission.
si-TB
This field indicates the transport block size in number of bits used to broadcast the
SI message.
si-WindowLength
Common SI scheduling window for all SIs. Unit in milliseconds, where ms 160
denotes 160 milliseconds, ms320 denotes 320 milliseconds and so on.
sib-MappingInfo
List of the SIBs mapped to this SystemInformation message. There is no mapping
information of SIB2; it is always present in the first SystemInformation message
listed in the schedulingInfoList list.
systemInfoValueTagList
Indicates SI message specific value tags. It includes the same number of entries, and
listed in the same order, as in SchedulingInfoList.

TABLE 34-continued

SystemInformationBlockType1-NB field descriptions systemInfoValueTagSI
SI message specific value tag as specified in Clause 5.2.1.3. Common for all SIBs within the SI message other than SIB14.
trackingAreaCode
A trackingAreaCode that is common for all the PLMNs listed.

TABLE 35

| Conditional presence | Explanation |
| --- | --- |
| inband | The field is mandatory present if IE operationModeInfo in MIB-NB is set to inband-SamePCI or inband-DifferentPCI. Otherwise the field is not present. |
| inband-SamePCI | The field is mandatory present, if IE operationModeInfo in MIB-NB is set to inband-SamePCI. Otherwise the field is not present. |

NB-IoT Initial Access Procedure

In the general signal transmission/reception procedure of NB-IoT, a procedure for initial access by an NB-IoT terminal to a base station has been briefly described. Specifically, the procedure for initial access by the NB-IoT terminal to the base station may include a procedure for searching for an initial cell and a procedure for obtaining system information by the NB-IoT terminal.

Figure 15:
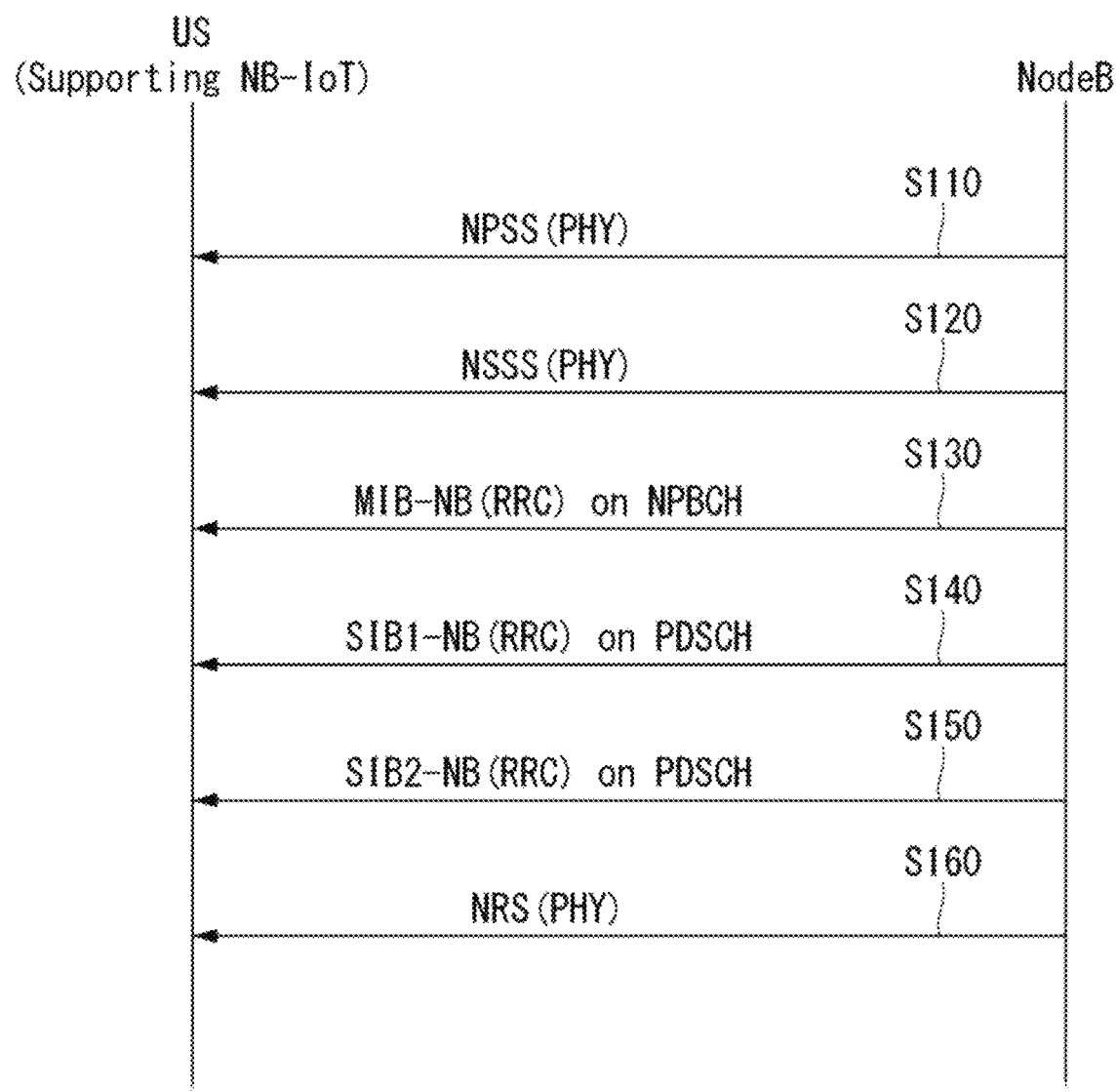
FIG. 15 is an example of an initial access procedure of NB-IoT.

In this regard, a specific signaling procedure between a terminal (UE) and a base station (e.g., NodeB, eNodeB, eNB, gNB, etc.) related to initial access of NB-IoT may be illustrated as shown in FIG. 15. Hereinafter, a general initial access procedure of NB-IoT, configuration of NPSS/NSSS, acquisition of system information (e.g., MIB, SIB, etc.) will be described in more detail with reference to FIG. 15.

FIG. 15 is an example of an initial access procedure of NB-IoT, and names of each physical channel and/or physical signal may be differently configured or referred to according to a wireless communication system to which NB-IoT is applied. As an example, basically, FIG. 15 is described in consideration of the NB-IoT based on the LTE system, but this is only for convenience of description, and it is a matter of course that the contents may be extended and applied to the NB-IoT based on the NR system.

As shown in FIG. 15, NB-IoT is based on following signals transmitted in the downlink: the first and the second narrowband synchronization signals (NPSS & NSSS). The NPSS is transmitted over 11 sub-carriers from the first subcarrier to the eleventh subcarrier in the sixth subframe of each frame (S110), and the NSSS is transmitted over 12 sub-carriers in the NB-IoT carrier in the tenth subframe for FDD and the first subframe for TDD of every other frame (S120).

The NB-IoT UE may receive MasterInformationBlock-NB (MIB-NB) on NPBCH (NB Physical Broadcast Channel) (S130).

The MIB-NB uses a fixed schedule with a periodicity of 640 ms and repetitions made within 640 ms. The first transmission of the MIB-NB is scheduled in subframe #0 of radio frames for which the SFN mod 64=0 and repetitions are scheduled in subframe #0 of all other radio frames. The transmissions are arranged in 8 independently decodable blocks of 80 ms duration.

Then, the UE may receive SystemInformationBlock-Type1-NB (SIB1-NB) on PDSCH (S140).

The SIB1-NB uses a fixed schedule with a periodicity of 2560 ms. SIB1-NB transmission occurs in subframe #4 of every other frame in 16 continuous frames. The starting frame for the first transmission of the SIB1-NB is derived from the cell PCID and the number of repetitions within the 2560 ms period and repetitions are made, equally spaced, within the 2560 ms period. TBS for SystemInformation-BlockType1-NB and the repetitions made within the 2560 ms are indicated by schedulingInfoSIB1 field in the MIB-NB.

The SI messages are transmitted within periodically occurring time domain windows (referred to as SI-windows) using scheduling information provided in SystemInformationBlockType1-NB. Each SI message is associated with a SI-window and the SI-windows of different SI messages do not overlap. That is, within one SI-window only the corresponding SI is transmitted. The length of the SI-window is common for all SI messages, and is configurable.

Within the SI-window, the corresponding SI message can be transmitted a number of times over 2 or 8 consecutive NB-IoT downlink subframes depending on TBS. The UE acquires the detailed time/frequency domain scheduling information and other information, e.g. used transport format for the SI messages from schedulingInfoList field in SystemInformationBlockType1-NB. The UE is not required to accumulate several SI messages in parallel but may need to accumulate a SI message across multiple SI windows, depending on coverage condition.

SystemInformationBlockType1-NB configures the SI-window length and the transmission periodicity for all SI messages.

Further, the UE may receive SystemInformationBlock-Type2-NB (SIB2-NB) on PDSCH for additional information (S150).

On the other hand, NRS in FIG. 15 refers to Narrowband reference signal.

Random Access Procedure of NB-IoT

In the general signal transmission/reception procedure of NB-IoT, a procedure for randomly accessing a base station by an NB-IoT terminal has been briefly described. Specifically, a procedure in which the NB-IoT terminal randomly accesses the base station may be performed through a procedure in which the NB-IoT terminal transmits a preamble to the base station and receives a response thereto.

Figure 16:
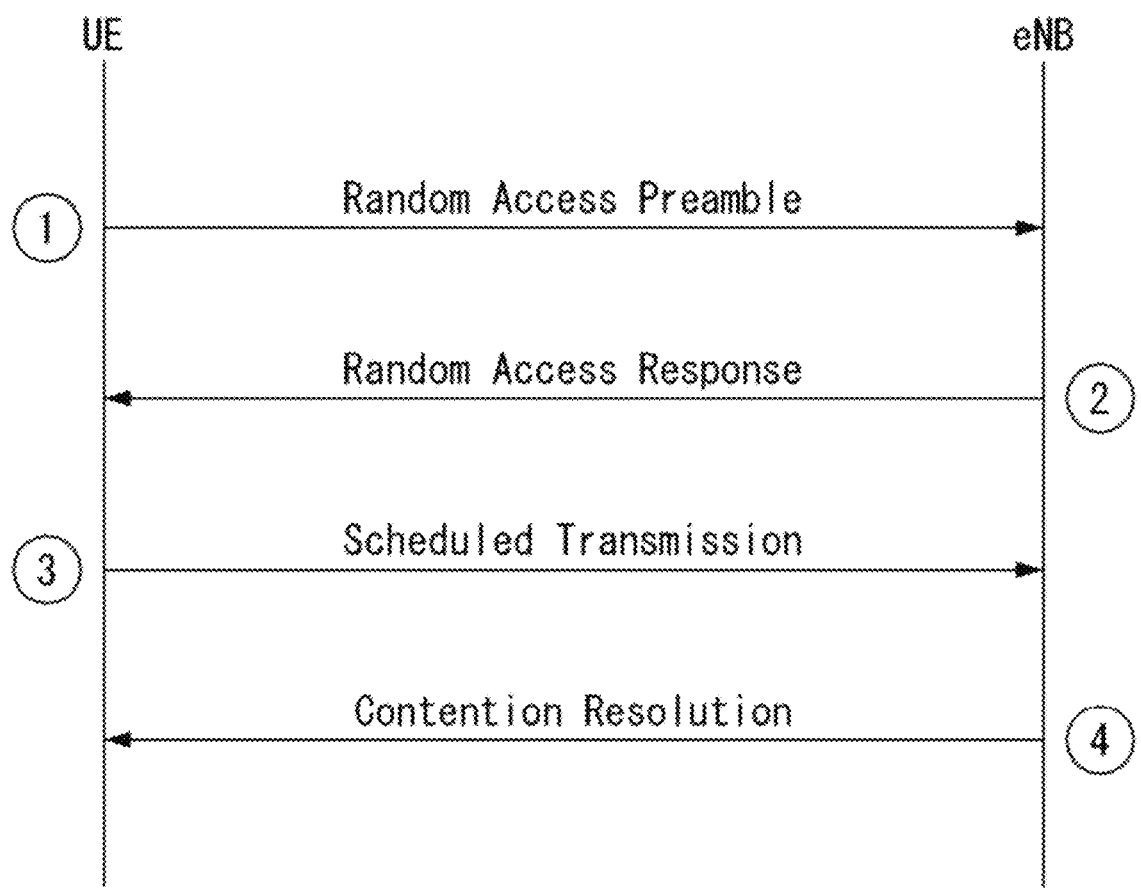
FIG. 16 is an example of a random access procedure of NB-IoT.

In this regard, a specific signaling procedure between a terminal (UE and a base station (e.g., NodeB, eNodeB, eNB, gNB, etc.) related to random access of NB-IoT may be illustrated as shown in FIG. 16. Hereinafter, detailed contents of a random access procedure based on messages (e.g., msg1, msg2, msg3, msg4) used for a general random access procedure of NB-IoT will be described through the description of FIG. 16.

FIG. 16 is an example of an NB-IoT random access procedure, and names of each physical channel, each physical signal, and/or each message may be differently configured or referred to according to a wireless communication system to which NB-IoT is applied. As an example, basically, FIG. 16 is described in consideration of the NB-IoT based on the LTE system, but this is only for convenience of description, and it is a matter of course that the contents may be extended and applied to the NB-IoT based on the NR system.

As shown in FIG. 16, in the case of NB-IoT, the RACH procedure has the same message flow as LTE having different parameters.

Hereinafter, the NPRACH transmitted from the NB-IoT terminal to the base station in relation to the NB-IoT random access procedure will be described in detail.

The physical layer random access preamble is based on a single subcarrier frequency hopping symbol group.

Figure 17:
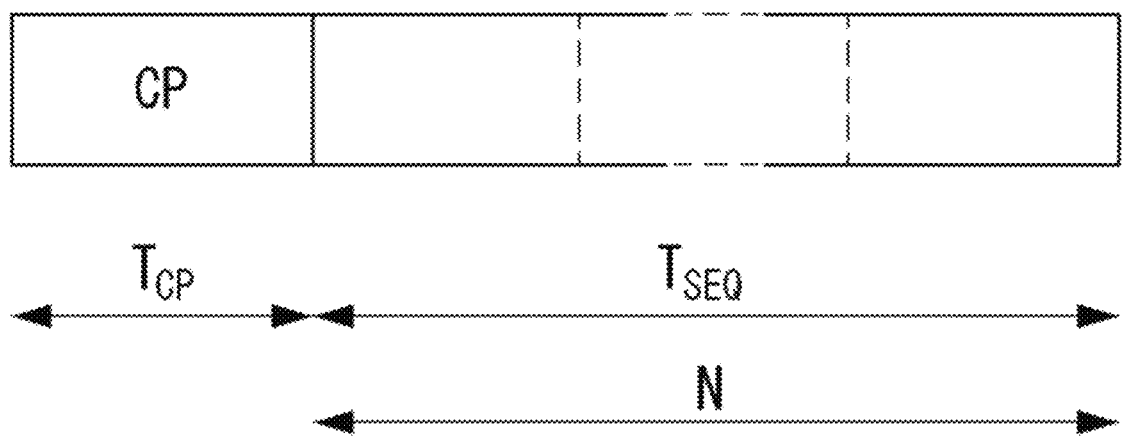
FIG. 17 shows the structure of a random access symbol group.

FIG. 17 illustrates the structure of a random access symbol group.

As shown in FIG. 17, a random access symbol group consists of a sequence of identical symbols with a cyclic prefix of length and a total length. The total number of symbol groups in the preamble repetition unit is denoted by P. The number of time-continuous symbol groups is given by G.

The parameter values of frame structures 1 and 2 are shown in Tables 36 and 37, respectively.

TABLE 36

| Preamble format | G | P | N | $T_{CP}$ | $T_{SEQ}$ |
|---|---|---|---|---|---|
| 0 | 4 | 4 | 5 | $2048T_s$ | $5 \cdot 8192T_s$ |
| 1 | 4 | 4 | 5 | $8192T_s$ | $5 \cdot 8192T_s$ |
| 2 | 6 | 6 | 3 | $24576T_s$ | $3 \cdot 24576T_s$ |

TABLE 37

| Preamble format | Supported uplink-downlink configurations | G | P | N | $T_{CP}$ | $T_{SEQ}$ |
|---|---|---|---|---|---|---|
| 0 | 1, 2, 3, 4, 5 | 2 | 4 | 1 | $4778T_s$ | $1 \cdot 8192T_s$ |
| 1 | 1, 4 | 2 | 4 | 2 | $8192T_s$ | $2 \cdot 8192T_s$ |
| 2 | 3 | 2 | 4 | 4 | $8192T_s$ | $4 \cdot 8192T_s$ |
| 0-a | 1, 2, 3, 4, 5 | 3 | 6 | 1 | $1536T_s$ | $1 \cdot 8192T_s$ |
| 1-a | 1, 4 | 3 | 6 | 2 | $3072T_s$ | $2 \cdot 8192T_s$ |

Transmission of the random access preamble is limited to specific time and frequency resources when triggered by the MAC layer. Each NPRACH resource configuration can configure up to three NPRACH resource configurations in cells corresponding to different coverage levels. NPRACH resource configuration is given by periodicity, number of repetitions, start time, frequency position, and number of subcarriers.

Machine Type Communication (MTC)

MTC (Machine Type Communication) is an application that does not require a large throughput that can be applied to M2M (Machine-to-Machine) or IoT (Internet-of-Things), and refers to the communication technology adopted to meet the requirements of an IoT service in 3GPP.

The MTC may be implemented to satisfy the criteria of (i) low cost & low complexity, (ii) enhanced coverage, and (iii) low power consumption.

In 3GPP, MTC has been applied from release 10, and briefly looks at the features of MTC added for each release of 3GPP.

First, the MTC described in 3GPP release 10 and release 11 relates to a load control method.

The load control method is to prevent IoT (or M2M) devices from suddenly loading the base station.

More specifically, in the case of release 10, the load control method relates to a method of controlling the load by disconnecting the connection to the connected IoT devices when a load occurs in the base station, and in the case of release 11, the load control method relates to a method of blocking access to a terminal in advance by a base station notifying the terminal to access later through broadcasting such as SIB14.

In the case of Release 12, features for low cost MTC were added, and for this purpose, UE category 0 was newly defined. UE category is an indicator of how much data a terminal can process in a communication modem.

That is, a UE of UE category 0 reduces the baseband and RF complexity of the UE by using a half duplex operation with a reduced peak data rate, relaxed RF requirements, and a single receiving antenna.

In Release 13, a technology called eMTC (enhanced MTC) was introduced, and by operating only at 1.08 MHz, which is the minimum frequency bandwidth supported by legacy LTE, the price and power consumption can be further reduced.

The contents described below are mainly eMTC-related features, but can be equally applied to MTC, eMTC, and MTC applied to 5G (or NR) unless otherwise specified. Hereinafter, for convenience of description, it will be collectively referred to as MTC.

Therefore, the MTC to be described later may be referred to as eMTC (enhanced MTC), LTE-M1/M2, BL (Bandwidth reduced low complexity)/CE (coverage enhanced), non-BL UE (in enhanced coverage), NR MTC, enhanced BL/CE, etc. as well. That is, the term MTC can be replaced with a term to be defined in the future 3GPP standard.

MTC General Characteristics (1) MTC operates only in a specific system bandwidth (or channel bandwidth).

A specific system bandwidth may use 6RB of legacy LTE as shown in Table 38 below, and may be defined in consideration of the frequency range and subcarrier spacing (SCS) of the NR defined in Tables 39 to 41. The specific system bandwidth may be expressed as a narrowband (NB). For reference, Legacy LTE refers to a part described in 3GPP standards other than MTC. Preferably, in the NR, the MTC may operate using RBs corresponding to the lowest system bandwidth of Tables 40 and 41 below, as in legacy LTE. Alternatively, in NR, the MTC may operate in at least one bandwidth part (BWP) or may operate in a specific band of the BWP.

TABLE 38

| | Channel bandwidth [MHz] | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |

TABLE 39

| Frequency range designation | Corresponding frequency range |
|---|---|
| FR1 | 450 MHz-6000 MHz |
| FR2 | 24250 MHz-52600 MHz |

Table 40 is a table showing an example of the maximum transmission bandwidth configuration (NRB) for the channel bandwidth and SCS in FR 1 of the NR.

TABLE 40

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 41 is a table showing an example of the maximum transmission bandwidth configuration (NRB) for the channel bandwidth and SCS in FR 2 of the NR.

TABLE 41

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

The MTC narrowband (NB) will be described in more detail.

MTC follows a narrowband operation to transmit and receive physical channels and signals, and the maximum channel bandwidth is reduced to 1.08 MHz or 6 (LTE) RBs.

The narrowband may be used as a reference unit for resource allocation units of some channels of downlink and uplink, and the physical location of each narrowband in the frequency domain may be defined differently according to system bandwidth.

The bandwidth of 1.08 MHz defined in MTC is defined in order for the MTC terminal to follow the same cell search (cell search) and random access procedure as the legacy terminal.

MTC can be supported by cells with a much larger bandwidth (e.g., 10 MHz) than 1.08 MHz, but physical channels and signals transmitted/received by MTC are always limited to 1.08 MHz.

The system having a much larger bandwidth may be a legacy LTE, NR system, 5G system, and the like.

Narrowband is defined as 6 non-overlapping consecutive physical resource blocks in the frequency domain.

If $N_{ND}^{UL} \geq 4$, the wideband is defined as 4 non-overlapping narrowbands in the frequency domain. If $N_{NB}^{UL} < 4$, $N_{WB}^{UL}=1$ and a single wideband are composed of $N_{NB}^{UL}$ non-overlapping narrowband(s).

For example, in the case of a 10 MHz channel (50 RBs), 8 non-overlapping narrowbands are defined.

Figure 18:
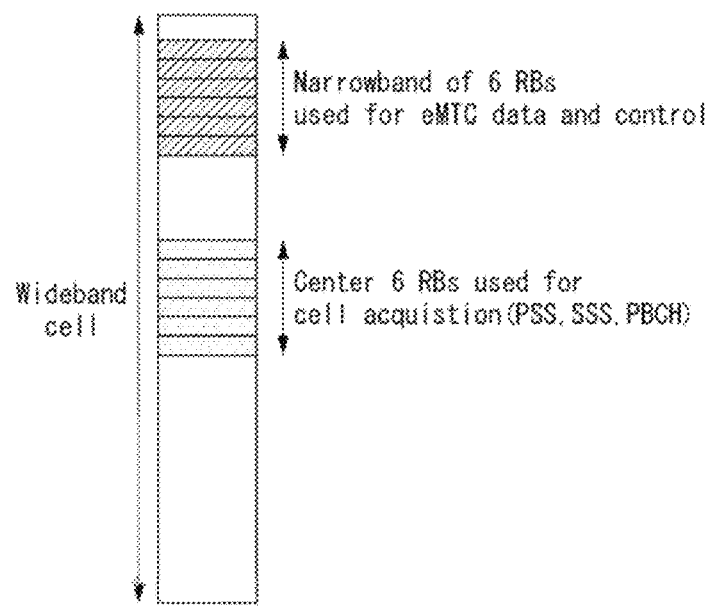
FIG. 18(a) is a diagram showing an example of a narrowband operation.
FIG. 18(b) is a diagram showing an example of repetition with RF retuning.
Figure 18:
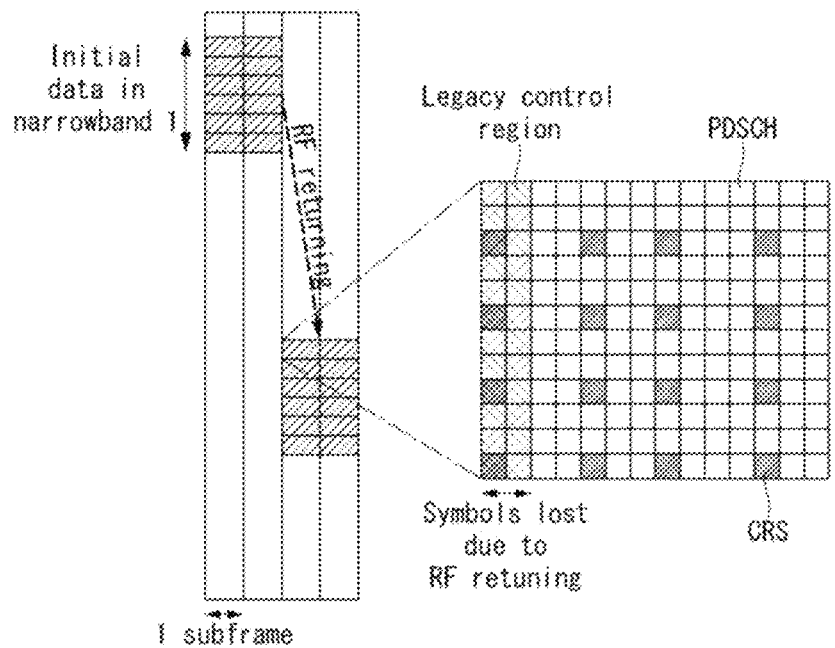

FIG. 18(a) is a diagram illustrating an example of a narrowband operation, and FIG. 18(b) is a diagram illustrating an example of repetition with RF retuning.

With reference to FIG. 18(b), frequency diversity by RF retuning will be described.

Due to the narrowband RF, single antenna and limited mobility, MTC supports limited frequency, spatial and temporal diversity. To reduce the effects of fading and outage, frequency hopping is supported between different narrowbands by RF retuning.

This frequency hopping is applied to different uplink and downlink physical channels when repetition is possible.

For example, when 32 subframes are used for PDSCH transmission, the first 16 subframes may be transmitted on the first narrowband. At this time, the RF front-end is retuned to another narrowband, and the remaining 16 subframes are transmitted on the second narrowband.

The narrowband of the MTC may be configured by system information or downlink control information (DCI).

(2) MTC operates in half duplex mode and uses a limited (or reduced) maximum transmit power.

(3) MTC does not use a channel (defined in legacy LTE or NR) that should be distributed over the entire system bandwidth of legacy LTE or NR.

For example, legacy LTE channels not used for MTC are PCFICH, PHICH, and PDCCH.

Accordingly, the MTC cannot monitor the above channels and thus defines a new control channel, MPDCCH (MTC PDCCH).

The MPDCCH spans up to 6RBs in the frequency domain and one subframe in the time domain.

MPDCCH is similar to EPDCCH, and additionally supports common search space for paging and random access.

The MPDCCH is similar to the concept of E-PDCCH used in legacy LTE.

(4) MTC uses a newly defined DCI format, and may be DCI formats 6-0A, 6-0B, 6-1A, 6-1B, 6-2, etc. as an example.

(5) MTC is a PBCH (physical broadcast channel), PRACH (physical random access channel), M-PDCCH (MTC physical downlink control channel), PDSCH (physical downlink shared channel), PUCCH (physical uplink control channel), PUSCH (physical uplink shared channel) can be repeatedly transmitted. Due to such MTC repetition transmission, even when the signal quality or power is very poor, such as in a poor environment such as a basement, the MTC channel can be decoded, resulting in an increase in cell radius and a signal penetration effect. The MTC may support only a limited number of transmission modes (TM) that can operate in a single layer (or single antenna), or can support a channel or a reference signal (RS) that can operate in a single layer. For example, the transmission mode in which the MTC can operate may be TM 1, 2, 6 or 9.

(6) HARQ retransmission of MTC is adaptive and asynchronous, and is based on a new scheduling assignment received on the MPDCCH.

(7) In MTC, PDSCH scheduling (DCI) and PDSCH transmission occur in different subframes (cross subframe scheduling).

(8) All resource allocation information (subframe, transport block size (TBS), subband index) for SIB1 decoding is determined by parameters of MIB, and no control channel is used for SIB1 decoding of MTC.

(9) All resource allocation information (subframe, TBS, subband index) for SIB2 decoding is determined by several SIB1 parameters, and no control channel for SIB2 decoding of MTC is used.

(10) MTC supports extended paging (DRX) cycle.

(11) The MTC can use the same primary synchronization signal (PSS)/secondary synchronization signal (SSS)/common reference signal (CRS) used in legacy LTE or NR. In the case of NR, PSS/SSS is transmitted in units of SS blocks (or SS/PBCH blocks or SSBs), and TRS (tracking RS) can be used for the same purpose as CRS. That is, the TRS is a cell-specific RS and may be used for frequency/time tracking.

MTC Operating Mode and Level

Next, the MTC operation mode and level will be described. MTC is classified into two operation modes (first mode and second mode) and four different levels for coverage enhancement, and may be as shown in Table 42 below.

The MTC operation mode is referred to as CE Mode. In this case, the first mode may be referred to as CE Mode A and the second mode may be referred to as CE Mode B.

TABLE 42

| Mode | Level | Description |
| --- | --- | --- |
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition for PRACH |

The first mode is defined to improve small coverage in which complete mobility and channel state information (CSI) feedback are supported, and thus, there is no repetition or the number of repetitions is small. The operation of the first mode may be the same as the operation range of UE category 1. The second mode is defined for UEs with extremely poor coverage conditions supporting CSI feedback and limited mobility, and a large number of repetitive transmissions are defined. The second mode provides up to 15 dB of coverage enhancement based on the range of UE category 1. Each level of MTC is defined differently in RACH and paging procedure.

It looks at the MTC operation mode and how each level is determined.

The MTC operation mode is determined by the base station, and each level is determined by the MTC terminal. Specifically, the base station transmits RRC signaling including information on the MTC operation mode to the terminal. Here, RRC signaling may be an RRC connection setup message, an RRC connection reconfiguration message, or an RRC connection reestablishment message. Here, the term of the message may be expressed as an information element (IE).

Thereafter, the MTC terminal determines a level within each operation mode and transmits the determined level to the base station. Specifically, the MTC terminal determines the level in the operation mode based on the measured channel quality (e.g., RSRP, RSRQ, or SINR), and informs the determined level to the base station using PRACH resources (frequency, time, preamble) corresponding to the determined level.

MTC Guard Period

As described above, MTC operates in the narrowband. The position of the narrowband may be different for each specific time unit (e.g., subframe or slot). The MTC terminal tunes to a different frequency in all time units. Therefore, a certain time is required for all frequency retuning, and this certain time is defined as the guard period of the MTC. That is, the guard period is required when transitioning from one time unit to the next time unit, and transmission and reception do not occur during the period.

The guard period is defined differently depending on whether it is a downlink or an uplink, and is defined differently according to a downlink or uplink situation. First, the guard period defined in the uplink is defined differently according to the characteristics of data carried by the first time unit (time unit N) and the second time unit (time unit N+1). Next, the guard period of the downlink requires a condition that (1) the first downlink narrowband center frequency and the second narrowband center frequency are different, and (2) in TDD, the first uplink narrowband center frequency and the second downlink center frequency are different.

The MTC guard period defined in Legacy LTE is described, and guard periods of $N_{symb}^{retune}$ SC-FDMA symbols are generated at most for Tx-Tx frequency retuning between two consecutive subframes. If the upper layer parameter ce-RetuningSymbols is configured, $N_{symb}^{retune}$ is equal to ce-RetuningSymbols, otherwise $N_{symb}^{retune}=2$. In addition, for the MTC terminal configured with the upper layer parameter srs-UpPtsAdd, a guard period of the maximum SC-FDMA symbol is generated for Tx-Tx frequency retuning between the first special subframe for frame structure type 2 and the second uplink subframe.

Figure 19:
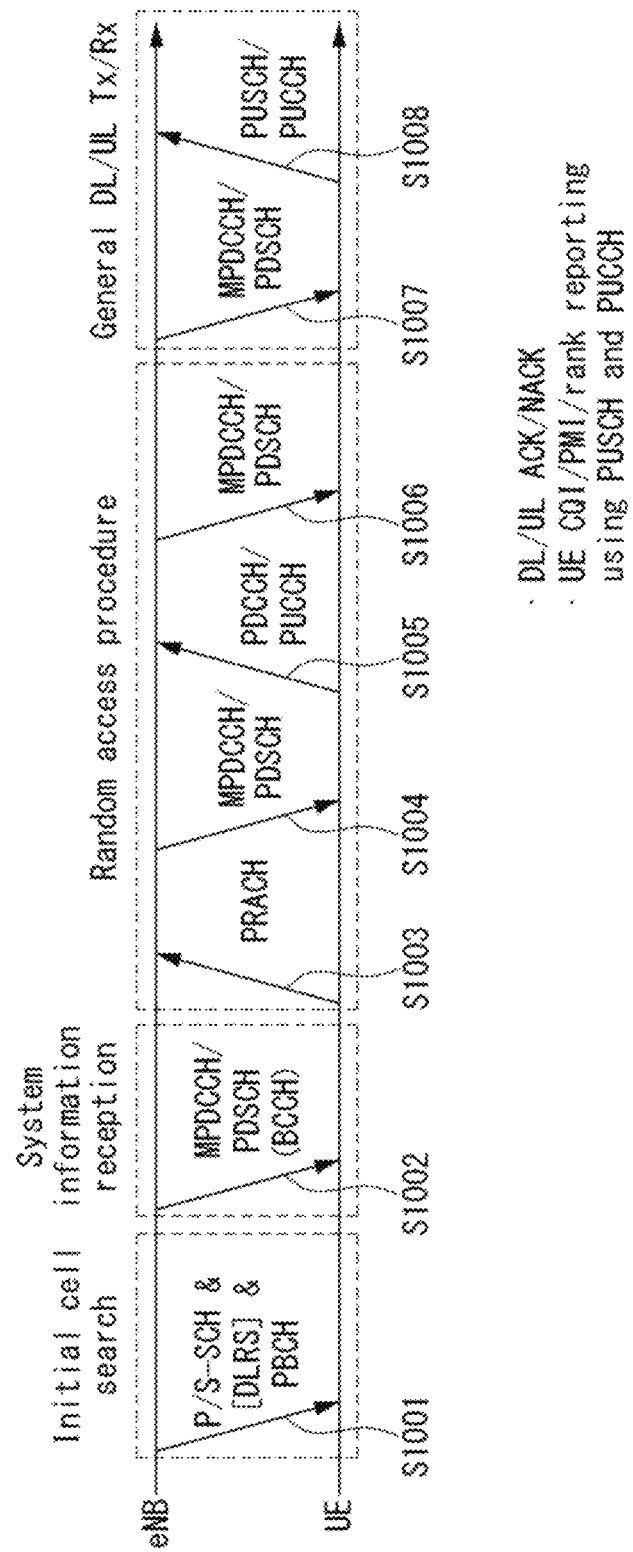
FIG. 19 is a diagram showing physical channels that can be used for MTC and a general signal transmission method using them.

FIG. 19 is a diagram illustrating physical channels that can be used for MTC and a general signal transmission method using them.

The MTC terminal, which is powered on again while the power is turned off, or that newly enters the cell, performs an initial cell search operation such as synchronizing with the base station in step S1101. To this end, the MTC terminal receives a Primary Synchronization Signal (PSS) and a Secondary Synchronization Signal (SSS) from the base station, synchronizes with the base station, and acquires information such as a cell identifier (ID). The PSS/SSS used for the initial cell search operation of the MTC may be a legacy LTE PSS/SSS, a Resynchronization signal (RSS), or the like.

Thereafter, the MTC terminal may receive a physical broadcast channel (PBCH) signal from the base station to obtain intra-cell broadcast information.

Meanwhile, the MTC terminal may check a downlink channel state by receiving a downlink reference signal (DL RS) in the initial cell search step. Broadcast information transmitted through PBCH is MIB (Master Information Block), and in MTC, the MIB is repeated in a subframe different from the first slot of subframe #0 of the radio frame (subframe #9 for FDD and subframe #5 for TDD).

PBCH repetition is performed by repeating exactly the same constellation point in different OFDM symbols so that it can be used for initial frequency error estimation even before attempting PBCH decoding.

Figure 20:
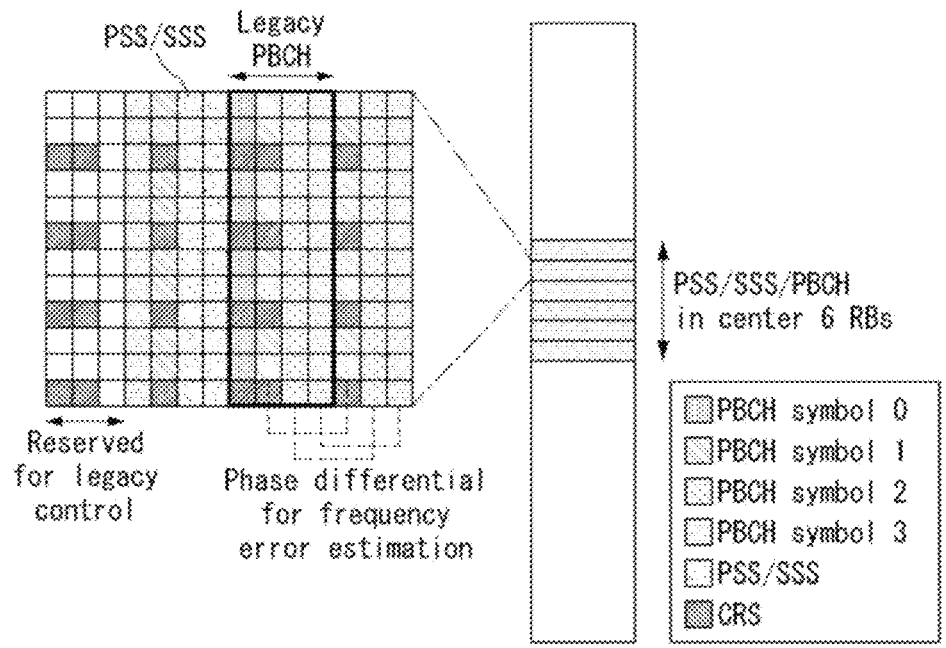
FIG. 20(a) is a diagram showing an example of a frequency error estimation method for a repetition pattern for subframe #0, a normal CP, and repeated symbols in FDD.
FIG. 20(b) shows an example of transmission of SIB-BR in wideband LTE channel.
Figure 20:
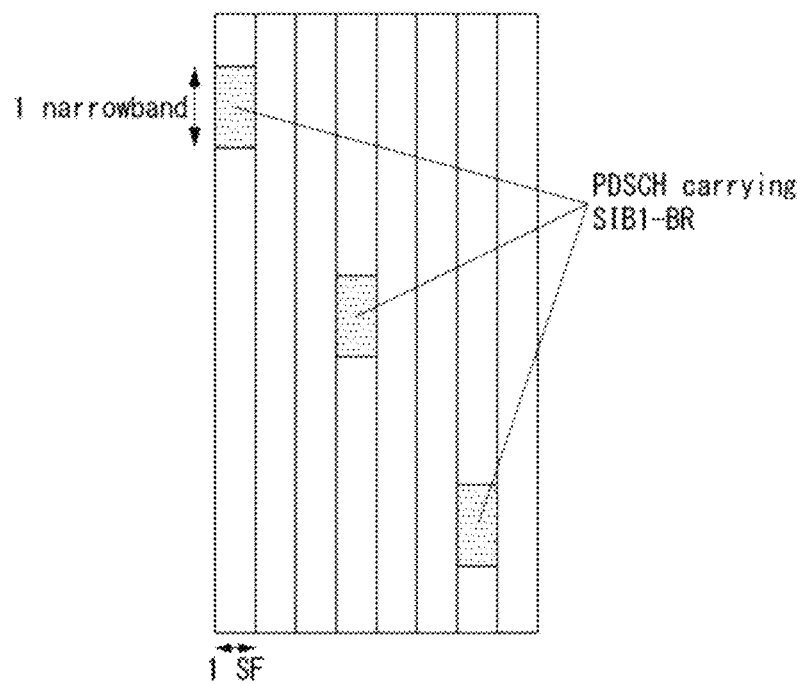

FIG. 20(a) illustrates an example of a frequency error estimation method for a repetition pattern for subframe #0, a general CP, and repeated symbols in FDD, and FIG. 20(b) illustrates an example of transmission of SIB-BR over a broadband LTE channel.

In MIB, five reserved bits are used in MTC to transmit scheduling information for a new system information block for bandwidth reduced device (SIB1-BR) including a time/frequency location and a transport block size.

SIB-BR is transmitted directly on the PDSCH without any control channel associated with it.

The SIB-BR remains unchanged in 512 radio frames (5120 ms) to allow multiple subframes to be combined.

Table 43 is a table showing an example of the MIB.

TABLE 43

```
-- ASN1START
MasterInformationBlock ::=      SEQUENCE {
    dl-Bandwidth                    ENUMERATED {
                                        n6, n15, n25, n50, n75, n100},
    phich-Config                    PHICH-Config,
    systemFrameNumber               BIT STRING (SIZE (8)),
    schedulingInfoSIB1-BR-r13       INTEGER (0..31),
    systemInfoUnchanged-BR-r15      BOOLEAN,
    spare                           BIT STRING (SIZE (4))
}
-- ASN1STOP
```

In Table 43, the schedulingInfoSIB1-BR field represents an index for a table defining SystemInformationBlockType1-BR scheduling information, and a value of 0 means that SystemInformationBlockType1-BR is not scheduled. The overall function and information carried by SystemInformationBlockType1-BR (or SIB1-BR) is similar to that of legacy LTE SIB1. The contents of SIB1-BR can be classified into (1) PLMN, (2) cell selection criteria, and (3) scheduling information for SIB2 and other SIBs.

After completing the initial cell search, the MTC terminal may receive the MPDCCH and the PDSCH according to the MPDCCH information in step S1102 to obtain more detailed system information. For MPDCCH, (1) it is very similar to EPDCCH, carries common and UE specific signaling, (2) it can be transmitted only once or can be transmitted repeatedly (the number of repetitions is configured by higher layer signaling), (3) A number of MPDCCHs are supported, and the UE monitors the set of MPDCCHs, (4) it is formed by an aggregation of an enhanced control channel element (eCCE), each eCCE includes a set of resource elements, (5) RA-RNTI (Radio Network Temporary Identifier), SI-RNTI, P-RNTI, C-RNTI, temporary C-RNTI, and semi-persistent scheduling (SPS) C-RNTI are supported.

Thereafter, the MTC terminal may perform a random access procedure such as steps S1103 to S1106 in order to complete access to the base station. The basic configuration related to the RACH procedure is transmitted by SIB2. In addition, SIB2 includes parameters related to paging. Paging Occasion (PO) is a subframe in which P-RNTI can be transmitted on the MPCCH. When the P-RNTI PDCCH is repeatedly transmitted, PO refers to the start subframe of the MPDCCH repetition. The paging frame (PF) is one radio frame and may include one or a plurality of POs. When DRX is used, the MTC terminal monitors only one PO per DRX cycle. Paging NarrowBand (PNB) is one narrowband, and the MTC terminal performs paging message reception.

To this end, the MTC terminal may transmit a preamble through a physical random access channel (PRACH) (S1103) and receive a response message (RAR) to the preamble through the MPDCCH and a corresponding PDSCH (S1104). In the case of contention-based random access, the MTC terminal may perform a contention resolution procedure such as transmission of an additional PRACH signal (S1105) and reception of an MPDCCH signal and a PDSCH signal corresponding thereto (S1106). Signals and/or messages (Msg 1, Msg 2, Msg 3, Msg 4) transmitted in the RACH procedure in MTC may be repeatedly transmitted, and this repetition pattern is configured differently according to the CE level. Msg 1 may mean PRACH preamble, Msg 2 may mean RAR (random access response), Msg 3 may mean UL transmission of the MTC terminal for RAR, and Msg 4 may mean DL transmission of the base station for Msg 3.

For random access, signaling for different PRACH resources and different CE levels is supported. This provides the same control of the near-far effect for the PRACH by grouping together UEs experiencing similar path loss. Up to four different PRACH resources may be signaled to the MTC terminal.

The MTC terminal estimates the RSRP using a downlink RS (e.g., CRS, CSI-RS, TRS, etc.), and selects one of the resources for random access based on the measurement result. Each of the four resources for random access has a relationship with the number of repetitions for the PRACH and the number of repetitions for the random access response (RAR).

Therefore, the MTC terminal with bad coverage needs a large number of repetitions to be successfully detected by the base station, and needs to receive an RAR having a corresponding repetition number to satisfy their coverage level.

Search spaces for RAR and contention resolution messages are also defined in the system information and are independent for each coverage level.

And, the PRACH waveform used in MTC is the same as the PRACH waveform used in legacy LTE (e.g., OFDM and Zadof-Chu sequence).

After performing the above-described procedure, the MTC terminal receives MPDCCH signal and/or PDSCH signal (S1107) and transmits physical uplink shared channel (PUSCH) signal and/or physical uplink control channel (PUCCH) (S1108) as a general uplink/downlink signal transmission procedure. Control information transmitted from the MTC terminal to the base station is collectively referred to as uplink control information (UCI). UCI may include HARQ-ACK/NACK, scheduling request (SR), channel quality indicator (CQI), precoding matrix indicator (PMI), rank indication (RI) information, etc.

When the RRC connection to the MTC terminal is established, the MTC terminal blind-decodes the MPDCCH in a search space configured to obtain uplink and downlink data allocation.

MTC uses all OFDM symbols available in a subframe to transmit DCI. Therefore, time domain multiplexing between the control channel and the data channel in the same subframe is impossible. That is, as discussed above, cross-subframe scheduling between the control channel and the data channel is possible.

The MPDCCH having the last repetition in subframe #N schedules PDSCH allocation in subframe #N+2.

The DCI transmitted by the MPDCCH provides information on how many times the MPDCCH is repeated so that the MTC terminal knows when PDSCH transmission starts.

PDSCH allocation can be performed in different narrowbands. Therefore, the MTC terminal needs to retune before decoding the PDSCH allocation.

For uplink data transmission, scheduling follows the same timing as legacy LTE. Here, the last MPDCCH in subframe #N schedules PUSCH transmission starting in subframe #N+4.

Figure 21:
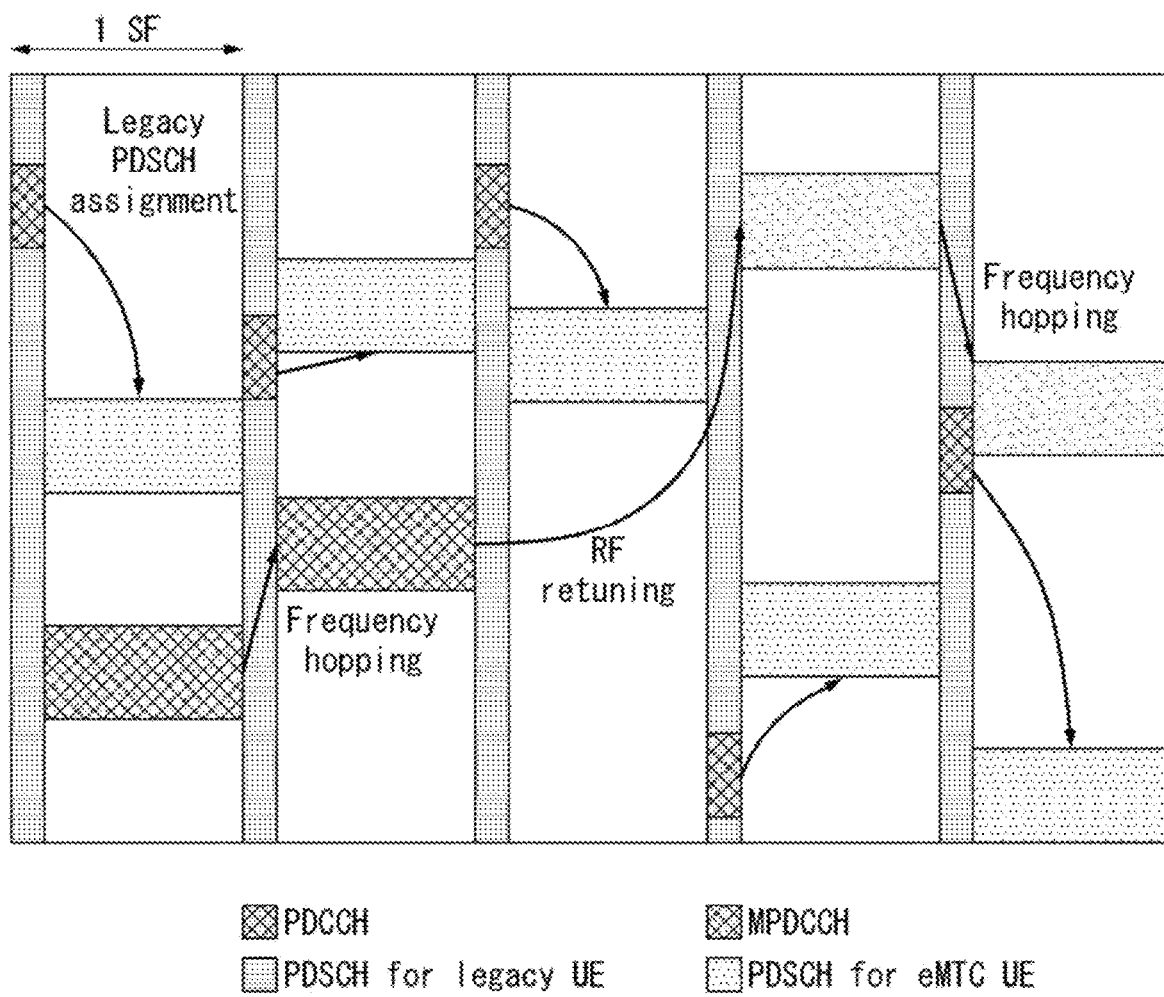
FIG. 21 is a diagram showing an example of scheduling for each of the MTC and legacy LTE.

FIG. 21 is a diagram illustrating an example of scheduling for each of the MTC and legacy LTE.

Legacy LTE allocation is scheduled using the PDCCH, which uses the first OFDM symbols in each subframe, and the PDSCH is scheduled in the same subframe as the subframe in which the PDCCH is received.

In contrast, the MTC PDSCH is scheduled for cross-subframe, and one subframe is defined between the MPDCCH and the PDSCH to allow MPDCCH decoding and RF retuning.

The MTC control channel and data channels may be repeated through a large number of subframes having a maximum of 256 subframes for the MPDCCH and a maximum of 2048 subframes for the PDSCH so as to be decoded under extreme coverage conditions.

Cell Search of MTC

Hereinafter, the (initial) cell search (cell search) procedure of MTC in step S1001 of FIG. 19 will be described in more detail.

Cell search is the procedure by which a UE acquires time and frequency synchronization with a cell and detects the cell ID of that cell. E-UTRA cell search supports a scalable overall transmission bandwidth corresponding to 6 RBs and upwards. PSS and SSS are transmitted in the downlink to facilitate cell search. If a resynchronization signal is transmitted in the downlink, it can be used to re-acquire time and frequency synchronization with the cell. Physical layer provides 504 unique cell identities using synchronization signals.

The UE searches for the PSS/SSS in the center 6 PRBs to obtain the cell ID, subframe timing information, duplexing mode (time division duplex (TDD), or frequency division duplex (FDD)), and cyclic prefix (CP) length. The PSS uses Zadoff-Chu (ZC) sequence. For frame structure type 1 (i.e. FDD), the PSS shall be mapped to the last orthogonal frequency division multiplexing (OFDM) symbol in slots 0 and 10. For frame structure type 2 (i.e. TDD), the PSS shall be mapped to the third OFDM symbol in subframes 1 and 6. The SSS uses an interleaved concatenation of two length-31 binary sequences. The concatenated sequence is scrambled with a scrambling sequence given by the PSS. For FDD, the SSS shall be mapped OFDM symbol number NsymbDL−2 in slots 0 and 10, where NsymbDL is the number of OFDM symbols in a downlink slot. For TDD, the SSS shall be mapped OFDM symbol number NsymbDL−1 in slots 1 and 11, where NsymbDL is the number of OFDM symbols in a downlink slot.

System Information Acquisition of MTC

Hereinafter, a procedure for obtaining system information of the MTC in step S1002 of FIG. 19 will be described in more detail.

Figure 22:
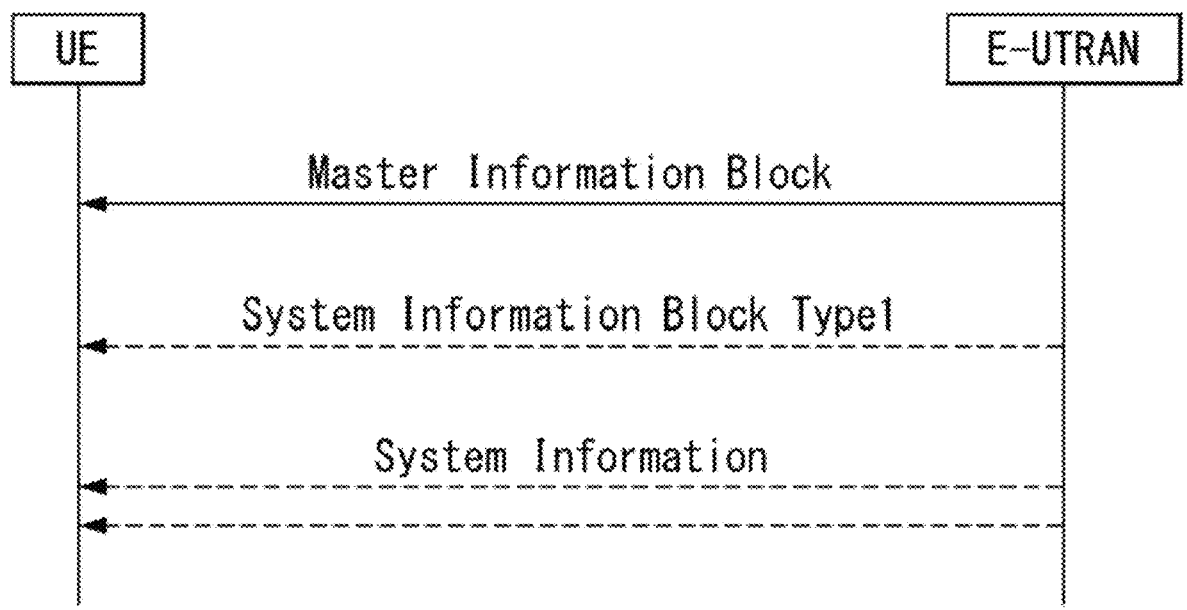
FIG. 22 shows a normal system information acquisition procedure.

FIG. 22 illustrates a normal system information acquisition procedure.

Upon searching the cell by using the PSS/SSS, the UE acquires system information (SI).

The UE applies the system information acquisition procedure to acquire the access stratum (AS)- and non-access stratum (NAS)-system information that is broadcasted by the E-UTRAN. The procedure applies to UEs in RRC_IDLE and UEs in RRC_CONNECTED.

System information is divided into master information block (MIB; MasterInformationBlock) and a number of system information blocks (SIBs). The MIB defines the most essential physical layer information of the cell required to receive further system information. The MIB is transmitted on PBCH. SIBs other than system information block type-1 (SIB1; SystemInformationBlockType1) are carried in SI messages and mapping of SIBs to SI messages is flexibly configurable by schedulingInfoList included in SystemInformationBlockType1, with restrictions that: each SIB is contained only in a single SI message, and at most once in that message; only SIBs having the same scheduling requirement (periodicity) can be mapped to the same SI message; system information block type-1 (SIB2; SystemInformationBlockType2) is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH. The BL UEs and UEs in CE apply BR version of the SIB or SI messages, e.g. SystemInformationBlockType1-BR.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For TDD/FDD system with a bandwidth larger than 1.4 MHz that supports BL UEs or UEs in CE, MIB transmission may additionally be repeated in subframe#0 of the same radio frame, and subframe #5 of the same radio frame for FDD and TDD.

The SystemInformationBlockType1 contain information relevant when evaluating if a UE is allowed to access a cell and defines the scheduling of other system information blocks. The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR include information such as valid downlink and uplink subframes, maximum support of coverage enhancement, and scheduling information for other SIBs. The SystemInformationBlockType1-BR is transmitted over PDSCH directly, without any control channel associated with it. The SystemInformationBlockType1-BR uses a schedule with a periodicity of 80 ms. Transport block size (TBS) for SystemInformationBlockType1-BR and the repetitions made within 80 ms are indicated via schedulingInfoSIB1-BR in MIB or optionally in the RRCConnectionReconfiguration message including the MobilityControlInfo. Specifically, five reserved bits in the MIB are used in eMTC to convey scheduling information about SystemInformationBlockType1-BR, including time and frequency location, and transport block size. SIB-BR remains unchanged for 512 radio frames (5120 ms) to allow a large number of subframes to be combined.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than multimedia broadcast multicast service single frequency network (MBSFN) subframes, uplink subframes in TDD, and subframe #5 of radio frames for which SFN mode. The UE acquires the detailed time-domain scheduling (and other information, e.g. frequency-domain scheduling, used transport format) from decoding system information radio network temporary identity (SI-RNTI) on PDCCH. For a BL UE or a UE in CE, the detailed time/frequency domain scheduling information for the SI messages is provided in SystemInformationBlockType1-BR.

The SystemInformationBlockType2 contains common and shared channel information.

Random Access Procedure of MTC

Hereinafter, a random access procedure of MTC in steps S1003 to S1006 of FIG. 19 will be described in more detail.

The random access procedure is performed for the following events:

Initial access from RRC_IDLE;
RRC Connection Re-establishment procedure;
Handover;
DL data arrival during RRC_CONNECTED requiring random access procedure;
UL data arrival during RRC_CONNECTED requiring random access procedure;
For positioning purpose during RRC_CONNECTED requiring random access procedure.

Figure 23:
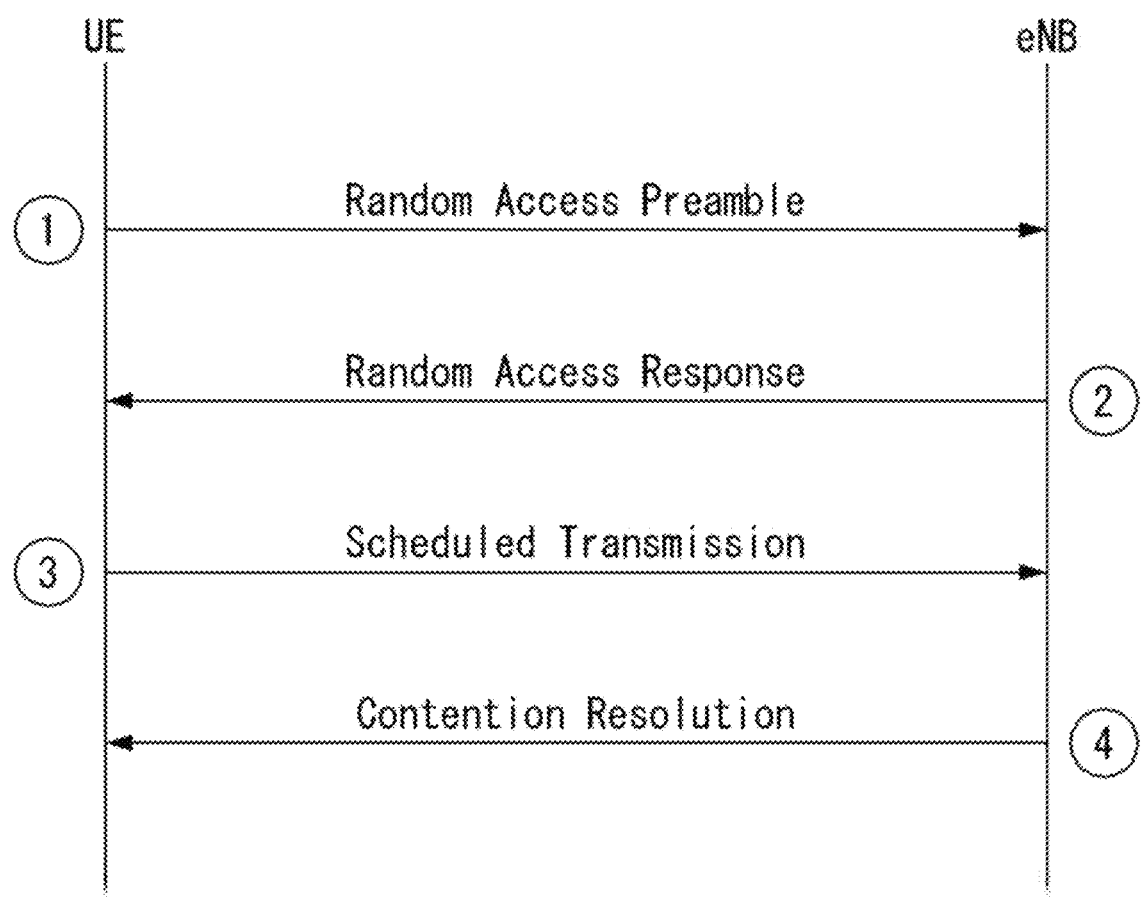
FIG. 23 shows a contention-based random access procedure.

FIG. 23 illustrates a contention-based random access procedure.

A random access preamble (may be referred to as "Msg1") is transmitted over PRACH. A UE randomly selects one random access preamble from a set of random access preambles indicated by system information or a handover command, selects a PRACH resource able to transmit the random access preamble, and transmits the same.

The physical layer random access preamble consists of a cyclic prefix of length TCP and a sequence part of length TSEQ. The parameter values are listed in Table 44 below and depend on the frame structure and the random access configuration. Higher layers control the preamble format.

TABLE 44

| Preamble format | $T_{CP}$ | $T_{SEQ}$ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

Abbreviation

Before describing the method proposed in the present disclosure, abbreviations and definitions of terms to be described later are summarized.

MIB-NB: masterinformationblock-narrowband
SIB1-NB: systeminformationblock1-narrowband
CRS: cell specific reference signal or common reference signal
ARFCN: absolute radio-frequency channel number
PRB: physical resource block
PRG: precoding resource block group
PCI: physical cell identifier
N/A: non-applicable
EARFCN: E-UTRA absolute radio frequency channel number
RRM: radio resource management
RSRP: reference signal received power
RSRQ: reference signal received quality
TBS: transport block size
TDD/FDD: time division duplex/frequency division duplex Definition NB-IoT: NB-IoT allows access to network services through E-UTRA with a channel bandwidth limited to 200 kHz.
NB-IoT in-band operation: NB-IoT operates in-band when using resource block(s) in a normal E-UTRA carrier.
NB-IoT guard band operation: NB-IoT operates as a guard band when using resource block(s) not used in the guard band of the E-UTRA carrier.
NB-IoT standalone operation: NB-IoT operates standalone when using its own spectrum. For example, the spectrum currently used by the GERAN system on behalf of one or more GSM carriers and the spectrum that is scattered for potential IoT deployments.
Anchor carrier: In NB-IoT, the carrier assumes that NPSS/NSSS/NPBCH/SIB-NB for FDD or NPSS/NSSS/NPBCH for TDD is transmitted.
Non-anchor carrier: In NB-IoT, a carrier that does not assume that NPSS/NSSS/NPBCH/SIB-NB for FDD or NPSS/NSSS/NPBCH for TDD is transmitted.
Channel raster: The smallest unit in which the terminal reads resources. In the case of the LTE system, the channel raster (channel raster) has a value of 100 kHz.

In addition, '/' described in the present disclosure can be interpreted as 'and/or', and 'A and/or B' may be interpreted as having the same meaning as 'including at least one of A or (and/or) B'.

EXAMPLES OF THE PRESENT DISCLOSURE

Hereinafter, in the present disclosure, a method for improving transmission/reception performance of an MPDCCH (MTC physical downlink control channel) will be described.

MPDCCH (MTC Physical Downlink Control Channel: MPDCCH) is an MTC downlink (DL) control channel based on EPDCCH. Accordingly, like the EPDCCH, a channel is estimated based on a demodulation reference signal (DMRS), and MPDCCH demodulation is performed using the estimated channel.

The LTE-MTC terminal may perform time/frequency interpolation in the same way as the LTE terminal in order to improve the performance of channel estimation, and there may be cases where time/frequency interpolation is impossible in terms of a channel estimation performance due to the signal characteristics of a reference signal for MPDCCH demodulation as follows.

MPDCCH characteristics influencing MPDCCH Channel Estimation

The DMRS of MPDCCH is transmitted only in a Physical Resource Block (PRB) used for transmission of MPDCCH.

MPDCCH formats are supported that support various Enhanced Control Channel Element (ECCE) aggregation levels.

MPDCCH format supported by LTE-MTC occupies 1/2/4 PRB

Four ECCEs may exist in one PRB. Therefore, when performing localized transmission of the MPDCCH format of aggregation level (AL) ≤4, the corresponding MPDCCH is transmitted in one PRB, and the DMRS for the MPDCCH is transmitted only in the corresponding PRB. That is, in a PRB other than the corresponding PRB, transmission of the DMRS for the terminal is not performed.

Multiplexing of MPDCCH and PDSCH between the same or different terminals in the same subframe (MPDCCH subframe) is supported.

The UE performs blind decoding (BD) for various supported MPDCCH formats.

Due to the signal characteristics of the MPDCCH as above, PRB bundling is not supported within an MPDCCH subframe. PRB bundling refers to a method of enabling frequency interpolation between PRBs when the UE estimates a channel by applying the same precoding between different PRBs. Here, a group of PRBs to which the same precoding is applied is referred to as a precoding RB group (PRG).

Hereinafter, the present disclosure describes a method for improving the reception performance of the MPDCCH and improving the LTE-MTC performance in order to solve the problem of lowering the channel estimation performance due to impossibility of time/frequency interpolation only with the DMRS of the MPDCCH and the conventional method.

Figure 24:
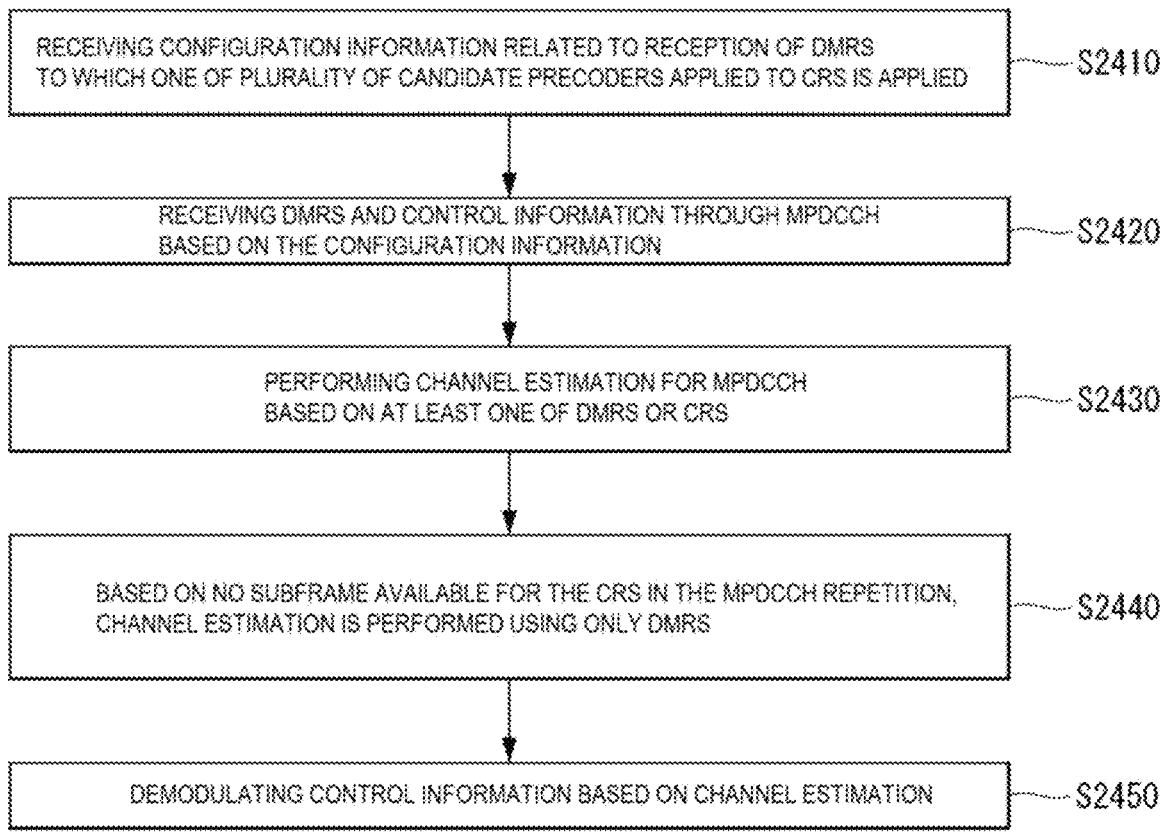
FIG. 24 is a flowchart illustrating a method of receiving an MPDCCH by a terminal (UE) according to an embodiment of the present invention.

FIG. 24 is a flowchart illustrating a method of receiving an MPDCCH by a terminal (UE) according to an example of the present disclosure.

The terminal of FIG. 24 may be the first device 1310 described with reference to FIG. 6, and the base station may be the second device 1320 described with reference to FIG. 6.

As shown in FIG. 24, the terminal may receive, from the base station, configuration information related to a reception of a demodulation reference signal (DMRS) to which one of a plurality of candidate precoders applied to a cell specific reference signal (CRS).

Subsequently, the terminal may receive, from the base station, the DMRS and control information through the MPDCCH based on the configuration information (S2420).

Subsequently, the terminal may perform channel estimation for the MPDCCH based on at least one of the DMRS or CRS (S2430).

Then, when there is a subframe that is not available for the CRS in the MPDCCH repetition, the channel estimation may be performed using only the DMRS (S2440).

Subsequently, the terminal may demodulate the control information based on the channel estimation (S2450).

Figure 25:
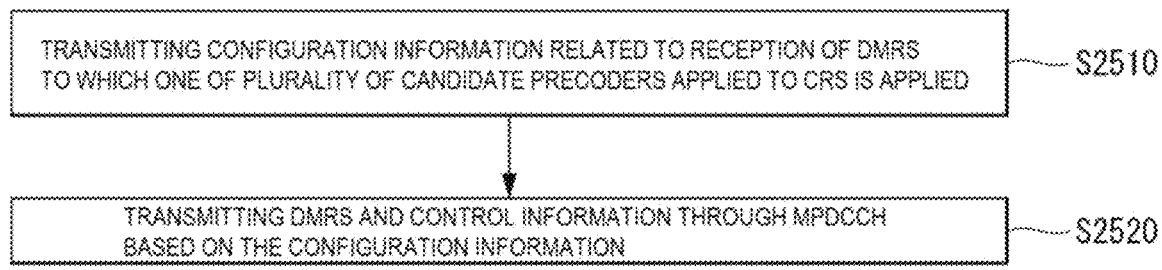
FIG. 25 is a flowchart illustrating a method for a base station to transmit an MPDCCH to a terminal.

FIG. 25 is a flowchart illustrating a method for a base station to transmit an MPDCCH to a terminal.

As shown in FIG. 25, first, the base station may transmit configuration information related to reception of a demodulation reference signal (DMRS) to which one of a plurality of candidate precoders applied to a cell specific reference signal (CRS) is applied (S2510).

Subsequently, the base station may transmit the DMRS and control information through the MPDCCH based on the configuration information (S2520).

The MPDCCH transmission/reception procedure between the base station and the terminal will be described in detail below by defining the first to fourth examples.

1. Example 1: Method of Supporting Time Interpolation

In Example 1, a cell-specific reference signal (CRS) of LTE may be used to improve channel estimation through applying time interpolation method.

CRS is a cell-specific reference signal and is transmitted in all subframes, and corresponds to a kind of always on RS. Therefore, unlike the MPDCCH DMRS that is transmitted only in a transmission subframe and/or RB of the MPDCCH, when it is required by the terminal, the channel estimation operation may always be performed using the CRS.

For example, before the subframe in which the MPDCCH is transmitted, the UE performs channel estimation using the CRS, and interference reduction may be allowed through time interpolation with the result of channel estimation of the subframe in which the MPDCCH is transmitted.

However, since the CRS is a non-precoded RS to which precoding is not applied, and the MPDCCH DMRS is a precoded RS to which precoding is applied, it is difficult to simply apply time interpolation.

(1) Example 1-1: Estimating the Channel Using Only CRS

In the Example 1-1, a terminal may estimate channel using only CRS. That is, CRS may be transmitted in almost all subframes in which the MPDCCH is transmitted. Therefore, using only the CRS, time interpolation by the terminal may be allowed.

Exceptionally, it may be configured for the terminal that that CRS is also transmitted in the MBSFN region (remaining regions excluding the LTE unicast control region in the MBSFN subframe) within the MBSFN subframe for LTE-MTC.

(2) Example 1-2: Estimating a Channel Using Both CRS and MPDCCH DMRS)

In Example 1-2, the terminal may estimate the channel using both of the CRS and the MPDCCH DMRS. As described above, it may not be allowed to improve channel estimation performance by applying time interpolation using the non-precoded CRS and the precoded DMRS as they are, so in order to solve this problem, the following methods may be used.

1) Receiving MPDCCH DMRS in a Non-Precoded Manner

For example, a terminal may receive MPDCCH in a non-precoded manner. In this case, both of DMRS and CRS may be non-precoded. Accordingly, the noise may be reduced by time interpolation and averaging the channel estimation result estimated using the DMRS and the channel estimation result estimated using the CRS by the terminal.

2) Receiving by Applying to CRS the Same Precoding as MPDCCH DMRS

For another example, a terminal may receive CRS by applying the same precoding as MPDCCH DMRS to CRS. This method allows allocated the same effective channel to CRS and DMRS, by applying the same precoding to the CRS and the MPDCCH DMRS. Here, the effective channel is $Hv^H$, where H is a channel matrix, v is a precoding matrix, and superscript $^H$ is a Hermitian operator. Accordingly, noise reduction may be allowed using time interpolation and averaging between channel estimation using CRS and DMRS.

Since the CRS in LTE is non-precoded, to minimize impact on legacy LTE terminals or the like which perform channel estimation or measurement using a narrowband (NB) region, configuration or indication may be further required to exclude the corresponding region from channel estimation or measurement.

For example, when precoded CRS is used to improve the performance of the MPDCCH, the base station may designate a subframe or slot in which the precoded CRS is applied as an invalid subframe or slot, and the base station may indicate to the terminal that the legacy eMTC terminal or legacy LTE terminal may not use the CRS in an area designated as an invalid subframe or slot for channel estimation or measurement.

Information on such an invalid subframe or slot may be in the form of a bitmap in units of subframes or slots for a specific period (e.g., 10 ms). In addition, the information may be configured as cell-specific or UE-specific by a higher layer and transmitted, or be indicated dynamically through DCI.

3) Method of Applying Fixed Precoding to MPDCCH DMRS and Transmitting the Same

The base station may apply a fixed precoding that the UE may recognize to the MPDCCH DMRS, the UE may perform channel estimation using fixed precoding information.

When the RS passes through the channel and the RS signal received by the terminal is y, it may be defined as $y=Hv^H x$. Here, H is a channel matrix, x is an MPDCCH DMRS, and v is a precoding matrix (known to UE), and superscript $^H$ is Hermitian operator. For example, the terminal may obtain H using information of a fixed precoding matrix (known to UE) through $(Hv^H)v=H$.

The terminal may increase the accuracy of channel estimation by time interpolating or averaging the channel matrix information through the MPDCCH DMRS and the H information through the CRS.

4) Method by a Base Station of Indicating to a Terminal After Applying Codebook-Based Precoding to DMRS The existing MPDCCH DMRS is a non-codebook based or terminal-transparent precoding scheme, and in this case, the terminal has no way to separate the channel matrix H from a effective channel ($Hv^H$: where H is a channel matrix, v is a precoding matrix, and superscript $^H$ is a Hermitian operator).

Therefore, it is not possible to interpolation and averaging with H estimated through the CRS. To solve this problem, precoding based on the codebook may be applied to the MPDCCH DMRS, and applied codebook information (e.g., in the form of codebook index, etc.) may be signaled to the terminal.

To this end, the following operations may be performed according to the number of CRS ports.

When the number of antenna ports through which CRS is transmitted is 1, the base station may transmit the MPDCCH DMRS through the same port (e.g., port 0) as the CRS (e.g., port 0).

When the number of CRS ports is 2, the base station may define a layer 1 codebook (PMI set) for 2 ports for precoding MPDCCH DMRS. For example, a codebook for two antenna ports may be a codebook defined for spatial multiplexing using two ports of CRS in LTE. The base station may select the precoding defined in the codebook and apply, and the corresponding information (e.g., codebook index) may be indicated to the terminal.

When the number of CRS ports is 4, the base station may define a layer 1 codebook (PMI set) for 4 ports for MPDCCH DMRS precoding. For example, the codebook for 4 antenna ports may be a codebook defined for spatial multiplexing using 4 ports of CRS in LTE, or a codebook for 4 antenna ports defined for PMI feedback using CSI-RS. The base station may select the precoding defined in the codebook and apply, and the corresponding information (e.g., a codebook index, etc.) may be indicated to the terminal.

The above mentioned codebook for MPDCCH DMRS precoding may be configured as a set or a subset to be orthogonal to each DMRS port. For example, the base station may configure and use a set or subset of DMRS ports to have an orthogonal relationship for each DMRS port based on a codebook defined for spatial multiplexing using LTE CRS or PMI feedback using CSI-RS.

For example, when power allocation or power boosting is applied to the fixed precoding method or the precoding based on the codebook method, the corresponding power information or allocation information related to power boosting may be additionally defined and transmitted to the terminal by the base station. The power allocation information, for example, may include power allocation ratio information between DMRS and CRS.

In the above applying of power allocation or boosting, when the MPDCCH DMRS precoding determination method based on the CSI report from the UE is applied, the base station may apply power allocation or power boosting to improve the efficiency of downlink transmission in terms of the system, or increase or decrease the power for the each terminal or all terminals to secure an SNR that a specific terminal may receive.

For such power allocation or boosting, MCS (Modulation Coding Scheme) information of the CSI report may be referred. In addition, the DMRS power information may be transmitted for each port by the base station, when the precoding method applied to the MPDCCH is distributing different powers for each port after precoding is applied, that is, when the output power is different for each port. The power information of the DMRS may be information such as a DMRS-to-CRS power ratio for each port.

Alternatively, in the case where the base station transmits MPDCCH to different LTE MTC terminals for each layer through downlink MU-MIMO in LTE MTC, the MPDCCH DMRS power may be reduced depending on the number of terminals of simultaneous transmission using the same time frequency resource through downlink MU-MIMO. For example, when transmitting to two terminals each in a single layer, the MPDCCH DMRS power transmitted to each terminal is reduced by 3 dB, and in the case of four terminals, reduced by 6 dB.

Here, when the LTE MTC terminal uses only non-codebook based DMRS, there is no problem in receiving the PDSCH or MPDCCH, but the DMRS power compared to the CRS is attenuated, and the CRS and the DMRS may be used at the same time for channel estimation.

In order to solve this problem, in the case of downlink MU-MIMO transmission, in order to improve the performance of the MPDCCH by using the CRS together with the MPDCCH DMRS even when the power of the MPDCCH DMRS is reduced compared to the CRS, the base station may transmit to the terminal Information that a change in power according to downlink MU-MIMO transmission may be inferred. The information that the change of power according to MU-MIMO may be inferred is the number of streams/layers/ports simultaneously transmitted by the base station through MU-MIMO, or information of the transmission rank considering the downlink MU-MIMO transmission channel.

The information that the change of power according to MU-MIMO may be inferred may be indicated by the base station to the terminal through RRC signaling, or through MAC signaling in order to more quickly adapt to changes in the number of users and access environment, and so on.

In addition, by transmitting through DCI, the above mentioned information may be dynamically indicated in a scheduling unit or a repetition unit.

For example, in the case of DCI transmission transmitted by the base station, there is an advantage in terms of fast adaptation, but since the exact power ratio between the CRS and the MPDCCH DMRS cannot be known, there is a limitation in that, only after receiving DCI using only the MPDCCH DMRS, the CRS may be additionally used by using the corresponding information. For the above reasons, power information transmitted through DCI may be applied during a DCI transmission subframe (e.g., subframe n), or a specific period (e.g., N subframes) from a specific time point thereafter (e.g., subframe n+k). The value of N may be configured by a higher layer based on a trade off between dynamic adaptation and CRS utilization extent.

The terminal may update MPDCCH DMRS power information according to downlink MU-MIMO transmission by receiving update information through DCI within N subframe period.

5) A Method in which the Precoder is Cycled within the Entire Set or a Predetermined Part of Precoding Matrices Defined in the MPDCCH DMRS Codebook.

In order to obtain a spatial diversity gain in a situation in which PMI feedback is not configured or is impossible, all or part of the precoding matrix set defined in the MPDCCH DMRS codebook may be cycled.

For example, a part of the set of precoding matrices may be a subset of the precoding matrices defined in the codebook. The cycling precoding matrices and information related to the order thereof may be preset and fixed values, or may be indicated by higher layer configuration or DCI.

The cycling direction may follow a time sequence (e.g., in units of one or a plurality of symbols).

The cycling unit may be slot/subslot (a subslot may be composed of a preconfigured a number of plural symbols). In addition, the cycling unit may be sub-frame unit. In addition, the cycling unit may be transmission time interval (TTI) unit. In addition, the cycling unit may be configured by RRC, configured as predefined multiple subframe units, or may be a frequency direction (e.g., RE-level, RB-level, or a plurality of RB level (configured by RRC or predefined), RBG level or NB level cycling, etc.).

Such precoder cycling may be held for a certain period (that is higher layer configured in advance) within a repetition period, and when frequency hopping is applied, it may be held within the frequency hopping period.

That is, in this case, assuming that the frequency hopping period or interval is N (contiguous) DL subframes, the terminal may assume that the same precoder is used during N (contiguous) DL subframes in which MPDCCH may be transmitted.

Here, the value N may be a cell-specific value configured by RRC. In addition, the value N may be a value configured by RRC for each CE mode (or CE level).

In addition, when the index of the first subframe of each block including N DL subframes is n1, n1 may be a value that satisfies (n1+offset) mod N=0.

The offset value is a parameter for adjusting the starting point of each block including N (contiguous) DL subframes, and may be a value configured by RRC.

In terms of the base station, in order to facilitate multiplexing of multiple users, the start subframe of the precoder cycling unit may be configured to have the same value for all terminals in the cell. To this end, the offset value may be a cell-specific value. When the precoding cycling unit (or granularity) is a frequency hopping period or interval, only when frequency hopping is turned on, the precoding cycling is not applied and the same value may be applied within the frequency hopping period.

Alternatively, even when frequency hopping is turned off, precoder cycling may be performed in units of N (contiguous) DL subframes for the purpose of obtaining averaging gain for channel estimation, or the same precoder may be applied.

Alternatively, the precoder cycling may be cycled in units of REs constituting the EREG within the EREG, similar to the port cycling of LTE-MTC. In this case, there is an effect of obtaining a spatial multiplexing gain within the EREG.

When the precoder cycling is applied in the frequency direction, the unit (or granularity) of the precoder cycling may be configured as a minimum unit configuring an MPDCCH PRB set or a greatest common denominator thereof. When the precoder cycling in the frequency direction is applied to the MPDCCH DMRS, based on the MPDCCH PRB set including 2, 4 or 6 PRBs, the base station may configure the precoder cycling unit (or granularity) as the minimum unit or a greatest common denominator of the MPDCCH PRB set.

For example, when the MPDCCH PRB set is composed of 2, 4, or 6 PRBs, the base station may configure the precoder cycling unit (or granularity) as 2 PRBs.

The purpose of configuring the precoder cycling unit (or granularity) as the minimum unit or greatest common denominator for configuring the MPDCCH PRB set as above is to obtain the PRB bundling effect, and at the same time, to obtain the frequency diversity effect by cycling the precoder as frequently as possible.

When the precoder is cycled in the frequency direction, the unit (or granularity) of the precoder cycling may be determined differently according to the MPDCCH transmission type (localized/distributed). When applied to the MPDCCH DMRS, the precoder cycling unit (or granularity) may be determined differently according to the MPDCCH transmission type (localized/distributed). The corresponding value may be determined differently through RRC signaling for configuring the MPDCCH transmission type. For example, in the case of localized MPDCCH transmission, the MPDCCH PRB set may be configured as a minimum unit or a greatest common denominator, and in the case of distributed MPDCCH transmission, it may be configured as 1 PRB. In the case of distributed MPDCCH transmission, PRBs constituting the MPDCCH PRB set may be non-contiguous in the frequency domain. In other words, the RB indices constituting the MPDCCH PRB set may be non-contiguous, and in this case, in order to maximize the frequency diversity effect due to the precoder cycling, the base station may configure the granularity of the precoder cycling as 1 PRB.

Precoder cycling may be performed in a specific time/frequency domain units, rather than performing the cycling operation for all time/frequency domain units. The specific part of the time/frequency domain units may be, in terms of the base station, time/frequency domain units that the base station actually transmit or may transmit MPDCCH to a specific terminal. In terms of terminal, it may be time/frequency domain units that the terminal may expect MPDCCH reception. That is, the counter for increasing the precoder index may be counted only in a specific part of time/frequency units.

The time/frequency domain above may be, in the frequency domain, RE (or subcarrier), RB, minimum unit or greatest common denominator of MPDCCH PRB set configuration, PRG (if PRB bundling is supported), NB (e.g., 6 RBs), and so on, and in the case of the time domain, it may be a symbol/sub slot/slot/sub frame/TTI/frequency hopping interval (period), and so on. For example, in the case of the time domain, precoder cycling may be performed only for subframes in which MPDCCH transmission is possible or only for subframes in which the corresponding terminal expects MPDCCH reception. In the case of the frequency domain, the precoder cycling operation may be performed only for RBs capable of transmitting MPDCCH or for which the corresponding terminal may expect MPDCCH reception. For example, the precoder cycling operation is performed only for PRBs constituting the MPDCCH PRB set, or only for PRBs that the corresponding terminal actually expects MPDCCH reception among PRBs constituting the MPDCCH PRB set. The reason why the precoder cycling is performed only for a certain part of the time/frequency domain units as described above is because the time/frequency diversity effect may be obtained even when the number of precoders (Np) in the precoder set for precoder cycling is not sufficient.

Taking the precoder cycling in the frequency domain as an example, assuming that the precoder cycling is performed in RB units within a set consisting of 4 precoders (Np=4), the MPDCCH PRB set is composed of 2 PRBs, and the PRB index is 1 and 5 (corresponding to a distributed MPDCCH transmission), when the precoder is cycled regardless of whether or not MPDCCH is transmitted, the 2 PRBs constituting the MPDCCH PRB set are intended for precoder cycling, but the same precoder may be used. For example, when starting from precoder index 0 at PRB index 0, precoding index 1 is applied to both of 2 PRBs. On the other hand, when the proposed method is applied, the precoder index 0 is applied to the PRB index 1 and the precoder index 1 is applied to the PRB index 5, so that the intended precoder cycling may be achieved.

The precoder cycling may operate in time/frequency domain as follows. The precoder cycling in the frequency direction, a precoder index may sequentially increase or decrease in an order of increasing or decreasing of frequency domain units. Here, the index of the precoder may be increased or decreased for all the frequency axis units, or may be increased or decreased for a limited specific part of the time/frequency axis units as described above.

The precoder cycling in the time direction may sequentially increase or decrease the precoder index in the order of increasing the time domain unit. Here, it may be increased or decreased for all the time axis units, or may be increased or decreased for limited specific part of the time/frequency domain units as described above.

For the above described precoder cycling in time/frequency axis domain units, when the value of the precoder index calculated by this rule exceeds the number of precoders (Np) included in the precoder set for precoder cycling, a value applied with a modular operation (i.e., mod Np) may be used as a precoder index value.

For the case when the precoder cycling is applied simultaneously in the time axis and the frequency direction, or limited to the corresponding case, a predetermined offset value may be applied to the precoder index whenever each time domain unit is increased. Here, the offset may be applied to all precoder indices (e.g., to which precoder cycling in the frequency domain unit is performed) belonging to the corresponding time domain unit and may be accumulated and applied as the time domain unit increases. The offset may be applied to all time domain units, or only when there is a target to which an actual precoder is applied as described above, for example, when MPDCCH is transmitted.

When the value of the precoder index calculated through this method exceeds the number of precoders (Np) included in the precoder set for precoder cycling, the base station may use the value after applying a modular operation (i.e., mod Np) as a precoder index value. For example, when a precoder cycling is applied within a set consisting of 4 precoders, an offset is 1, and 3 PRBs constitute one MPDCCH PRB set, the order of the precoder cycling may be as follows.

{1, 2, 3}, {2, 3, 4}, {3, 4, 1}, {4, 1, 2,}, . . .

Here, each { } represents a precoding indices within one time domain unit. When the time domain unit is a subframe, the precoder index may be increased in the order of 1, 2, 3 in the frequency domain units in the first subframe. In the second subframe, the offset is increased by 1, and the precoder index may be increased in the order of 2, 3, 4 in the frequency domain units. In the third and following subframes, offset may be increased by 1 in every subframe according to the same method.

The base station may operate in the order in which the precoder index (or PMI index) increases or decreases within a precoder set (or PMI table composed of a plurality of PMIs) preconfigured or configured by a higher layer as above. In addition, the precoder cycling may operated according to a method of continuously multiplying or dividing precoder A (or PMI A) by precoder B (or PMI) with the period of increasing or decreasing the precoder index (or PMI index) based on precoder A (or PMI A) and precoder B (or PMI B) configured by a higher layer or preconfigured. In case of the latter, each of precoder A (or PMI A) and precoder B (or PMI B) may be configured in the form of a PMI table. In addition, precoder A (or PMI A) and precoder B (or PMI B) may be referred to as, for example, base PMI and delta PMI, respectively.

The above mentioned [method of estimating a channel using both CRS and MPDCCH DMRS] may be selected differently according to the LTE-MTC operation mode. For example, when operating in LTE in-band mode, the base station uses CRS as it is to minimize the impact on legacy LTE or LTE MTC terminals, and MPDCCH DMRS may be transmitted according to a method of non-preceded, a method of precoding based on a codebook, or a method of cycling and applying a precoder, and when operating in the standalone mode, a method (precoded CRS transmission method) of applying the same precoding as the MPDCCH DMRS to the CRS alone or in addition to the above method may be applied to perform beamforming and the like optimized for a standalone MTC terminal operation.

The selection of these two methods may be automatically selected by the MTC operation mode, or may be configured by a base station (by higher layer signaling) to provide additional flexibility, or may be selectively applied according to whether the corresponding resource (subframe or NB) is shared with a legacy terminal (MTC or a non-BL UE in CE mode or LTE). The terminal may assume that the DMRS and the CRS are transmitted through the same antenna port for both of the two operations. However, the terminal may recognize the method selected by the base station by referring to the MTC operation mode or by referring to the configured higher layer parameters, and additionally perform the detailed operation defined above for the selected method.

The base station may transmit information (e.g., 1 bit flag) for configuring the relationship between precoding and ports between the MPDCCH DMRS and the CRS to the terminals through broadcasting signaling (e.g., MIB, SIB, SI messages). Here, the terminal may receive the MPDCCH by selecting one of the precoding schemes of MPDCCH DMRS and/or CRS according to the corresponding information is a specific value (e.g., '1') or a combination of the specific value and other information. Alternatively, the specific information transmitted from the base station may be replaced with a signal such as an operation mode and whether the LTE control region is available. When specific information is replaced by a signal indicating whether or not the LTE control region is available, for example, only for LTE MTC terminals that support the use of the LTE control region, the corresponding flag may be referred and the precoding and port relationship between the MPDCCH DMRS and the CRS may be used, and MPDCCH reception may be allowed by the base station.

The information for configuring the precoding and port relationship between the MPDCCH DMRS and the CRS may include meaning of information indicating whether the precoding and port relationship between the MPDCCH DMRS and the CRS is applied, or indicating that MPDCCH is to be received by applying the above relationship. In addition, the base station may indicate whether to apply the precoding and port relationship between the MPDCCH DMRS and the CRS through DCI (e.g., 1 bit flag) to the UE. In addition, the base station may indicate to UE to receive the MPDCCH using the above relationship. The UE may receive the MPDCCH by applying precoding and port relationship between the MPDCCH DMRS and the CRS with reference to the DCI information (e.g., 1 bit flag).

The above mentioned precoding and port relationship between the MPDCCH DMRS and the CRS may improve the MPDCCH reception performance, and may be used for measurement using MPDCCH (e.g., calculating hypothetical MPDCCH BLER performance for determining in-sync and out-of-sync in radio link monitoring).

Among the above proposed methods, relationship between a precoding matrix and an ECCE index may be defined in a method belonging to a precoded DMRS classification. For example, the terminal may attempt MPDCCH detection assuming one or more ECCEs according to the aggregation level in the blind detection procedure of the MPDCCH. The ECCE index is related to the DMRS port index.

Accordingly, the precoding matrix of the precoded DMRS assumed by a specific terminal may be determined according to the ECCE index. When the terminal can assume a specific precoding matrix, the terminal may assume that the same precoding is applied to all ECCE indexes used in the blind detection procedure.

Specifically, the ECCE index may be the lowest ECCE index in consideration of the case where the aggregation level (AL) is greater than 1. The lowest ECCE index means the smallest value among ECCE index values of a plurality of ECCEs configuring the MPDCCH.

2. Example 2: Method of Supporting Frequency Interpolation

PRB bundling may be consired to improve the channel estimation performance using a frequency interpolation method.

(1) Example 2-1: Physical Resource Block (PRB) Bundling

When PRB bundling may be assumed in the process of detecting the MPDCCH, the precoding resource block group (PRG) does not generate a grid within the LTE system bandwidth, and a grid may be configured within the corresponding NB.

That is, PRG configurations of the highest RB index and the lowest RB index of a specific NB may be included in the PRBs of the lowest RB index and the highest RB index of neighboring NB, respectively. This may be inefficient for a terminal that performs MPDCCH detection in the specific NB.

Therefore, the PRG unit may be configured based on the system bandwidth of the LTE cell (e.g., the PRG unit is 1, 2 or 3 PRBs depending on the system bandwidth), but the physical grid of the PRB may be configured within the NB.

In LTE-MTC, the PRB bundling of the MPDCCH may be implicitly configured according to the CE mode. For example, a UE configured with CE mode B (or CE level 3 or 4) mainly requires large coverage enhancement, so may be limited to monitor only the MPDCCH format configured as at least 2 PRBs or more, that is, PRB is 2/4/6 (AL is 8/16/24), and a blind decoding (BD) may be performed assuming PRB bundling (for example, PRG=2).

When the unit of the MPDCCH PRB configuration is 2/4/6 PRB, and the PRG unit exceeds 3 PRB, a PRG may be configured as 2 PRB (1PRG=2PRBs) which is the minimum unit of MPDCCH PRB set configuration, considering the performance gain decrease.

That is, 3 PRGs may be configured in 1 NB. As a method of configuring PRG in 2 PRB units, first, when the PRB index in each NB is $p \in \{0, 1, 2, 3, 4, 5\}$, 3 non-overlapping PRGs having an index pair of $\{0, 1\}$, $\{2, 3\}$, $\{4, 5\}$ may be configured.

Alternatively, when the PRGs constituting the MPDCCH PRB set are not limited to be adjacent to each other, the PRBs constituting the MPDCCH PRB set may be configured to constitute one PRG. For example, when an MPDCCH PRB set consisting of 2 PRBs is configured as $p=\{1, 4\}$, a PRB set having a PRB index of $\{1, 4\}$ may constitute a PRG.

The configuration information of the MPDCCH PRB set may be configured through higher layer signaling, and may be indicated to the terminal. Alternatively, the base station may configure the PRG such that the number of PRBs constituting the MPDCCH PRB set is an integer multiple of the PRG. For example, in the case of an MPDCCH PRB set consisting of 4 PRB sets, the base station may configure 1PRG=4PRB, or 1PRG=2PRB.

The terminal may recognize the PRG configuration of the MPDCCH PRB set according to the above-described methods by referring to the configuration information of the MPDCCH PRB set configured by a higher layer, and may perform channel estimation or the like assuming that the same precoding is applied in the PRG. For example, when a method of configuring a PRG in units of an MPDCCH PRB set among the above described methods is applied, the terminal may assume that the same precoding is applied in the MPDCCH PRB set and may perform channel estimation operation or the like for MPDCCH demodulation/decoding.

The PRB bundling method may be applied to transmission of the MPDCCH DMRS based on the codebook of the present disclosure, for example, when the base station configures the PRG in units of the MPDCCH PRB set among the previously described methods and transmits using the same MPDCCH DMRS precoding and/or port in the PRG, the terminal may assume the same MPDCCH DMRS precoding and/or port within the MPDCCH PRB set, and may perform a channel estimation operation for MPDCCH demodulation and/or decoding.

When the base station configures the PRG in units of MPDCCH PRB set and the same MPDCCH DMRS precoder cycling or port cycling is applied within the PRG, the terminal may assume the same MPDCCH DMRS precoder cycling or port cycling rules within the MPDCCH PRB set, and may perform a channel estimation operation or the like for MPDCCH demodulation/decoding.

Whether the PRB bundling of MPDCCH or PDSCH or the PRG value may be determined by the base station according to whether the MPDCCH and PDSCH between the same or different terminals are multiplexed in the same subframe. For example, a terminal configured by higher layer with a PRG of 3 for the PDSCH receives with assuming the PRG=3 for subframes to which the same subframe multiplexing is not applied, and then when the subframe to which the same subframe multiplexing is applied, PDSCH modulation may be performed by assuming the value of PRG=2.

Whether the same subframe multiplexing is applied may be indicated by the base station through PDSCH scheduling DCI.

Considering that MPDCCH PRB sets are configured in units of 2/4/6 PRBs for such cases, the PRG configuration of the PDSCH may be configured to PRG=2 for effective MPDCCH/PDSCH supports the same subframe multiplexing. Here, PRG=N means that a PRG is composed of N PRB (i.e., 1PRG=N PRB).

3. Example 3: Fallback Operation

In the case of estimating a channel using CRS (additionally) or applying PRB bundling in order for the enhancement of the performance of MPDCCH, a fallback operation needs to be defined.

(1) Example 3-1: Fallback Operation According to the Type of Subframe

For example, for a method of additionally using the CRS as well as the MPDCCH DMRS to improve the performance of the MPDCCH, when there is a region in which transmission of the CRS cannot be assumed in the repetitive transmission period of the MPDCCH (e.g., MBSFN region of MBSFN subframe, that is, a region other than the LTE unicast control region in the MBSFN subframe), a fallback to existing method for the terminal of estimating a channel using only the MPDCCH DMRS is required. Accordingly, problem that may occur when a terminal reflects the RE in which the CRS is not actually transmitted to the channel estimation may be prevented.

By performing fallback operation by the base station, it may be allowed to perform fallback operation only on subframes for which the corresponding CRS cannot be assumed, or on all subframes within the repetition period, all subframes within the corresponding NB (or within the frequency hop), or subframes in which precoding in the corresponding NB is maintained (or to which the same precoding is applied) for interpolation and/or averaging operation on channel estimation.

Alternatively, for the subframe or a specific region in the subframe (e.g., MBSFN region of MBSFN subframe, that is, a region other than the LTE unicast control region in the MBSFN subframe) in which the CRS cannot be assumed, the base station allows a channel estimation using both of CRS and DMRS may be performed like in a subframe (e.g., non-MBSFN subframe) in which the CRS is expected.

For example, when an LTE MTC terminal capable of using a CRS to improve MPDCCH performance receives a relationship between CRS and DMRS ports through a higher layer configuration and/or when indicated to perform channel estimation using a relationship between CRS and DMRS ports (i.e., when the CRS cannot be expected), a channel estimation may be performed using the same relationship between the CRS and DMRS ports for the MBSFN subframe (or the MBSFN region of the MBSFN subframe).

As described above, for the MPDCCH repetition, the situation where an averaging gain cannot be obtained during channel estimation due to the difference in the precoding of the DMRS of a specific subframe (e.g., MBSFN subframe) may not occur, or an additional processing to obtain the gain when the situation of averaging gain is required to be obtained may be eliminated.

(2) Example 3-2: Fallback in Terms of Reliability

For example, due to a change in a situation of the base station, there is a need to switch from an operation of estimating a channel based only on the DMRS to an operation of estimating a channel using DMRS+CRS (or vice versa). (for example, by RRC reconfiguration), and to prevent a mismatch of the RS for modulating MPDCCH (that schedules the PDSCH/PUSCH for transmitting and receiving an RRC message) between the base station and the terminal that may occur in the process of such switching (e.g., RRC reconfiguration procedure), for a specific DCI format or PDCCH candidate or search space, a fallback operation may be performed that always performs MPDCCH modulation using only the DMRS (regardless of (on/off) configuration of the CRS+DMRS based MPDCCH).

For example, a fallback operation may be performed for an MPDCCH that is simultaneously monitored with other terminals (MTC or non-BL UE in CE mode, or LTE) or for an MPDCCH including DCI transmitted to one or more terminals other than an MPDCCH that is monitored by a specific terminal.

For example, there may be Type0-MPDCCH CSS, Type1-MPDCCH CSS, Type2-MPDCCH CSS. CSS may mean a common search space.

For example, a fallback operation may be performed for Type1-/1A-/2-/2A-MPDCCH CSS. Through this fallback operation, the relationship between the MPDCCH DMRS and the CRS for a terminal that may use CRS to improve the performance of the MPDCCH may not be directly applied to legacy terminals (e.g., legacy eMTEC, non-BL UE in CE mode and LTE) that monitors the same CSS(Common Search Space) to protect legacy terminals.

The relationship between the CRS and the DMRS may be individually configured through RRC configuration for each terminal considering the capabilities and circumstances of the terminal with discriminating the terminals according to CE mode (or CE level), without commonly applying to all terminals in the cell or. For example, it may be determined whether to use only the DMRS or to use the DMRS+CRS according to the received SNR of the terminal, that is, according to the channel estimation accuracy, and in this case, since the received SNR of the terminal is UE-specific value, RRC configurations for each terminal may be required. When the UE-specific RRC configuration is applied, a fallback operation may be required to prevent a configuration mismatch between the base station and the terminal in terms of reliability. For example, a fallback MPDCCH to which CRS is not applied may be required.

4. Example 4: A Method of Configuring Reception Relationship

(1) Example 4-1: Broadcasting the Relationship Between the CRS and DMRS

The base station may broadcast relationship between CRS and DMRS to terminal. That is, the base station may transmit information on MPDCCH demodulation reference signal through MIB, SIB or the like.

The corresponding terminal may obtain the corresponding information from the cell selection step and apply to MPDCCH demodulation using the corresponding information from idle mode procedure (e.g., paging, random access). The configuration broadcast may be applied to all terminals in a corresponding cell or may be predefined to be applied only when satisfying a specific condition.

In the case of LTE-MTC, since both the PBCH (Physical Broadcast Channel) transmitting MIB and the PDSCH transmitting the SIB1-BR or SI message do not require modulation of the MPDCCH, there is no need to define the default operation before broadcast information is received.

When the methods for improving the reception performance of the MPDCCH proposed in the present disclosure are to be extended and applied to a normal LTE or NR UE, regarding the information broadcast according to the above method, in the steps of MPDCCH demodulation for receiving the configuration information or the MPDCCH demodulation prior to receiving the configuration information, not applying the CRS to channel estimation may be defined as a default operation.

(2) Example 4-2: Broadcasting the Relationship Between CRS and DMRS

The relationship between the CRS and the DMRS ports may be configured for each CE mode (or the CE level in the random access step). For example, in CE mode B, distributed transmission is suitable, and channel dependent scheduling by single layer beamforming is not possible, it may be configured to apply a method of transmitting MPDCCH DMRS in a non-precoded manner, or a method of applying a fixed precoding to the MPDCCH DMRS, or a method in which precoders are cycled and applied within the entire set or a predetermined part of the precoding matrix defined in the MPDCCH DMRS codebook.

In CE mode A, since terminal multiplexing through localized beamforming and channel-dependent scheduling gain may be expected, a method of applying the same precoding as MPDCCH DMRS to CRS (a method of transmitting precoded CRS) may be configured by the base station.

Precoded DMRS with respect to CRS or codebook-based DMRS in which PMI information is reflected among CSI information fed back by the terminal may be applied. This method includes MPDCCH DMRS precoding in which the codebook defined for single-layer beamforming (PDSCH TM6) using CRS is reused based on the CSI report generated and fed back by the UE based on CRS.

In addition, in CE mode A, the DCI may indicate to the UE of PMI information to be used for the MPDCCH in addition to the CSI report indication for PDSCH scheduling.

The part in which the relationship between the CRS and the DMRS may be changed for each CE mode may be applied similarly to the case of configuring for each CE mode according to whether the MPDCCH transmission is localized or distributed transmission. For example, in the case of localized MPDCCH transmission, since terminal multiplexing and channel-dependent scheduling gain through localized beamforming may be expected similarly to CE mode A, the relationship between CRS and DMRS may be configured the same as in CE mode A by the base station.

In the case of distributed MPDCCH transmission, for the same reason as in CE mode B, the relationship between CRS and DMRS may be configured the same as in CE mode B.

The part in which the relationship between the CRS and the DMRS may be different for each CE mode may be applied similarly to the case of configuring for each CE mode according to a downlink transmission mode (TM). For example, when single-layer beamforming can be applied such as in TM 6 and TM 9, it may be configured as in CE mode A.

Alternatively, when transmission diversity is used as in TM 2, it may be configured similarly to CE mode B.

Due to this difference, the configuration for enabling/disabling the CRS and DMRS relationship and/or the use of CRS for MPDCCH performance improvement may be configured different for each CE mode (or CE level in the random access stage) and/or for localized MPDCCH transmission and distributed MPDCCH transmission, and/or for PDSCH TM or for some TMs.

The detailed operations and definitions of Example 4-1 may be equally applied to Example 4-2.

(3) Example 4-3: Broadcasting CRS and DMRS Relationship by CE Mode (or CE Level)

The relationship between the CRS and the DMRS may be individually configured through RRC configuration for each terminal considering the capabilities and circumstances of the terminal or discriminating the terminals according to CE mode (or CE level), without commonly applying to all terminals in the cell.

For example, according to the received SNR of the terminal, that is, according to the channel estimation accuracy, it may be determined whether to perform the channel estimation operation of DMRS only or operation of DMRS+CRS.

In this case, since the received SNR of the terminal is a value specific to the terminal, RRC configuration for each terminal may be required. When such a UE-specific RRC configuration is applied, a fallback operation in terms of reliability described above, that is, a fallback operation to prevent the configuration between the base station and the terminal being mismatched may be required. For example, a fallback MPDCCH to which CRS is not applied may be required.

(4) Example 4-4: Configuring Dynamic CRS-DMRS Codebook Through DCI for Each Terminal In the same motivation as in Example 4-3, when a configuration specific to the terminal is required, when fast switching of the setting of the relationship between the CRS and the DMRS is required, the base station may transmit the information of the codebook applied to the CRS and the DMRS through DCI.

The configuration methods for the relationship between the CRS and the MPDCCH DMRS may be applied equally to the case of enabling/disabling the use of the CRS for improving the MPDCCH performance.

In addition, the relationship between the CRS and the MPDCCH DMRS may include power or power boosting information compared to the CRS of the MPDCCH DMRS described in the method indicated to the terminal after application of the codebook-based precoding described in section 3.1.2.4 (Example 2-4), and thus a configuration method related to the relationship between the CRS and the MPDCCH DMRS may be configured.

The MPDCCH DMRS precoding and port configuration method based on the CSI report of the UE described above determines the precoding and port relationship of the MPDCCH DMRS based on the CSI report from a specific UE, so it may be configured or reconfigured through the UE-specific RRC signaling, like the PDSCH TM configuration method.

When the PDSCH TM and MPDCCH DMRS precoding and ports are configured based on the same CSI report, the PDSCH TM and the MPDCCH DMRS precoding and antenna ports of the MPDCCH that schedules the PDSCH may be reconfigured based on the same CSI report. Therefore, MPDCCH precoding and port configuration may have to be preceded.

For MPDCCH precoding and port configuration, the base station may transmit MPDCCH DMRS precoding and port configuration information through MPDCCH transmission to which MPDCCH DMRS precoding and port configuration is not applied or MPDCCH CSS supporting distributed MPDCCH transmission based on CSI report of a specific terminal.

The MPDCCH DMRS precoding and port configuration information may be, for example, PMI confirmation information (i.e., a flag indicating whether the codebook index or the precoding applied by the base station is a codebook index recommended through the aperiodic CSI report of the terminal, or a codebook index explicitly indicated through DCI) and/or codebook index information selected by the base station.

Here, MPDCCH DMRS of MPDCCH CSS itself supporting distributed MPDCCH transmission that transmits MPDCCH DMRS precoding and port configuration information may be, as described above, transmitted in a non-precoded manner, or applied with fixed precoding, or applied with a method of cycling and applying within the entire set or predetermined part of precoding matrices defined in the codebook.

The base station may indicate to transmit an aperiodic CSI report at a specific time through DCI transmitted through distributed MPDCCH transmission or DCI transmitted through MPDCCH to which MPDCCH precoding and port configuration have been successfully (re)configured recently, when receiving an aperiodic CSI report from the terminal at the intended time, if necessary, based on the CSI report, the PDSCH TM may be is reconfigured through RRC signaling specific to the terminal, or MPDCCH DMRS precoding and port configuration may be configured or reconfigured through UE-specific RRC signaling, MAC signaling or DCI signaling.

When transmitting MPDCCH DMRS precoding and port information through DCI, the base station may not receive an aperiodic CSI report from a corresponding UE at an intended time point, and in this case, by transmitting the DCI for MPDCCH DMRS precoding and port configuration through distributed MPDCCH transmission, through PMI confirmation information, it may be indicated to the terminal that the codebook index applied by the base station has been used, and by indicating a codebook index successfully (re)configured before the codebook index applied by the base station, communication may be maintained through previous MPDCCH DMRS precoding and port configuration.

When the recording of the MPDCCH DMRS and port information are indicated through the DCI transmitted through the distributed MPDCCH transmission as described above, independent RNTI may be applied to the corresponding DCI to distinguish the field.

In the case of changing the precoding applied to the MPDCCH DMRS, the SNR or SINR of the received signal may be changed at the terminal due to a difference in beamforming gain or presence or absence of a beamforming gain. For example, for reasons such as the precoding applied to the MPDCCH DMRS is fixed, the precoding is changed from a predefined precoding to the precoding for CSI-based single layer beamforming, or the number of precoding ports for a single layer beamforming is increased, and due to the change in the shape of the transmission beam, the SNR or SINR of the received signal may be changed at the terminal.

The repetition number optimized in terms of the terminal or in terms of the system may be changed. For example, repetition number required for reception of the MPDCCH may be reduced as the beamforming gain varies in terms of the terminal.

Alternatively, power allocation applied for each terminal may be changed in consideration of the situation of a plurality of terminals in terms of the base station.

In this case, in order to increase resource efficiency and reduce power consumption of the terminal through efficient application of the MPDCCH repetition number, a value of the MPDCCH repetition number indicated by the DCI may be optimized.

In the optimization method, a set of repetition numbers indicated by the DCI corresponding to each precoding or codebook index may be redefined, and another set of repetition numbers may be applied according to the precoding or codebook index. For example, precoding or codebook indexes may be grouped to define a set of repetition number for each group and used.

For example, in the above grouping method, a set of repetition numbers may be simply newly defined and used in the case of using a codebook for single layer beamforming based on a CSI report.

As for the repetition number set, a repetition number set for MPDCCH transmission may be newly defined in the UE-specific RRC configuration, or a value of Rmax may be differently set, or the value of the UE-specific RRC configuration may be used as it is, and a value obtained by multiplying a specific scaling factor (e.g., ½) according to the selection of precoding or codebook index may be applied.

In the case of configuring a new repetition number set, a value may be configured in a direction in which granularity of the repetition number is increased for effective use of the DCI field when it is necessary to reduce the repetition number due to an increase in the beamforming gain. For example, when the Rmax value required before beamforming is 8, and the DCI field indicates one of $\{1, 2, 4, 8\}$, and when the Rmax required after beamforming decreases to 4, repetition number set may be changed as $\{1, 2, 3, 4\}$.

When the MPDCCH detection performance is improved due to the performance improvement of the MPDCCH using the CRS, a new set of repetition number may be configured by adding intermediate values to compensate for the disadvantage that the interval between the existing repetition numbers is too long. For example, when the maximum number of repetitions is 32, a set of repetitions that may be indicated by DCI may be $\{1, 2, 4, 8, 16, 32\}$, and in this case, intermediate values such as 12, 20, 24, 28 may be added to the new set of repeated transmission numbers.

When the MPDCCH performs frequency hopping, newly added values may be defined in relation to the number of consecutive subframes transmitted in the same NB before frequency hopping, that is, a value corresponding to the frequency hopping interval (for example, values that are an integer multiple of the frequency hopping interval may be added).

<Notes Related to the Present Disclosure>

In the present disclosure, the wireless device includes a base station, a network node, a transmitting terminal, a receiving terminal, a wireless device, a wireless communication device, a vehicle, a vehicle equipped with an autonomous driving function, a drone (Unmanned Aerial Vehicle, UAV), an AI (Artificial Intelligence) module, a robot, an Augmented Reality (AR) device, a Virtual Reality (VR) device, an MTC device, an IoT device, a medical device, a fintech device (or financial devices), a security device, a climate/environment device, or a device related to the 4th industrial revolution field or 5G service, etc. For example, a drone may be a vehicle that is not a human being and is flying by a radio control signal. For example, the MTC device and the IoT device are devices that do not require direct human intervention or manipulation, and may be a smart meter, a bending machine, a thermometer, a smart light bulb, a door lock, and various sensors. For example, a medical device is a device used for the purpose of diagnosing, treating, alleviating, treating or preventing a disease, examining, replacing, or modifying a structure or function, and may be a medical equipment, a surgical device, a (extracorporeal) diagnostic device, a hearing aid, a surgical device, and the like. For example, a security device is a device installed to prevent a risk that may occur and maintain safety, and may be a camera, a CCTV, or a black box. For example, a fintech device is a device capable of providing financial services such as mobile payment, and may be a payment device or a point of sales (POS). For example, the climate/environment device may mean a device that monitors and predicts the climate/environment.

The three main requirements areas of 5G include (1) Enhanced Mobile Broadband (eMBB) area, (2) Massive Machine Type Communication (mMTC) area, and (3) Ultra-reliable and Low Latency Communications (URLLC) area.

In some use cases, multiple areas may be required for optimization, and other use cases may be focused on only one key performance indicator (KPI). 5G supports these various use cases in a flexible and reliable way.

eMBB goes far beyond basic mobile Internet access, covering rich interactive work, media and entertainment applications in the cloud or augmented reality. Data is one of the key drivers of 5G, and it may not be possible to see dedicated voice services for the first time in the 5G era. In 5G, voice is expected to be processed as an application program simply using the data connection provided by the communication system. The main reasons for the increased traffic volume are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to the user. Cloud storage and applications are rapidly increasing in mobile communication platforms, which can be applied to both work and entertainment. And, cloud storage is a special use case that drives the growth of the uplink data rate. 5G is also used for remote work in the cloud and requires much lower end-to-end latency to maintain a good user experience when tactile interfaces are used. Entertainment, for example, cloud gaming and video streaming is another key factor that is increasing the demand for mobile broadband capabilities. Entertainment is essential on smartphones and tablets anywhere, including high mobility environments such as trains, cars and airplanes. Another use case is augmented reality and information retrieval for entertainment. Here, augmented reality requires very low latency and an instantaneous amount of data.

In addition, one of the most anticipated 5G use cases concerns the ability to seamlessly connect embedded sensors in all fields, i.e. mMTC. By 2020, potential IoT devices are expected to reach 20.4 billion. Industrial IoT is one of the areas where 5G plays a major role in enabling smart cities, asset tracking, smart utilities, agriculture and security infrastructure.

URLLC includes new services that will transform the industry with ultra-reliable/low-latency links such as self-driving vehicles and remote control of critical infrastructure. The level of reliability and delay is essential for smart grid control, industrial automation, robotics, drone control and coordination.

Next, look at a number of examples in more detail.

5G can complement fiber-to-the-home (FTTH) and cable-based broadband (or DOCSIS) as a means of providing streams rated at hundreds of megabits per second to gigabits per second. These high speeds are required to deliver TVs in 4K or higher (6K, 8K and higher) resolutions as well as virtual and augmented reality. Virtual Reality (VR) and Augmented Reality (AR) applications involve almost immersive sports events. Certain application programs may require special network settings. For example, for VR games, game companies may need to integrate the core server with the network operator's edge network server to minimize latency.

Automotive is expected to be an important new driving force in 5G, with many use cases for mobile communication to vehicles. For example, entertainment for passengers demands simultaneous high capacity and high mobility mobile broadband. The reason is that future users will continue to expect high-quality connections, regardless of their location and speed. Another application example in the automotive field is an augmented reality dashboard. It identifies an object in the dark on top of what the driver sees through the front window and displays information that tells the driver about the distance and movement of the object. In the future, wireless modules enable communication between vehicles, exchange of information between the vehicle and supporting infrastructure, and exchange of information between the vehicle and other connected devices (e.g., devices carried by pedestrians). The safety system can lower the risk of an accident by guiding the driver through alternative courses of action to make driving safer. The next step will be a remote controlled or self-driven vehicle. It is very reliable and requires very fast communication between different self-driving vehicles and between the vehicle and the infrastructure. In the future, self-driving vehicles will perform all driving activities, and drivers will be forced to focus only on traffic anomalies that the vehicle itself cannot identify. The technical requirements of self-driving vehicles call for ultra-low latency and ultra-fast reliability to increase traffic safety to levels unachievable by humans.

Smart cities and smart homes, referred to as smart society, will be embedded with high-density wireless sensor networks. A distributed network of intelligent sensors will identify the conditions for cost and energy-efficient maintenance of a city or home. A similar setup can be done for each household. Temperature sensors, window and heating controllers, burglar alarms and appliances are all wirelessly connected. Many of these sensors are typically low data rates, low power and low cost. However, for example, real-time HD video may be required in certain types of devices for surveillance.

The consumption and distribution of energy including heat or gas is highly decentralized, requiring automated control of distributed sensor networks. The smart grid interconnects these sensors using digital information and communication technologies to gather information and act accordingly. This information can include the behavior of suppliers and consumers, allowing smart grids to improve efficiency, reliability, economics, sustainability of production and the distribution of fuels such as electricity in an automated manner. The smart grid can also be viewed as another low-latency sensor network.

The health sector has many applications that can benefit from mobile communications. The communication system can support telemedicine providing clinical care from remote locations. This can help reduce barriers to distance and improve access to medical services that are not consistently available in remote rural areas. It is also used to save lives in critical care and emergencies. A wireless sensor network based on mobile communication may provide sensors and remote monitoring of parameters such as heart rate and blood pressure.

Wireless and mobile communications are becoming increasingly important in industrial applications. Wiring is expensive to install and maintain. Thus, the possibility of replacing cables with reconfigurable wireless links is an attractive opportunity for many industries. However, achieving this requires that the wireless connection operates with a delay, reliability and capacity similar to that of the cable, and its management is simplified. Low latency and very low error probability are new requirements that need to be connected to 5G.

Logistics and freight tracking are important examples of use for mobile communications that enable tracking of inventory and packages from anywhere using location-based information systems. Logistics and freight tracking use cases typically require low data rates, but require a wide range and reliable location information.

In the present disclosure, the terminal is a mobile phone, a smart phone, a laptop computer, a digital broadcasting terminal, a personal digital assistants (PDA), a portable multimedia player (PMP), a navigation system, a slate PC, and a tablet PC. (tablet PC), a ultrabook, a wearable device (e.g., a smartwatch, a smart glass, a head mounted display (HMD)), a foldable device, and the like. For example, the HMD is a type of display device worn on the head and may be used to implement VR or AR.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present disclosure by coupling a part of the elements and/or technical features. The order of operations described in the embodiments of the present disclosure may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present disclosure may be implemented by various means, for example, hardware, firmware, software and the combination thereof. In the case of the hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present disclosure may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the disclosure. Therefore, the detailed description is not limited to the embodiments described above, but should be considered as examples. The scope of the present disclosure should be determined by reasonable interpretation of the attached claims, and all modification within the scope of equivalence should be included in the scope of the present disclosure.

INDUSTRIAL APPLICABILITY

The present disclosure has been described mainly with the example applied to 3GPP LTE/LTE-A, 5G system, but may also be applied to various wireless communication systems except the 3GPP LTE/LTE-A, 5G system.

What is claimed is:

1. A method performed by a terminal in a wireless communication system, the method comprising:
receiving, from a network, configuration information including a relation between a demodulation reference signal (DMRS) port and a cell specific reference signal (CRS) port, wherein the relation is based on a specific precoder matrix of at least one precoder matrix included in a codebook defined for a transmission on the CRS port; and
receiving, from the network, the DMRS and control information through a Machine Type Communication (MTC) Physical Downlink Control Channel (MPDCCH) based on the configuration information,
wherein the configuration information includes a predefined mapping, or a channel state information (CSI)-based mapping,
wherein the predefined mapping is configured as a default value, and
wherein, based on the configuration information including the CSI-based mapping, the predefined mapping is applied for a common search space.

2. The method of claim 1,
wherein, for a specific DCI format, a specific MPDCCH candidate, or a specific search space, the channel estimation is performed based only on the DMRS.

3. The method of claim 1,
wherein the specific precoder matrix is cycled within the at least one precoder matrix in a specific unit.

4. The method of claim 1,
wherein a same precoder matrix among the at least one precoder matrix is repeatedly applied during a frequency hopping interval.

5. The method of claim 1,
wherein the configuration information further includes information on a power ratio between the DMRS port and the CRS port.

6. A terminal in a wireless communication system, the terminal comprising:
a communication unit;
processor; and
at least one computer memory operably connectable to the processor, and storing instructions for performing operations when executed by the at least one processor,
wherein the operations include:
receiving, from a network through the communication unit, configuration information including a relation between a demodulation reference signal (DMRS) port and a cell specific reference signal (CRS) port, wherein the relation is based on a specific precoder matrix of at least one precoder matrix included in a codebook defined for a transmission on the CRS port; and
receiving, from the network through the communication unit, the DMRS and control information through a Machine Type Communication (MTC) Physical Downlink Control Channel (MPDCCH) based on the configuration information,
wherein the configuration information includes a predefined mapping, or a channel state information (CSI)-based mapping,
wherein the predefined mapping is configured as a default value, and
wherein, based on the configuration information including the CSI-based mapping, the predefined mapping is applied for a common search space.

7. A base station in a wireless communication system, the base station comprising:
a communication unit;
processor; and
at least one computer memory operably connectable to the processor, and storing instructions for performing operations when executed by the at least one processor,
wherein the operations include:
transmitting, to a terminal through the communication unit, configuration information including a relation between a demodulation reference signal (DMRS) port and a cell specific reference signal (CRS) port, wherein the relation is based on a specific precoder matrix of at least one precoder matrix included in a codebook defined for a transmission on the CRS port; and
transmitting, to the terminal through the communication unit, the DMRS and control information through a Machine Type Communication (MTC) Physical Downlink Control Channel (MPDCCH) based on the configuration information,
wherein the configuration information includes a predefined mapping, or a channel state information (CSI)-based mapping,
wherein the predefined mapping is configured as a default value, and
wherein, based on the configuration information including the CSI-based mapping, the predefined mapping is applied for a common search space.

* * * * *